United States Patent
Phillips

Patent Number: 5,414,248
Date of Patent: May 9, 1995

[54] GREASE AND MOISTURE ABSORBING INSERTS FOR MICROWAVE COOKING

[75] Inventor: Bobby M. Phillips, Jonesborough, Tenn.

[73] Assignee: Eastman Chemical Company, Kingsport, Tenn.

[21] Appl. No.: 981,348

[22] Filed: Nov. 25, 1992

Related U.S. Application Data

[63] Continuation-in-part of Ser. No. 812,933, Dec. 24, 1991, abandoned.

[51] Int. Cl.$^6$ ............................................. H05B 6/80
[52] U.S. Cl. ................................... 219/730; 219/727; 99/DIG. 14; 426/107; 426/113; 426/230; 426/243; 428/163; 428/167
[58] Field of Search ............... 219/10.53 E, 10.55 F, 219/730, 725, 731, 727; 99/DIG. 14; 428/107, 113, 234, 243, 136, 240, 163, 167

[56] References Cited

U.S. PATENT DOCUMENTS

| | | | |
|---|---|---|---|
| 4,190,757 | 2/1980 | Turpin et al. | 219/10.55 |
| 4,230,924 | 10/1980 | Brastad et al. | 219/10.55 E |
| 4,258,086 | 3/1981 | Beall | 219/10.43 |
| 4,267,420 | 5/1981 | Brastad | 219/10.55 |
| 4,398,994 | 8/1983 | Beckett | 156/659.1 |
| 4,552,614 | 11/1985 | Beckett | 156/640 |
| 4,592,914 | 6/1986 | Kuchenbecker | 426/107 |
| 4,594,492 | 6/1986 | Maroszek | 219/10.55 E |
| 4,610,755 | 9/1986 | Beckett | 156/634 |
| 4,640,838 | 2/1987 | Isakson et al. | 426/107 |
| 4,656,325 | 4/1987 | Keefer | 219/10.55 E |
| 4,703,148 | 10/1987 | Mikulski et al. | 219/10.55 |
| 4,720,410 | 1/1988 | Lundquist et al. | 428/136 |
| 4,780,587 | 10/1988 | Brown | 219/10.55 E |
| 4,786,513 | 11/1988 | Monforton et al. | 426/107 |
| 4,825,025 | 4/1989 | Seiferth | 219/10.55 E |
| 4,833,007 | 5/1989 | Huang | 428/242 |
| 4,857,342 | 8/1989 | Kappes | 426/107 |
| 4,865,854 | 9/1989 | Larson | 426/107 |
| 4,873,101 | 10/1989 | Larson et al. | 426/113 |
| 4,890,439 | 1/1990 | Smart | 53/410 |
| 4,892,782 | 1/1990 | Fisher et al. | 428/240 |
| 4,894,247 | 1/1990 | Fong | 426/107 |
| 4,935,276 | 6/1990 | Pawlowski et al. | 428/35.7 |
| 4,935,282 | 6/1990 | Pawlowski et al. | 428/121 |
| 4,936,935 | 6/1990 | Beckett | 156/239 |
| 4,940,867 | 7/1990 | Peleg | 219/10.55 E |
| 4,950,524 | 8/1990 | Hacker | 428/163 |
| 4,954,356 | 9/1990 | Kappes | 426/107 |
| 5,041,325 | 8/1991 | Larson et al. | 428/156 |
| 5,094,869 | 3/1992 | Brown, Jr. | 426/417 |
| 5,124,519 | 6/1992 | Roy et al. | 219/10.55 E |

FOREIGN PATENT DOCUMENTS

| | | |
|---|---|---|
| 0303428 | 2/1989 | European Pat. Off. |
| 0320314 | 6/1989 | European Pat. Off. |
| 0360929 | 4/1990 | European Pat. Off. |
| 90/12130 | 10/1990 | WIPO |

OTHER PUBLICATIONS

"Plastics Finishing and Decoration", Edited by Donatas Satas, Plasma Treatment, Rose & Kaplan, pp. 90–100, van Nostrand Reinhold Company.

Derwent Abstract WPI Accession No. 89-048205/07 (EP 0 303 428 Corresponding to U.S. 4,873,101).

*Primary Examiner*—Bruce A. Reynolds
*Assistant Examiner*—Tu Hoang
*Attorney, Agent, or Firm*—Betty J. Boshears

[57] ABSTRACT

A novel insert useful in a microwavable food container comprising a metallized layer of heat susceptor thickness or a plastic layer, having openings which are in a position to be adjacent to food in said container, a layer of absorbent material comprising fibers, and a substrate layer which is stable to microwave heating conditions. The invention also is directed towards other inserts useful in microwavable food containers comprising fibers which are capable of spontaneously transporting water or n-decane on the surface thereof.

49 Claims, 40 Drawing Sheets

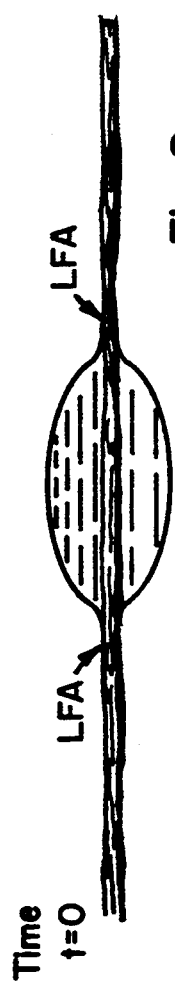

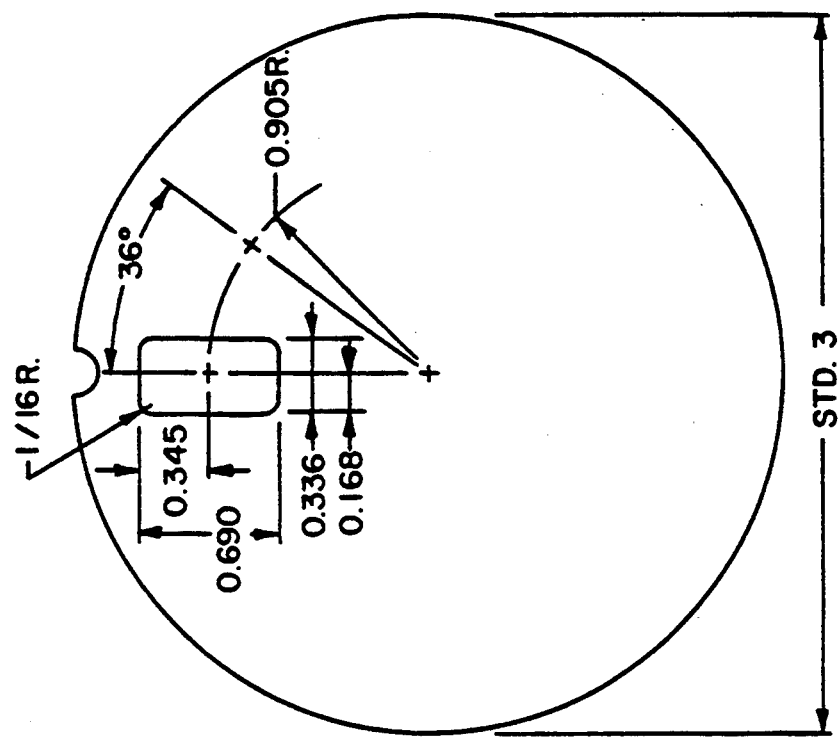
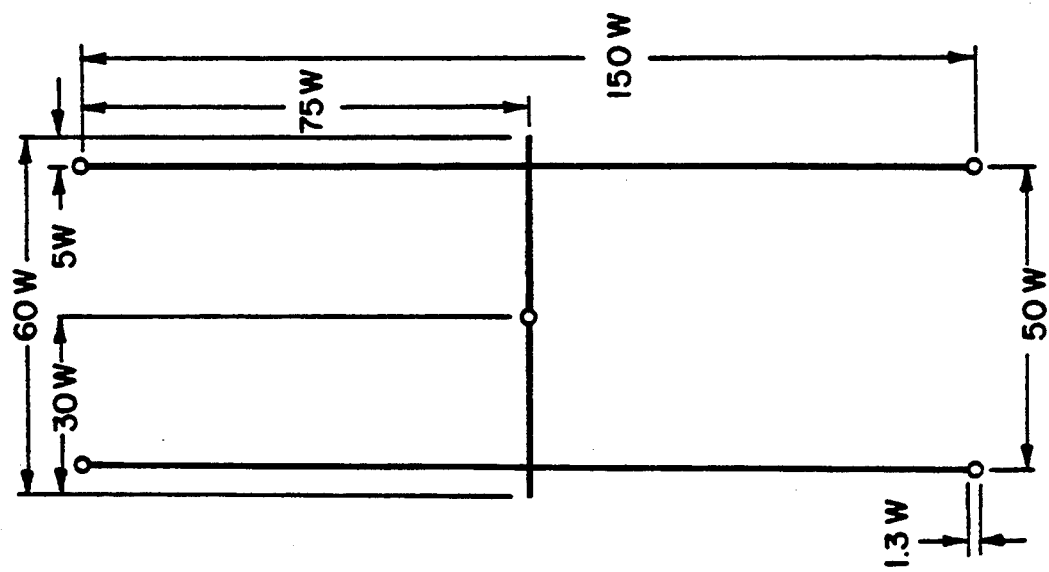
Fig. 42

CANOLA OIL ABSORPTION TIMES
FOR 1 ML of OIL

GREASE AND MOISTURE ABSORBING INSERTS FOR MICROWAVE COOKING

CROSS-REFERENCE TO RELATED APPLICATION

This application is a continuation-in-part of application Ser. No. 812,933, filed Dec. 24, 1991, now abandoned.

FIELD OF THE INVENTION

This invention relates to inserts useful in microwavable containers. The invention can further comprise fibers which are capable of spontaneously transporting fluid on the surface thereof.

BACKGROUND OF THE INVENTION

There is a need in the microwave food industry for inserts useful in microwavable containers that are more efficient in removing excess grease and moisture from food during cooking in a microwave oven.

A wide variety of inserts useful in microwavable food containers have been developed to improve the quality of food cooked in a microwave oven. For instance, it is known to place a liquid absorbent pad within a package for absorbing food byproducts such as moisture and grease exuded from food during cooking in a microwave oven (U.S. Pat. No. 4,873,101). Such pads must not only provide sufficient capacity for the quantity of food byproducts produced during cooking, but must withstand the elevated temperatures required to adequately cook the precooked or cured foods discussed above without degradation.

Similarly, U.S. Pat. Nos. 4,954,356 and 4,857,342 disclose a microwavable package for storing and cooking a food product including an absorbent bed enclosed within a sealed plastic sleeve. Also, U.S. Pat. No. 4,950,524 discloses a bacon pad made of liquid absorbent wood fibers. U.S. Pat. No. 4,786,513 discloses a package of sliced bacon containing an absorbent blotter means.

U.S. Pat. No. 4,873,101 discloses a package of food containing a substantial amount of water and solidified grease that can be cooked within the package in a microwave oven. The package further comprises a pad adjacent the food comprising microwave radiation transparent generally hydrophobic liquid grease absorbing materials that are capable of holding the amount of grease in the food when it is melted.

U.S. Pat. No. 5,094,869 describes a food degreaser which uses a layer of absorbent fiber on the inside of a wicking material envelope.

Other known grease absorbing pads have been found to be useful, such as the insulating product which is sold under the trade designation "Thinsulate" by Minnesota Mining and Manufacturing Company, St. Paul, Minn., in densities of 40, 100 and 200 grams/$m^2$ and absorbs or holds about 15, 16 and 9½ times its own weight of grease, respectively; the products sold under the trade designation "Oil Sorbent" and "Insorb Industrial Wipe" by Minnesota Mining and Manufacturing Company, St. Paul, Minn., which have densities of about 36 and 70 grams/$m^2$, respectively, and absorb or hold about 14 and 8 times their own weight in grease, respectively.

For example, in U.S. Pat. No. 4,865,854 pads of blown microfibers are described which are constructed of a composition comprising a blend containing substantially equal parts by weight of polypropylene and poly 4-methylpentene-1 (PMP), 0.16 cm (0.062 inch) in thickness and thermally embossed on both sides with a 0.40 cm (0.156 inch) hexagonal pattern and having densities in the range of nine and one half (9½) to six (6) times their weight in grease.

However, conventional absorbent pads absorb both water and various greases from the food. This is undesirable in that if part of the absorbent capacity of the pad is occupied by moisture, insufficient capacity may remain for grease.

It is also desirable in many cases for water exuded from a food in the form of steam during cooking to be maintained in close proximity to the food as to evenly distribute heat within the package and to reduce the cooking for the food. An additional problem occurs during extended storage and transportation of a package containing a food having substantial amounts of water and grease. A pad that absorbs water as well as grease will tend to gradually absorb water from the food. Thus, a subsequent measurement will show that the weight of the food has been reduced compared to the weight at the time the package was sealed.

Therefore, there is a need in the art to find new microwavable inserts which show improvement over the standard microwavable inserts that are useful in microwavable food containers. This is true especially in the area of optimization of grease or moisture transport depending on whether the food is prone to greasiness or a combination thereof.

Also disclosed in the art are microwavable inserts comprising a plastic film with a thin metal coating or "metallized film". The metallized film is generally used in direct contact with a food item. Part of the microwave energy passes through to heat the food item dielectrically while part is converted to heat by the metallized film to sear the coating in contact therewith. U.S. Pat. No. 4,703,148 describes this particular art in detail.

Also known in the art are microwavable inserts having two layers, the first of which is a top layer consisting of an absorbent layer made from fibers, the second of which is a metallized susceptor layer. These inserts are known as "Wavealites".

In copending application Ser. No. 736,267, continuation-in-part of U.S. Ser. No. 333,651, now abandoned, fibers are disclosed which are capable of spontaneously transporting water and other hydrophilic fluids on their surfaces. Additionally, other fibers of sufficient chemical composition and geometry are capable of spontaneously transporting n-decane and other hydrophobic fluids. Such fibers will be referred to herein as "spontaneously transportable fibers" or, alternatively, "spontaneously wettable fibers." We have unexpectedly discovered that use of fibers of sufficiently complex geometry, especially spontaneously transportable fibers, when incorporated into microwavable cooking structures, results in improved wetting and aids in aqueous and/or nonaqueous transport of fluids released during microwave cooking with appropriate surface energetics.

SUMMARY OF THE INVENTION

The needs in the art noted above are met with the present invention which relates to an insert useful in a microwavable food container comprising first and second outer layers, and an intermediate layer between and bonded to said first and second outer layer, wherein said first outer layer comprises a plastic layer further comprising openings and is in position to be adjacent to food, 14, in said container, said intermediate layer comprises an absorbent material comprising fibers, and said second outer layer is a substrate which is stable to microwave heating conditions. The first outer layer can, preferably, comprise a metallized coating of heat susceptor thickness.

The invention also relates to an insert useful in a microwavable food container comprising a first layer and a second layer bonded thereto, wherein the first layer comprises a plastic layer, and the second layer comprises absorbent material comprising fibers and is in position to be adjacent to food in said container, wherein said second layer comprises at least one fiber having at least one continuous groove oriented axially along the fiber wherein said fiber satisfies the following equation:

$$(1 - X \cos \theta_a) < 0$$

wherein $\theta_a$ is the advancing contact angle of water measured on a flat film made from the same material as the fiber and having the same surface treatment, if any, X is a shape factor of the fiber cross-section that satisfies the following equation:

$$X = \frac{P_w}{4r + (\pi - 2)D}$$

wherein $P_w$ is the wetted perimeter of the fiber and r is the radius of the circumscribed circle circumscribing the fiber cross-section and D is the minor axis dimension across the fiber cross-section. The plastic layer can, preferably, comprise a metallized coating of heat susceptor thickness.

The invention also relates to an insert wherein said second layer comprises at least one fiber having at least one continuous groove oriented axially along the fiber wherein said fiber satisfies the following equation:

$$(1 - X \cos \theta_a) < 0$$

wherein $\theta_a$ is the advancing contact angle of n-decane measured on a flat film made from the same material as the fiber and having the same surface treatment, if any, X is a shape factor of the fiber cross-section that satisfies the following equation:

$$X = \frac{P_w}{4r + (\pi - 2)D}$$

wherein $P_w$ is the wetted perimeter of the fiber and r is the radius of the circumscribed circle circumscribing the fiber cross-section and D is the minor axis dimension across the fiber cross-section.

The invention further relates to an insert useful in microwavable food container comprising an absorbing pad. The pad further comprises microwave radiation transparent and grease absorbing fibers wherein at least one fiber has at least one continuous groove oriented axially along the fiber and wherein the fiber has a cross-section having a shape factor X that satisfies the equation or formula as described above.

For some of the fibers useful in the present invention, it is preferred that X is greater than 1.2, more preferably greater than about 2.5, most preferably greater than about 4. Also, it is preferred that 2r/D is greater than 1. It is more preferred that 2r/D be between 1.5 and 5.

For fibers to be able to spontaneously wet one fluid and not another, X must lie between the minimum required values for X for the two fluids. For example, to have a fiber with no lubricant which will spontaneously transport canola oil and not water requires an X-factor higher than 1.09 but lower than 2.75.

For the fibers that spontaneously transport water, it is preferred that the fiber of the invention satisfies the formula:

$$\gamma_{LA} \cdot \frac{12\pi \cdot 10^{-4}}{\sqrt{\rho}} \cdot \sqrt{dpf} \cdot (1 - X \cos \theta_a) \leq -0.3,$$

wherein $\gamma_{LA}$ is the surface tension of water in air in dynes/cm, $\rho$ is the fiber density in grams/cc, and dpf is the denier of the single fiber.

For the fibers that spontaneously transport n-decane, it is preferred that the fiber of the invention satisfies the formula:

$$\gamma_{LA} \cdot \frac{12\pi \cdot 10^{-4}}{\sqrt{\rho}} \cdot \sqrt{dpf} \cdot (1 - X \cos \theta_a) \leq -0.3,$$

wherein $\gamma_{LA}$ is the surface tension of n-decane in air in dynes/cm, $\rho$ is the fiber density in grams/cc, and dpf is the denier of the single fiber.

BRIEF DESCRIPTION OF THE DRAWINGS

FIG. 9—illustration of the behavior of a drop of an aqueous fluid which has just contacted a fiber that is spontaneously transportable at time=0. The arrows labelled "LFA" indicate the location of the liquid-fiber-air interface.

FIG. 10—illustration of the behavior of a drop of an aqueous fluid on a fiber that is spontaneously transportable at time=$t_1$ ($t_1 > 0$). The arrows labelled "LFA" indicate the location of the liquid-fiber-air interface.

FIG. 11—illustration of the behavior of a drop of an aqueous fluid on a fiber that is spontaneously transportable at time=$t_2$ ($t_2 > t_1$). The arrows labelled "LFA" indicate the location of the liquid-fiber-air interface.

FIG. 42—a schematic representation of Spinneret I1039 wherein the spinneret holes are oriented in a radial pattern on the face of the spinneret. All dimensions are in units of inches except those containing the letter "W".

DETAILED DESCRIPTION OF THE PREFERRED EMBODIMENTS

Figure 1:
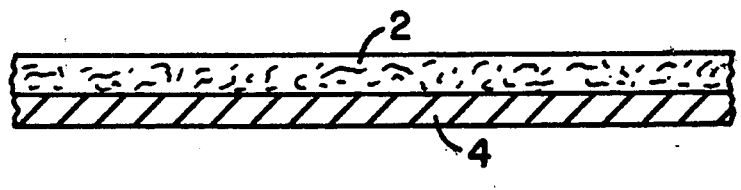
FIG. 1—an enlarged cross-sectional view of a preferred embodiment of the invention, i.e., Insert B, as described herein.

The invention relates to an insert useful in a microwavable food container comprising first and second outer layers and an intermediate layer bonded thereto, and a third outer layer bonded to said second layer wherein said first outer layer comprises a plastic layer, 8, 12 and 26, further comprising openings 6 and 28, said plastic layer being in position to be adjacent to food, 14, in said container, said intermediate layer, 10 and 30, comprises an absorbent material comprising fibers, and said second outer layer, 16 and 32, is a substrate layer which is stable to microwave heating conditions. This insert is hereinafter referred to as "Insert A". The plastic layer may comprise polyester, nylon or the like. Preferably, the plastic layer is made from polyolefins, such as polypropylene or polyethylene. Preferred examples useful in making the plastic layer are heat set polyesters such as polyethylene terephthalate. Further examples are Mylar polyethylene terephthalate film sold by Du Pont or THERMX polyester sold by Eastman Kodak Company. THERMX is a polyester film comprising a copolyester of terephthalic acid and isophthalic acid with 1,4-cyclohexanedimethanol.

The thickness of the plastic layer can be readily determined by one skilled in the art.

In a preferred embodiment, the plastic layer comprises a metallized layer of heat susceptor thickness.

The metallized layer is a microwave interactive layer which has been incorporated into disposable laminate materials used to cook the food. Such laminates are characterized by their ability to absorb microwave energy and convert it to heat which may be conductively and radiantly transmitted to the food. Semiconductive materials, ferro-magnetic metals, metal oxides, and thin elemental metals are some of the materials used to form the microwave interactive layer. The metallized layer may comprise any electroconductive metal which is capable of converting microwave energy to thermal energy in the form of thin films. The method of forming the metal film comprises any convenient film-forming procedure, consistent with the metal employed. For example, for aluminum conventional vapor deposition is the most convenient. Other materials, such as copper, stainless steel, tin oxide, chromium, magnesium, silver and gold can be used. However, aluminum is very inexpensive and has been widely used in the form of aluminum foil as far as the general packaging of food is concerned.

The plastic layer is in direct physical contact with food providing the maximum amount of heat transfer and browning. Such contact is maintained by the construction and sizing of the container to provide holding pressure in view of the size of the food pieces to be packaged and optionally spacers. Such intimate contact is important to the heating and crisping benefits provided by the present invention.

For Insert A, the susceptor layer or plastic layer contains a perforation feature comprising a plurality of openings therethrough or a perforated sheet, which allows escape or release of any oil or moisture vapor which the food pieces release during heating. The openings may be formed by any method known in the art, such as needle punch or calender roll. The openings may be in the form of an organized array as depicted or may be randomly although preferably evenly distributed. The openings can be modified either by hole density, size, or placement to add further control over grease and moisture drainage.

The openings may have an effective diameter in the range of 0.5 mm to 5 mm. They may be shaped in any fashion including circular or elongated. Openings elongated in shape typically have a major axis length of about ¼ to about ½ inch and a minor axis of less than 2 mm.

The openings allow oil and/or moisture released during microwave heating to be absorbed by the panel or drain therethrough and thus drawn away from the portions thereby further reducing the undesirable softening of the coating and oiliness of the final product as well as substantially reducing excessive oil buildup and heating on the heating panels and thus reduces both spattering and the generation of undesirable burned oil flavor. Also, the oil drainage is important since released oil in contact with the heating panel absorbs excessive amounts of the heat generated which in turn can result in uneven browning.

Preferred for use herein as the heating layer are the metallized films described in U.S. Pat. No. 4,267,420 (issued May 12, 1981 to W. A. Brastad) or, less desirably, in U.S. Pat. No. 4,258,086 (issued Mar. 24, 1981 to N. J. Beall) each of which are incorporated herein by reference. These materials are widely known and a variety of suitable materials are available from, for example, the 3M Co., James River or from Deposition Technology Inc. (San Diego, Calif.). The metallized layer comprises a plastic sheet or thin films 20, which typically has a thickness of approximately 0.005 to 0.001 inch. The plastic film, 20, is made from a polyester. The plastic sheet or thin film, 20, has applied thereto a very thin coating, 22, having a surface resistivity of approximately about 1 to 300 ohms per square inch, and preferably about 1 to about 10 ohms per square inch when aluminum is the applied metal. It will be understood that a resistivity of 1 ohm per square denotes a heavier or thicker coating than a coating of the same material having a 10 ohms per square resistivity. The greater the resistivity, the more microwave energy which is converted to heat. The practical upper limit to the resistivity is determined by the scorch temperature of the mounting board and the plate separation as described below.

By the terminology, "heat susceptor thickness" it, is intended that the thickness of the metal film should be such that the metal film converts a portion of microwave energy incident thereon to thermal energy. The thickness varies with the metal employed. For aluminum, the metal film generally has a thickness corresponding to an optical density of about 0.08 to about 0.8. In any event, the amount of susceptor material(s) must be adequate to allow said materials to absorb a portion of both the electric and the magnetic components of said microwave energy and convert said energy to heat to rapidly brown or crispen the surface of the foil item adjacent thereto without substantially impeding the ability of the microwave energy to penetrate the susceptor material and cook the food item.

Various methods may be used to measure the amount of susceptor coated on or imbibed in the substrate material to form the composites of this invention. To quantify the amount of metal coated on a film, for example, D.C. surface resistivities are commonly used. Optical density measurements may also be used.

A number of methods may be used to apply the susceptor materials to the substrate.

It will be appreciated that the specific resistance of a coating is susceptible to variation and that within limits the thicker such coating is the less pervious or more opaque it is the passage of microwave energy therethrough. Hence, in order to promote a greater degree of browning, the coating would be thicker than when a less degree of browning is desired, In this way, the browning or crisping can be correlated with the actual dielectric heating of the food piece.

Because of the thinness of the material constituting the coating, it has very little thermal mass. Thicknesses of only 0.5 to $20 \times 10^{-6}$ inch can be readily realized. The thickness, of course, is correlated with the resistivity, and whatever coating material that is selected should have a thickness such as to provide a surface resistivity falling within the range hereinbefore given.

If desired, an additional protective sheet or film of plastic can be laminated onto the side of the metallized layer which is coated with metal. In this instance, the top protective film is preferably of polyester, having substantially the same thickness and properties as the plastic sheet or thin film comprising the metallized layer.

In another preferred embodiment, the metallized layer as described above is substituted by a heating body further comprising a supporting sheet and a non-metal active microwave absorber which has been applied to said supporting sheet.

Materials useful in substituting for the metallized layer, 22, are described in U.S. Pat. No. 4,190,757 (issued Feb. 26, 1980 to C. H. Turpin) incorporated herein by reference. In U.S. Pat. No. 4,190,757, a heating body is described which also comprises a supporting sheet to which an active microwave absorber has been applied. The microwave absorber should be applied in a relatively thin paint-like layer, 22. The absorber can be any of the four groups of materials including semi-conductors, selected ferromagnetic materials, period 8 oxides and selected dielectric materials (graphite, carbon black, iron oxide or ferrite). These particles are dispersed in a nonmetallic (e.g., polymeric) binder which deposit has a thickness within the range from 10 to 300 micrometers, with the particles comprising at least 10% by weight of the deposit as is taught in U.S. Pat. No. 4,640,838 incorporated herein by reference.

The metal-coated material may be selectively demetallized to provide a pattern of metal of desired form. Suitable selective demetallization procedures are described in U.S. Pat. Nos. 4,398,994, 4,552,614 and 4,610,755. The metal-coated material next can be adhered to a nonconductive sheet. This sheet may comprise structural fibrous stock material, 24, particularly paper or paperboard by conventional laminating procedures using a suitable laminating adhesive, such as a thermosetting resin. It may also be adhered to the fibrous stock material, 24, by using thermal bonding techniques known in the art.

Patches of microwave interactive material can be formed on a web of plastic. This web can be laminated to one side of a web of structural stock material to form a composite web having a plastic layer and a structural stock material layer so that the microwave interactive material is sandwiched between the web of plastic and the web of structural stock material.

The microwave interactive layer is bonded to and arranged to cover entirely one of the surfaces of a semi-rigid, microwave transparent material, such as paperboard.

In a preferred bonding process, a lamination process can be used wherein the metal side of the susceptor or microwave interactive layer is bonded to paperboard using an adhesive in the same manner that a conventional susceptor is understood by a person of ordinary skill in the art to be bonded to paperboard.

"Microwave heating conditions" generally include temperatures generally as high as 110° C. and above,.

"Susceptor materials" are materials which are capable of absorbing the electric or magnetic portion of microwave field energy to convert that energy to heat.

The fibers useful in the present invention have a complex cross-section geometry that results in a surface area that allows for more efficient wetting of the fiber, aqueous or grease transport or a combination of grease and moisture absorption if the appropriate surface energetics are applied. By "surface energetics" it is meant that the fibers useful in the invention must satisfy the requirements of the equations described herein which apply to "spontaneously transporting" fibers. The fibers are preferably spontaneously transportable. The preferred fibers are ones having a hydrophilic lubricant applied thereto or intermittently therein and that are capable of spontaneous transporting of water on the surfaces thereof. Similarly, preferred fibers are also ones having a hydrophobic lubricant applied thereto or intermittently therein and that are capable of spontaneously transporting n-decane on the surfaces thereof.

In particular, some of the fibers useful in the present invention preferably have at least one continuous groove oriented axially along the fiber wherein said fiber satisfies the following equation:

$$(1 - X \cos \theta_a) < 0$$

wherein $\theta_a$ is the advancing contact angle of water measured on a flat film made from the same material as the fiber and having the same surface treatment, if any, X is a shape factor of the fiber cross-section that satisfies the following equation:

$$X = \frac{P_w}{4r + (\pi - 2)D}$$

wherein $P_w$ is the wetted perimeter of the fiber and r is the radius of the circumscribed circle circumscribing the fiber cross-section and D is the minor axis dimension across the fiber cross-section.

It is also preferred that some of the fibers useful in the present invention have at least one continuous groove oriented axially along the fiber wherein said fiber satisfies the following equation:

$$(1 - X \cos \theta_a) < 0,$$

wherein $\theta_a$ is the advancing contact angle of n-decane measured on a flat film made from the same material as the fiber and having the same surface treatment, if any, X is a shape factor of the fiber cross-section that satisfies the following equation:

$$X = \frac{P_w}{4r + (\pi - 2)D}$$

wherein $P_w$ is the wetted perimeter of the fiber and r is the radius of the circumscribed circle circumscribing the fiber cross-section and D is the minor axis dimension across the fiber cross-section.

The second outer layer is selected from the group consisting of a plastic film layer, paper or paperboard. A plastic film layer is preferred. More preferably, the films can be made from polyolefins, such as polypropylene or polyethylene. Preferred polyesters useful in making the plastic film layer are heat set polyesters such as heat set PET. Further examples are Mylar sold by DuPont or THERMX sold by Eastman Kodak Company. Also, nylon could be used to form the plastic film layer.

The second outer layer prevents leakthrough and helps spontaneous transport by providing extra wettable surface area. Preferably, the second outer layer is bonded to the intermediate layer. The bonding could either be by thermal methods or cohesive methods as described herein.

The first outer and intermediate layers are bonded together either by any adhesive known in the art or by thermal bonding procedures known in the art. The preferred bonding procedure is described by Veratec, Inc. and disclosed in EP-A-0360 929 A1. The thermal embossing technique includes films of polyethylene being secured to nonwovens while at the same time having apertures in the film for good fluid penetration.

The absorbent material of the intermediate layer comprises fibers. There are several factors which influence the flow of liquids in fibrous structures. The geometry of the pore-structure in the fabrics (capillarity), the nature of the solid surface (surface free energy, contact angle), the geometry of the solid surface (surface roughness, grooves, etc.), the chemical/physical treatment of the solid surface (caustic hydrolysis, plasma treatment, grafting, application of hydrophobic/hydrophilic finishes), and the chemical nature of the fluid all can influence liquid transport phenomena in fibrous structures.

The three important variables fundamental to the liquid transport behavior are (a) surface tension of the liquid, (b) wettability or the contact angle of the liquid with the solid, and (c) the geometry of the solid surface. Typically, the wettability of a solid surface by a liquid can be characterized by the contact angle that the liquid surface (gas-liquid interface) makes with the solid surface (gas-solid surface). Typically, a drop of liquid placed on a solid surface makes a contact angle, $\theta$, with the solid surface, as seen in FIG. 1A. If this contact angle is less than 90°, then the solid is considered to be wet by the liquid. However, if the contact angle is greater than 90° such as with water on Teflon surface, the solid is not wet by the liquid. Thus, it is desired to have a minimum contact angle for enhanced wetting, but definitely, it must be less than 90°. However, the contact angle also depends on surface inhomogeneities (chemical and physical, such as roughness, contamination, chemical/physical treatment of the solid surface, as well as the nature of the liquid surface and its contamination. Surface free energy of the solid also influences the wetting behavior. The lower the surface energy of the solid, the more difficult it is to wet the solid by liquids having high surface tension. Thus, for example, Teflon, which has low surface energy does not wet with water. (Contact angle for Teflon-water system is 112°.) However, it is possible to treat the surface of Teflon with a monomolecular film of protein, which significantly enhances the wetting behavior. Thus, it is possible to modify the surface energy of fiber surfaces by appropriate lubricants/finishes to enhance liquid transport. The contact angle of polyethylene terephthalate (PET), Nylon 66, and polypropylene with water is 80°, 71°, and 108°, respectively. Thus, Nylon 66 is more wettable than PET. However, for polypropylene, the contact angle is >90°, and thus is nonwettable with water.

The second property of fundamental importance to the phenomena of liquid transport is surface tension of the liquid.

The third property of fundamental importance to the phenomena of liquid transport is the geometry of the solid surface. Although it is known that grooves enhance fluid transport in general, it has been discovered as described in copending application Ser. No. 736,267, that particular geometries and arrangements of deep and narrow grooves on fibers and treatments thereof which allow for the spontaneous surface transport of aqueous fluids in single fibers. Thus preferred fibers for use herein are those with a combination of properties wherein an individual fiber is capable of spontaneously transporting water on n-decane its surface.

Also, the particular geometry of the deep and narrow grooves is very important, for example, grooves which have the feature that the width of the groove at any depth is equal to or less than the width of the groove at the mouth of the groove. If the preferred groove is not achieved, "bridging" of the liquid across the restriction is possible and thereby the effective wetted perimeter (Pw) is reduced. Of course, the fluid used to wet the fiber to determine the wetted perimeter (Pw) is reduced. Of course, the fluid used to wet the fiber to determine the wetted perimeter is, accordingly, water in the case of fibers which spontaneously transport water, and n-decane in the case of fibers which spontaneously transport n-decane. In any case, it is preferred that Pw is substantially equal to the geometric perimeter.

The number of continuous grooves present in the fiber of the present invention is not critical as long as the required geometry is present (i.e., the fiber satisfies the equation $(1-X \cos \theta_a) < 0$).

Typically there are at least 2 grooves present, and preferably less than 10.

Figure 2:
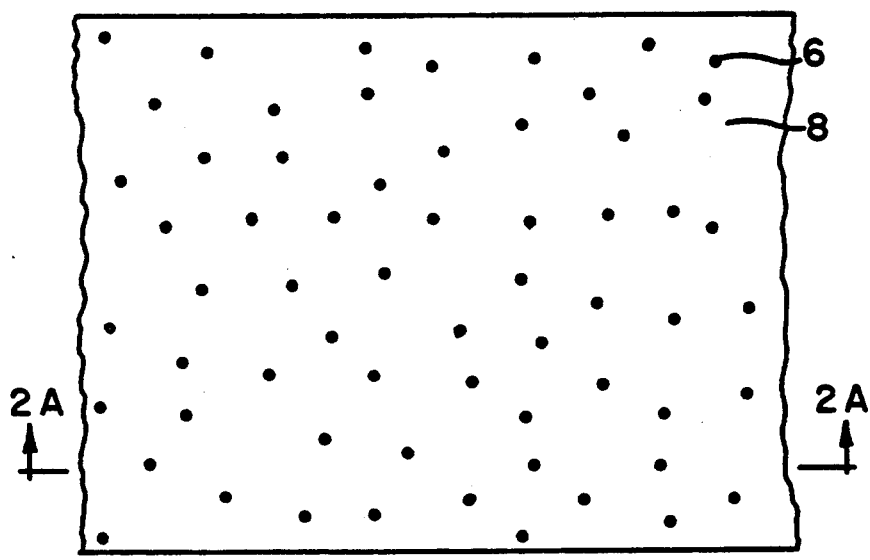
FIG. 2—a perspective view of a preferred embodiment of the invention, Insert A, as described herein.

"Spontaneously transportable" and derivative terms thereof refer to the behavior of a fluid in general and in particular a drop of fluid, such as water or n-decane, when it is brought into contact with a single fiber such that the drop spreads along the fiber. Such behavior is contrasted with the normal behavior of the drop which forms a static ellipsoidal shape with a unique contact angle at the intersection of the liquid and the solid fiber. It is obvious that the formation of the ellipsoidal drop takes a very short time but remains stationary thereafter. FIGS. 2A, 2B, and 2C illustrate spontaneous fluid transport on a fiber surface. The key factor is the movement of the location of the air, liquid, solid interface with time. If such interface moves just after contact of the liquid with the fiber, then the fiber is spontaneously transportable; if such interface is stationary, the fiber is not spontaneously transportable. The spontaneously transportable phenomenon is easily visible to the naked eye for large filaments (>20 denier per filament (dpf)) but a microscope may be necessary to view the fibers if they are less than 20 dpf. Colored fluids are more easily seen but the spontaneously transportable phenomenon is not dependent on the color. It is possible to have sections of the circumference of the fiber on which the fluid moves faster than other sections. In such case the air, liquid, solid interface actually extends over a length of the fiber. Thus, such fibers are also spontaneously transportable in that the air, liquid, solid interface is moving as opposed to stationary.

Spontaneous transportability is basically a surface phenomenon; that is the movement of the fluid occurs on the surface of the fiber. However, it is possible and may in some cases be desirable to have the spontaneously transportable phenomenon occur in conjunction with absorption of the fluid into the fiber. The behavior visible to the naked eye will depend on the relative rate of absorption vs. spontaneous transportability. For example, if the relative rate of absorption is large such that most of the fluid is absorbed into the fiber, the liquid drop will disappear with very little movement of the air, liquid, solid interface along the fiber surface whereas if the rate of absorption is small compared to the rate of spontaneous transportability the observed behavior will be that of wicking or transport as exemplified in FIGS. 2A through 2C. In FIG. 2A, a drop of aqueous fluid is just placed on the fiber (time=0). In FIG. 2B, a time interval has elapsed (time=$t_1$) and the fluid starts to be spontaneously transported. In FIG. 2C, a second time interval has passed (time=$t_2$) and the fluid has been spontaneously transported along the fiber surface further than at time=$t_1$.

Because the fibers useful in the invention achieve high fluid transport by varying the fiber cross-section, there are few if any limitations on the material used to make the fibers. Hybrids are also possible. This allows one to vary the fiber type to meet different packaging needs whether it be to maintain a homogenous packaging structure for recycling purposes (for example, the use of a cellulose-based fiber for an absorber in a paper tray package) or to meet certain cooking conditions such as very high oven temperatures.

The nature of the high fluid transport as opposed to high absorption will allow for the use of much less material. With the high fluid transport in the fibers useful in the invention, water or grease is rapidly pulled away from the food and distributed more evenly throughout the nonwoven, as opposed to being concentrated in just one spot on the absorber as is common with cellulose fluff and wood pulp absorbers. This sharing effect means that all the fiber put into the package will function towards fluid absorption and that very little is wasted. Also, absorber placement is not as critical since fluid will be transported to the rest of the pad anyway. If higher holding capacities are desired, lower denier, bulkier nonwovens can be used.

In order to resolve a possible problem of small fibers pulling out into the food when it is cooked, one can use a designed calender roll which will provide better, more uniform bonding of the fibers. Another method useful in the invention is the application of a spunbonded polyester layer to the top of the fiber nonwoven during calendering. This layer is made of continuous, small denier PET fibers and is very thin. It acts as a net to trap and hold the other fibers. Another advantage to the spun bonded layer is that calender bonding need not be as heavily compressed since the spun bonded layer acts to hold the fibers together. This improves transport and holding capacity.

It has been found that the type of fiber surface treatment can have a substantial impact on the effective adhesion tension. Adhesion tension is the product of the surface tension $\gamma$ and $\cos \theta_a$. We have found that certain surface treatments have the undesirable feature of reducing the effective surface tension of aqueous fluids such that it is substantially reduced from its theoretical potential. Thus, preferred surface treatments are those which result in the effective adhesion tension of the fluid to be transported to be as close to the theoretical adhesion tension as possible. The effective adhesion tension is measured by the method described in Example 22 hereof using the appropriate fluid. Preferred fibers of the invention have an effective adhesion tension in water of greater than 38 dynes/cm. More preferred is greater than 45 dynes/cm. Plasma treatment is a preferred surface treatment since the effective adhesion tension is close to the theoretical adhesion tension. It is not desired to be bound by any particular theory or mechanism; however, it is believed that for some surface treatments, such as use of potassium lauryl phosphate and/or PEG 600 monolaurate, a portion of the deposited surface treatment material partially solubilizes in the fluid, at least at the fluid/surface interface, substantially reducing the surface tension of the liquid, thereby reducing the effective adhesion tension but not substantially affecting the contact angle ($\theta_a$).

It has also been discovered that for a given vertical distance and linear distance to move the fluid, a given channel depth and a given adhesion tension, there is an optimum channel width which maximizes the uphill flux of the liquid being transported.

Figure 40:
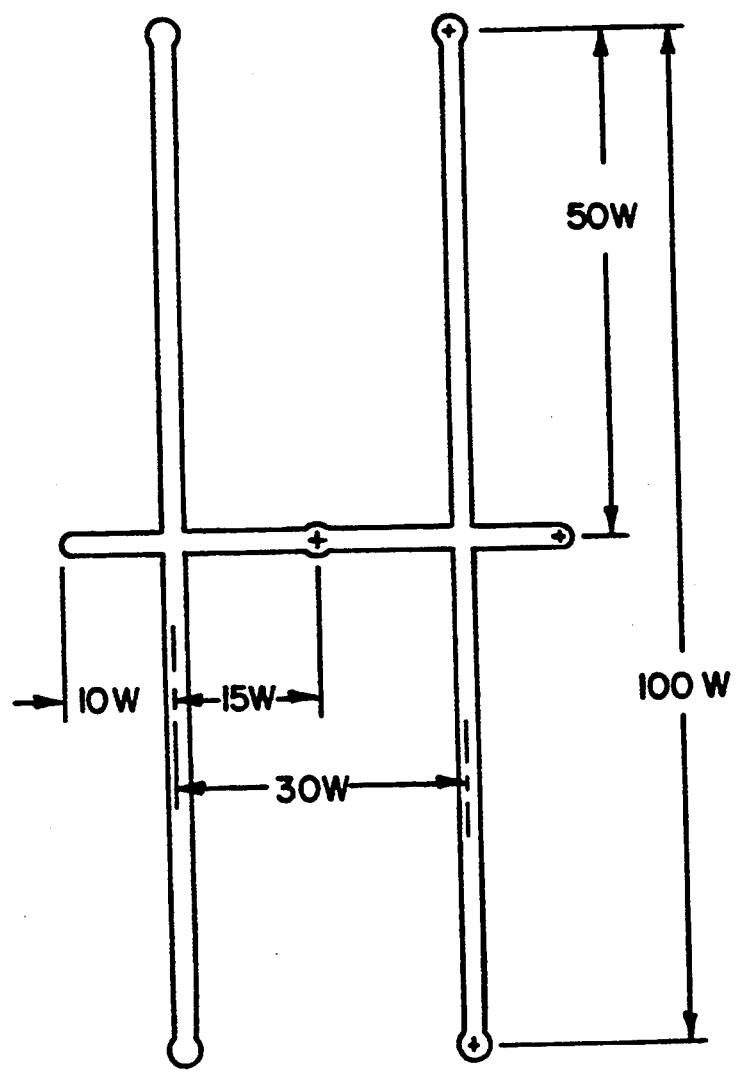
FIG. 40—a schematic representation of a spinneret having dimensions as specified.
Figure 41:
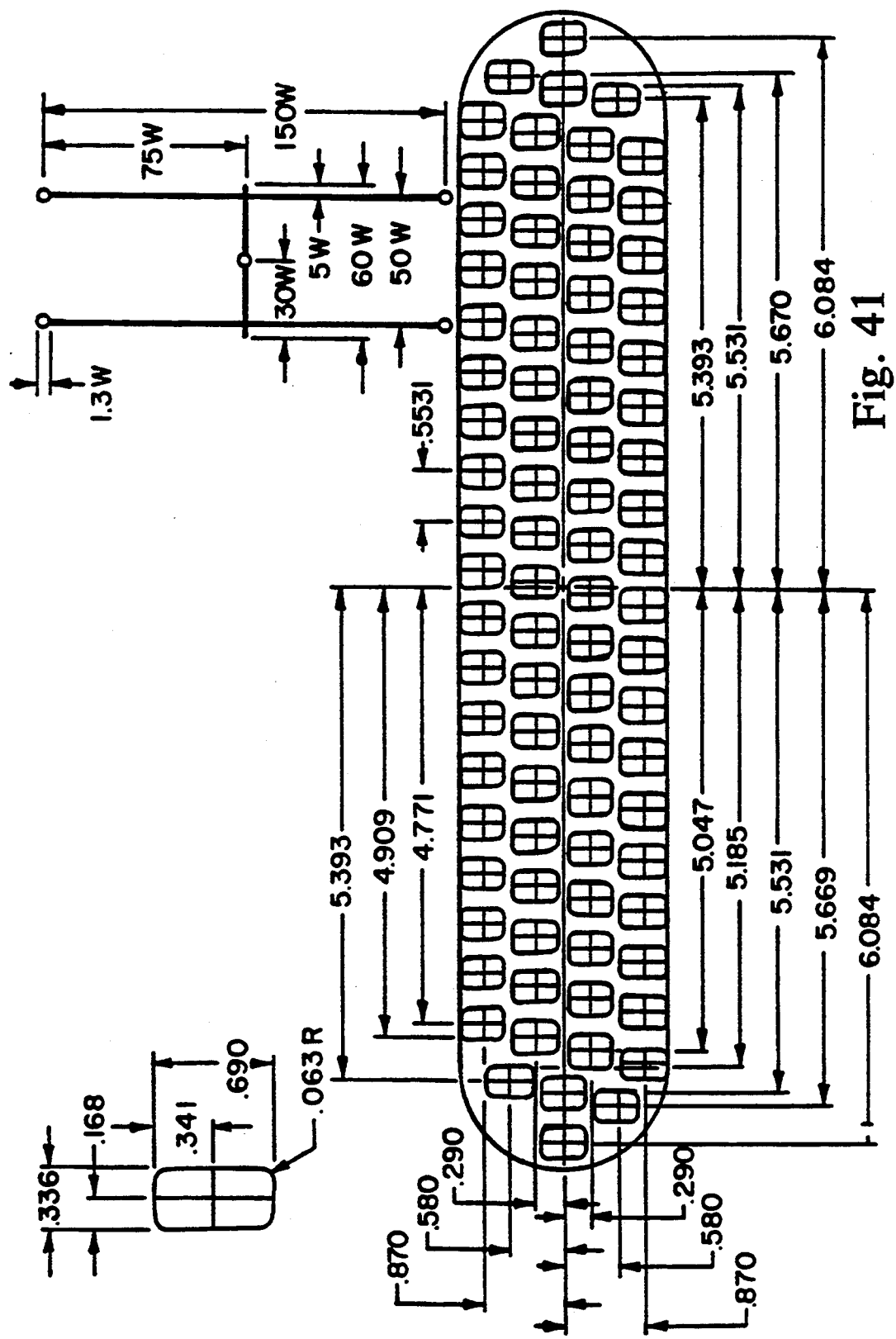
FIG. 41—a schematic representation of Spinneret I1045 wherein the spinneret holes are oriented such that the cross-flow quench air is directed toward the open end of the H. All dimensions are in units of inches except those containing the letter "W".
Figure 43:
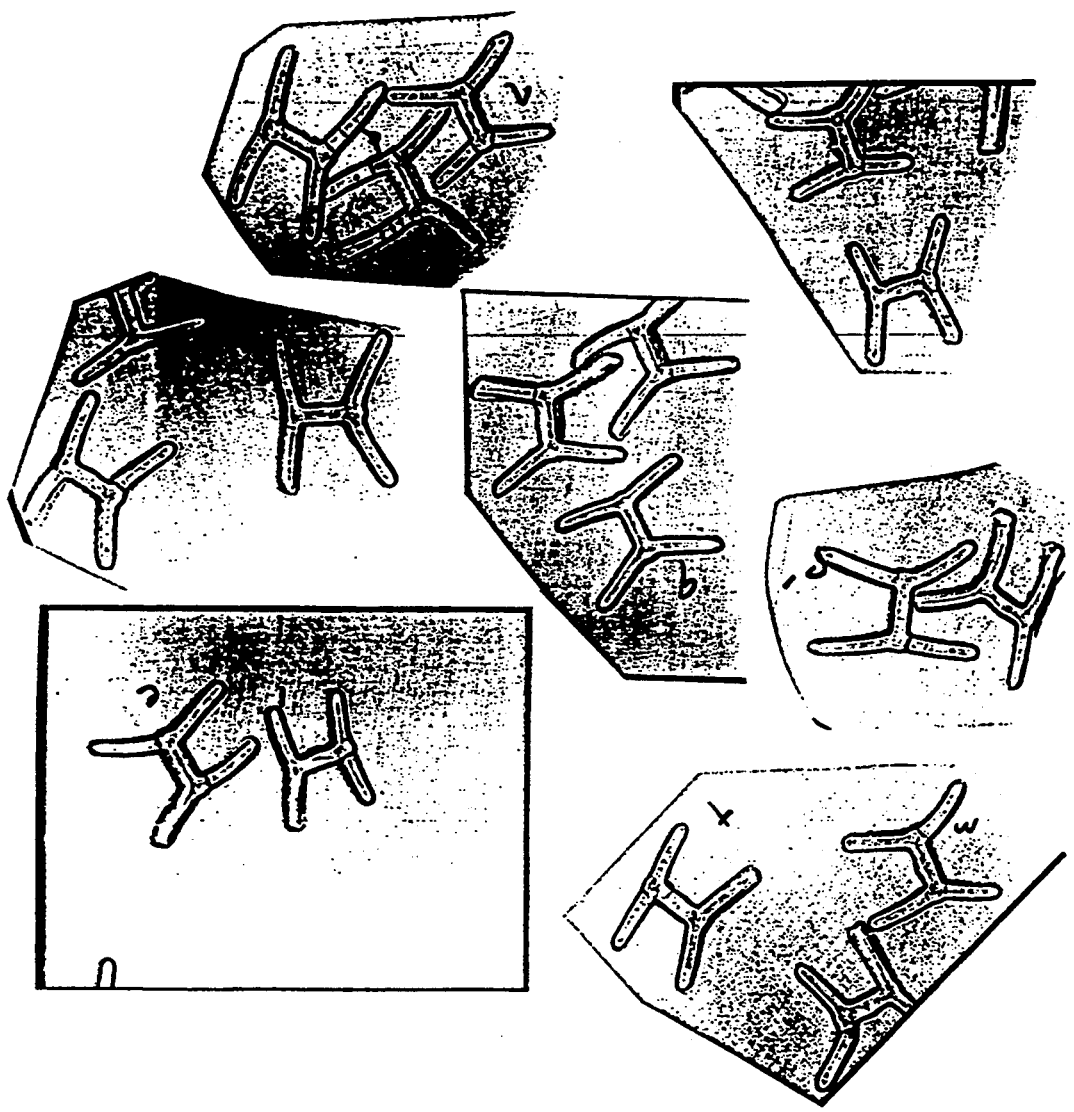
FIG. 43—a photomicrograph of a cross-section of a helically crimped fiber formed by the process of helically crimping a fiber of this invention wherein the fiber cross-section is not distorted.
Figure 44:
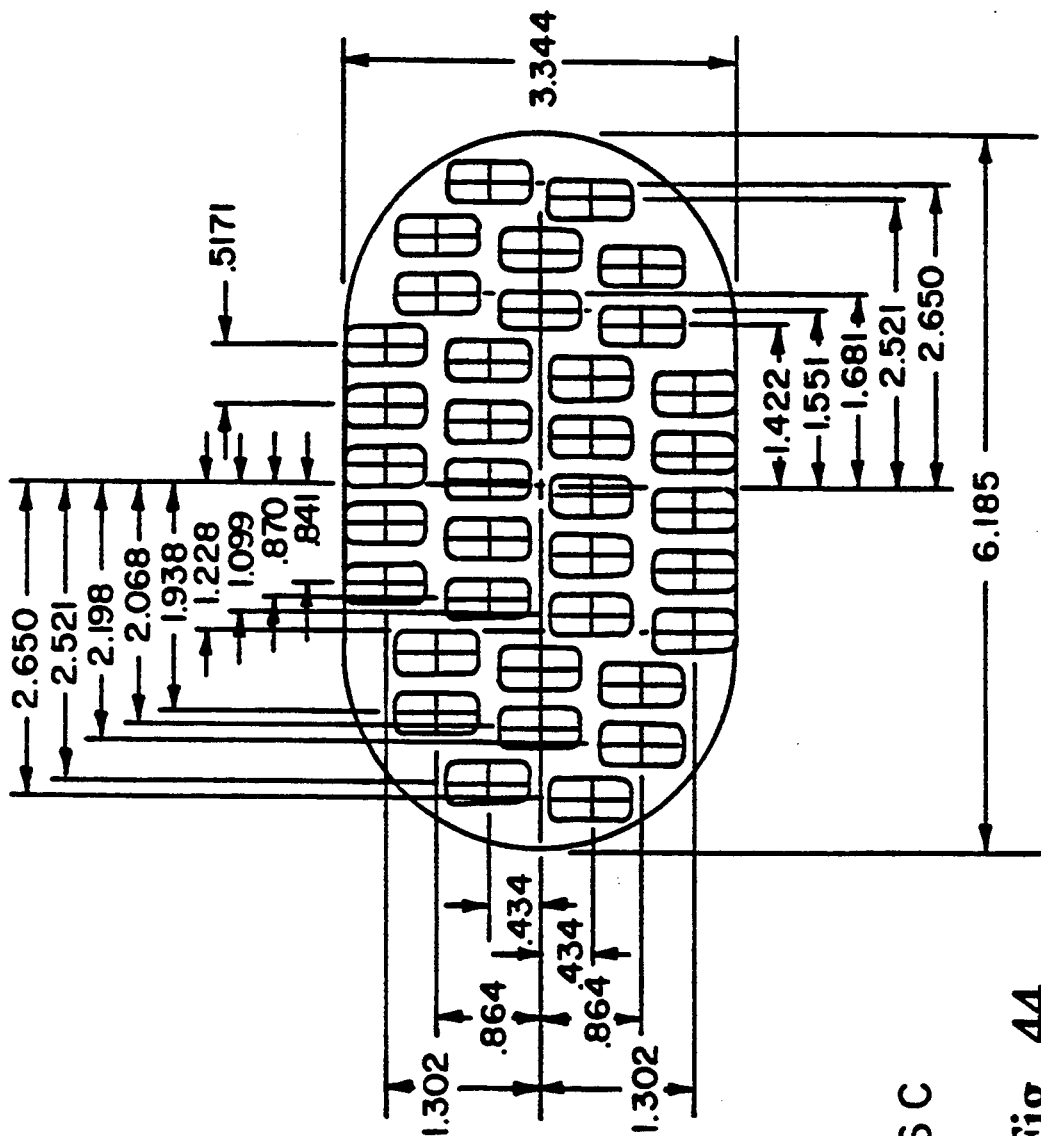
FIG. 44—a schematic representation of Spinneret I 1046 wherein the spinneret holes are oriented such that the cross-flow quench air is directed toward the open end of the H.
Figure 46:
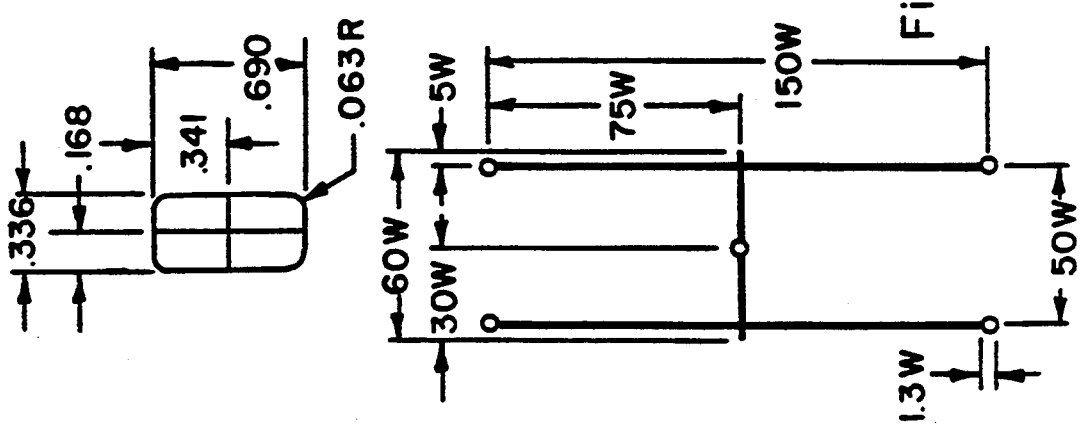
FIG. 46—a schematic representation of Spinneret 1047 wherein spinneret holes are oriented such that the cross-flow quench air was directed toward one side of the H.
Figure 45:
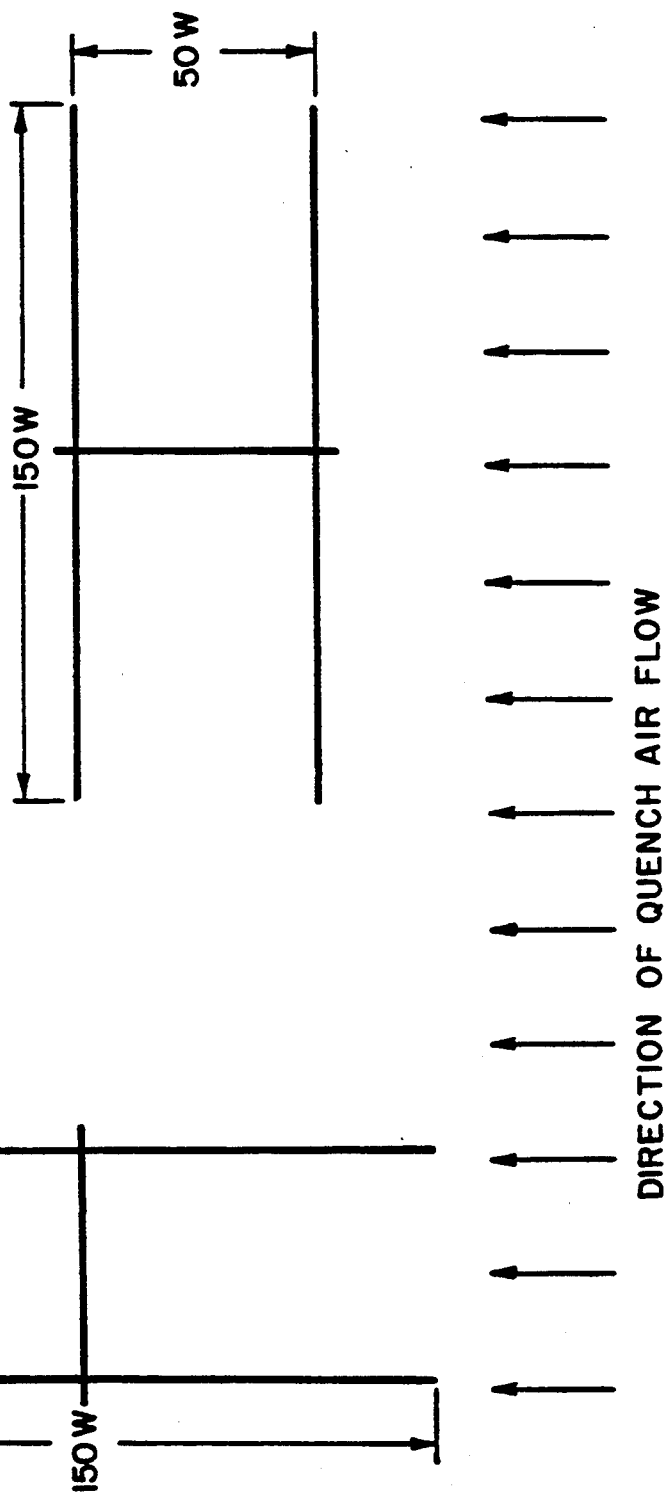
FIG. 45—a schematic representation of quench air direction relative to the spinneret holes.
Figure 46:
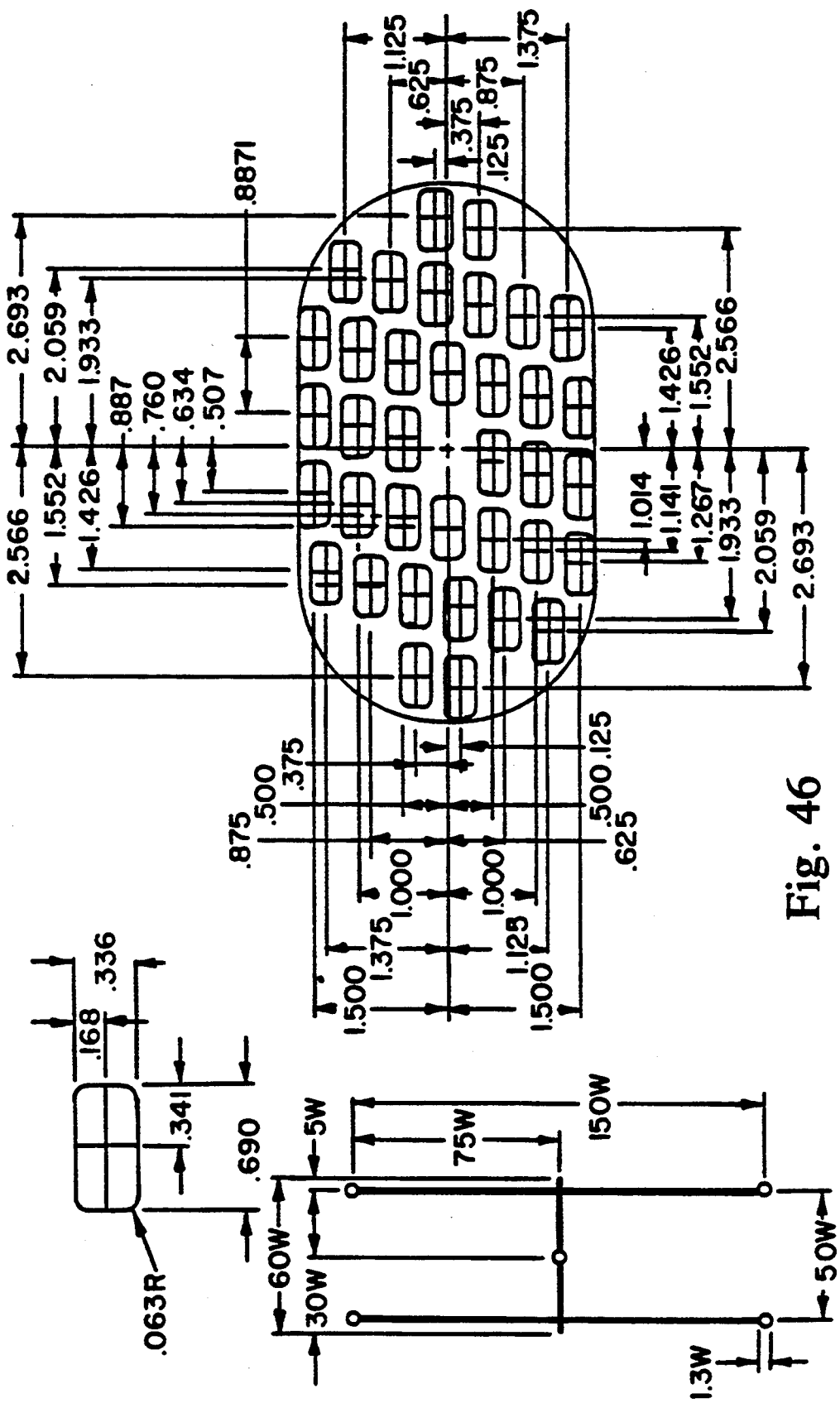
Figure 47:
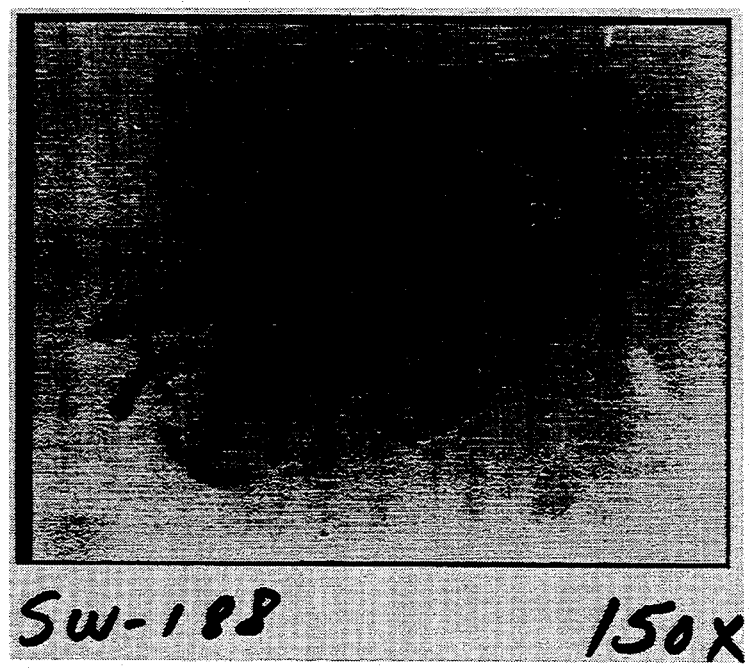
FIG. 47—a photomicrograph of helically crimped fibers of the invention without a distorted cross-section.
Figure 48:
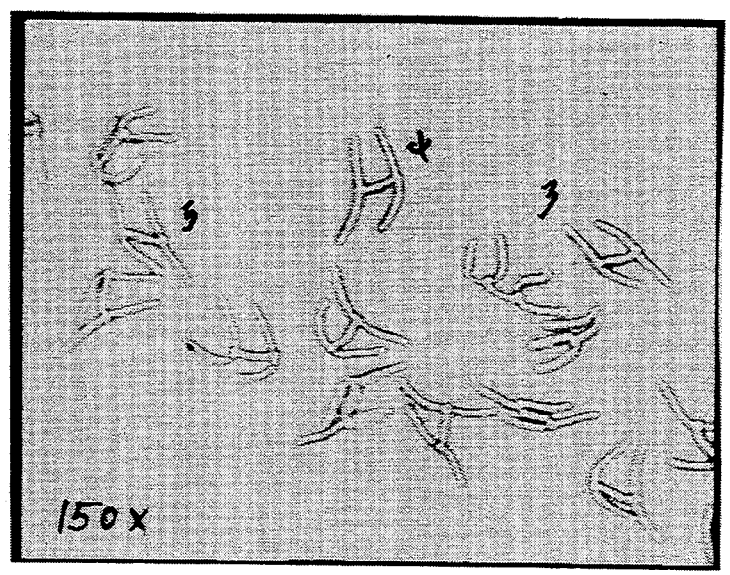
FIG. 48—a photomicrograph of stuffer box crimped fiber having a distorted cross-section.
Figure 49:
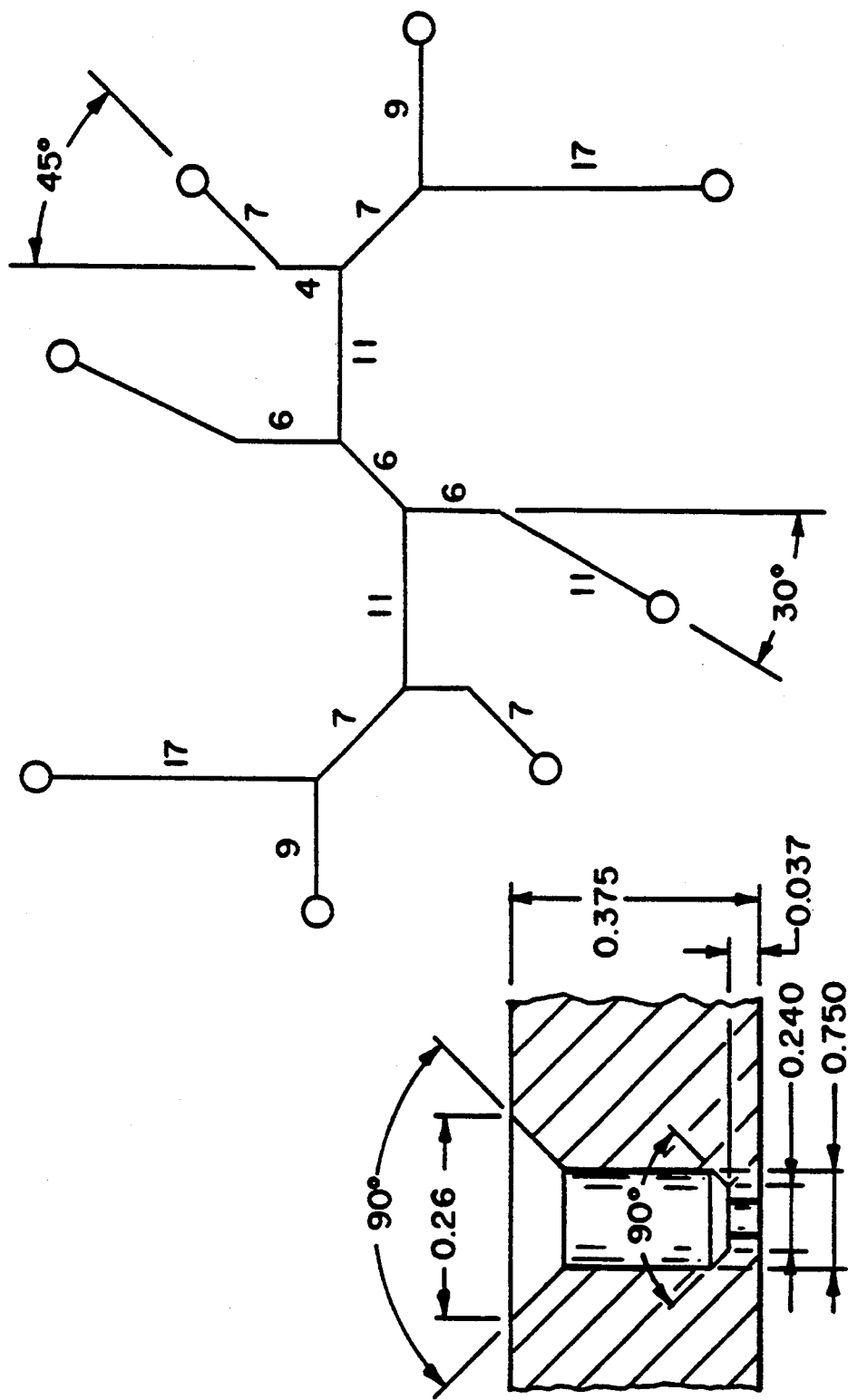
FIGS. 49 and 50—a schematic representation of a spinneret wherein the spinneret holes are oriented in a diagonal pattern on the face of the spinneret with cross-flow quenching directed toward the fiber bundle.
Figure 50:
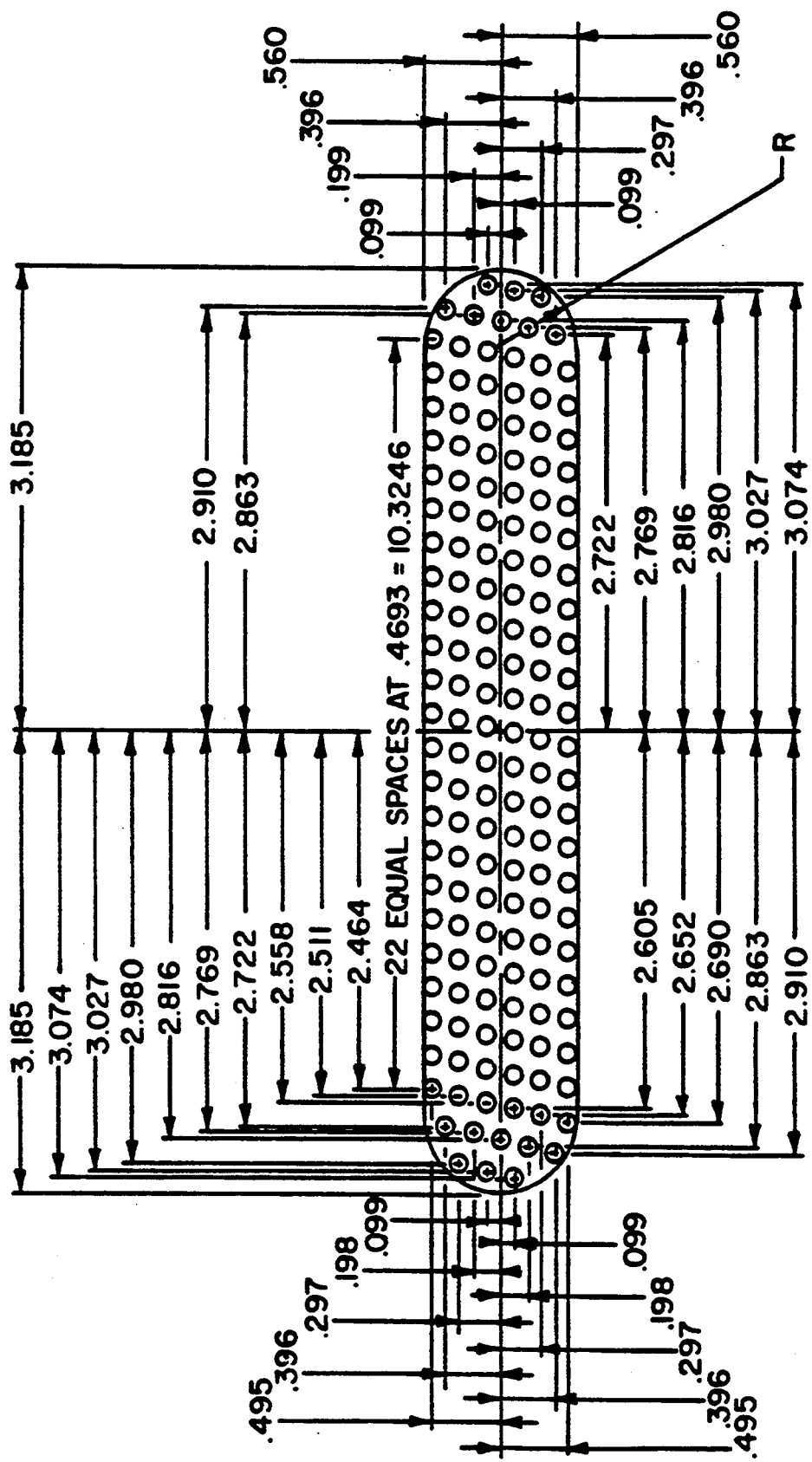
Figure 51:
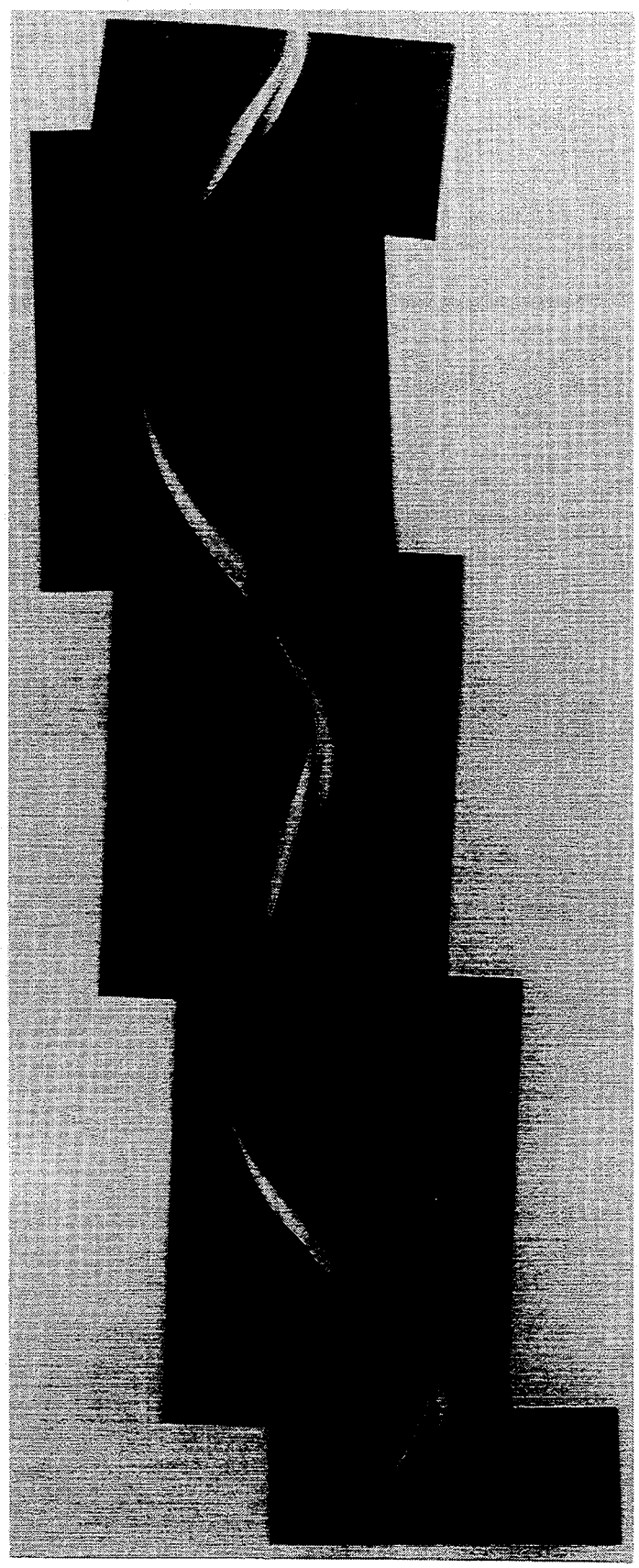
FIG. 51—a photomicrograph of a helically crimped fiber prepared by the process of the invention.

A fiber of the invention can be characterized as having one or more "channels" or "unit cells". For example, the fiber cross-section shown in FIG. 40 depicts a unit cell. A unit cell is the smallest effective transporting unit contained within a fiber. For fibers with all grooves identical, the total fiber is the sum of all unit cells. In FIG. 40 each unit cell has a height, H, and a width, W. $S_l$ is the leg thickness and $S_b$ is the backbone thickness. In addition to the specific dimensions of W and H, the other dimensional parameters of the cross-section are important for obtaining the desired type of spontaneous transportability. For example, it has been found that the number of channels and the thickness of the areas between unit cells, among other things, are important for optimizing the uphill flux value of the fiber. For obtaining a fiber cross-section of desirable or optimal fluid movement properties the following equations are useful:

$$q = \frac{W^2}{K\mu M_f} \cdot \frac{1}{l}\left(\alpha\gamma\rho\cos\theta - \beta\gamma\omega - \frac{\rho g h}{g_c} A\right) \times 3600$$

$$M_f = \rho_f A_f L_f, K = 12$$

$$A_f = \frac{1}{n}\left\{\left[(2H + S_b)\frac{S_l}{2} + W\frac{S_b}{2}\right]n + 2\left[(2H + S_b)\frac{S_l}{2} + e \cdot S_b\right]\right\}$$

$$p = 2H + W$$

$$\omega = \frac{\pi(90 - \theta)}{180\sin(90 - \theta)} \cdot W$$

$$h = l\sin\phi$$

$$A = H \cdot W - \frac{W^2}{4\sin(90 - \theta)}\left[\frac{\pi(90 - \theta)}{180\sin(90 - \theta)} - \cos(90 - \theta)\right]$$

-continued $$dpf = \rho_f A_f \cdot n \cdot (9000)(100)$$

wherein:
- q = flux (cm³/hr-gm)
- W = channel width (cm)
- μ = fluid viscosity (gm/cm-sec)
- $M_f$ = fiber mass per channel (gm)
- $\rho_f$ = fiber density (gm/cm³)
- $A_f$ = fiber cross-sectional area per channel (cm²)
- $L_f$ = total fiber length (cm)
- l = distance front has advanced along fiber (cm)
- α = adhesion tension correction factor (surface) (d' less)
- γ = fluid surface tension (dynes/cm - gm/sec²)
- p = wetted channel perimeter (cm)
- H = channel depth (cm)
- θ = contact angle (degrees)
- β = adhesion tension correction factor (bulk) (d' less)
- K = constant (d' less)
- ω = arc length along meniscus (cm)
- ρ = fluid density (gm/cm³)
- g = acceleration of gravity (cm/sec²)
- h = vertical distance (cm)
- $g_c$ = gravitational constant (d' less)
- A = fluid cross-sectional area per channel (cm²)
- n = number of channels (d' less)
- $S_b$ = fiber body or backbone thickness (cm)
- $S_l$ = fiber leg thickness (cm)
- e = backbone extension (cm)
- φ = fiber horizontal inclination angle (degrees)
- dpf = denier per filament (gm/9000 m)

The equation for q is useful for predicting flux for a channeled fiber horizontally inclined at an angle φ. This equation contains all the important variables related to fiber geometry, fiber physical properties, physical properties of the fluid being transported, the effects of gravity, and surface properties related to the three-way interaction of the surfactant, the material from which the fiber is made, and the transported fluid. The equations for $M_f$, $A_f$, p, ω, h, and A can be substituted into the equation for q to obtain a single functional equation containing all the important system variables, or, for mathematical calculations, the equations can be used individually to calculate the necessary quantities for flux prediction.

The equation for q (including the additional equations mentioned above) is particularly useful for determining the optimum channel width to maximize uphill flux (fluid movement against the adverse effects of gravity; sin φ > 0 in the equation for h). The equation for q is also useful for calculating values for downhill flux (fluid movement enhanced by gravity; sin φ < 0 in the equation for h) for which there is no optimum channel width. Obviously, horizontal flux can also be calculated (no gravity effects; sin φ = 0). The equation for q and the equations for p, A, and $A_f$ were derived for a fiber containing one or more rectangularly-shaped channels, but the basic principles used to derive these equations could be applied to channels having a wide variety of geometries.

A fiber of the present invention is capable of spontaneously transporting water on the surface thereof. Distilled water can be employed to test the spontaneous transportability phenomenon; however, it is often desirable to incorporate a minor amount of a colorant into the water to better visualize the spontaneous transport of the water, so long as the water with colorant behaves substantially the same as pure water under test conditions. We have found aqueous Syltint Poly Red from Milliken Chemicals to be a useful solution to test the spontaneous transportability phenomenon. The Syltint Poly Red solution can be used undiluted or diluted significantly, e.g., up to about 50× with water.

In addition to being capable of transporting water, a fiber of the present invention is also capable of spontaneously transporting a multitude of other aqueous fluids. Aqueous fluids are those fluids comprising about 50% or more water by weight, preferred is about 75% or more water by weight, most preferred is about 90% or more water by weight.

Another class of preferred fibers useful in the present invention is capable of spontaneously transporting n-decane on the surface thereof. As in the case of water as described hereinbefore, the n-decane can be colored for better visualization. In addition to being capable of spontaneously transporting n-decane, such a fiber is also typically capable of spontaneously transporting other hydrophobic fluids such as various types of grease, cyclohexane, xylene or α-pinene.

It is preferred that the fibers useful in the present invention have both a major and a minor axis of symmetry and that these fibers be helically crimped so that quenching by air occurs perpendicular to the major axis of the fiber. In particular, the process involves the following steps: extruding a conventional PET fiber forming polymer; passing the polymer through spinneret hole shapes; orienting said spinneret hole shapes to the cross-flow quench air so that quenching occurs perpendicular to the major axis of the fiber; controlling the quench air; applying hydrophilic lubricants; taking up the fibers at conventional speeds; drafting the fibers using conventional drafting (single steam stage in steam or two stage in water and steam); adding an additional amount of hydrophilic lubricant; and relaxing the drawn fibers in a heated chamber to develop the helical crimp.

The full development of the helical crimp in the fibers useful in the present invention is realized by relaxing the fibers in heat. The temperature of the heating step is above the $T_g$ of the fibers. Also, it appears that the helical crimp is formed due to differences in the orientation of the fiber across the diameter of the cross section. This difference in orientation is built into the fiber by following the steps listed in the process previously described. The higher the difference in orientation, the more likely that the filament will form a helical crimp.

One method of determining the rate of fluid transport of a single fiber includes measuring single filament wetting perimeters as shown in Example 19 herein.

Particularly preferred hydrophilic lubricants which can be used to lubricate the fibers useful in this invention include the following:

(1) Lubricant (M) comprising 49% polyethylene glycol (PEG) 600 monolaurate, polyoxyethylene (13.64) monolaurate, 49% polyethylene glycol (PEG) 400 monolaurate, polyoxyethylene (9.09) monolaurate, and 2% of a 35% active 4-cetyl-4-ethylmorpholinium ethosulfate (antistat), hereinafter referred to as Lubriant M;

(2) Milease T sold by ICI Americas, Inc. which is a soil release agent comprising polyester, water, and other ingredients;

(3) Brij 35 sold by ICI Americas, Inc. which is a polyoxyethylene (23) lauryl ether;

(4) Brij 99 sold by ICI Americas, Inc. which is a polyoxyethylene (20) oleyl ether;

(5) G-1300 sold by ICI Americas, Inc. which is a polyoxyethylene glyceride ester, a nonionic surfactant;

(6) G-1350 sold by ICI Americas, Inc., a polyoxylenepolyoxypropylene sorbitan linoleic phthalic ester;

(7) a potassium lauryl phosphate based lubricant comprising about 70 weight % poly(ethylene glycol) 600 monolaurate; and (8) Lubricant (M) comprising 49% polyethylene glycol (PEG) 600 monolaurate, polyoxyethylene (13.64) monolaurate, 49% polyethylene glycol (PEG) 400 monolaurate, polyoxyethylene (9.09) monolaurate, 2% of a 20% active 4-cetyl-4-ethylmorpholinium ethosulfate (antistat), and a refrigerant, the lubricant hereinafter referred to as Raycalube.

The fibers of the present invention preferably have a surface treatment applied thereto. Such surface treatment may or may not be critical to obtain the required spontaneous transportability property. The nature and criticality of such surface treatment for any given fiber can be determined by a skilled artisan through routine experimentation using techniques known in the art and/or disclosed herein. A preferred surface treatment is a coating of a hydrophilic lubricant on the surface of the fiber. Such coating is typically uniformly applied at about a level of at least 0.05 weight percent, with about 0.1 to about 2 weight percent being preferred. Preferred hydrophobic lubricants include mineral oil based ones. A particularly preferred mineral oil based lubricant hereinafter referred to as Lubricant N comprises about 80–83% mineral oil, about 7–9% ethoxylated sorbitan monolaurate, about 9.5–11.5% sorbitan monolaurate, and about 80–90 ppm of chlorine dioxide. Yet another preferred hydrophobic lubricant is peanut oil based.

If (a high inherent viscosity homopolymer comprising or consisting of poly(ethylene) terephthalate) (PET) is used as the material for the film, the uncoated PET is also preferred for transport of hydrophobic material.

It is also preferred that the number of crimps/inch in the fiber is greater than 4 and the crimp amplitude is less than 2 mm.

The fibers of the invention can be tailored to work either as a grease absorber, a moisture absorber, or a combination of both just by varying the fiber lubricant. This allows the nonwoven fibers to be optimized for the food item being cooked.

Among the methods of applying lubricants to the fibers of the invention include those described in U.S. Ser. No. 734,840 entitled "Lubricant-Impregnated Fibers and Processes for the Preparation Thereof" by Neal, Bagrodia, et al., filed on Jul. 23, 1991, and incorporated herein by reference.

Ideally, to maximize the utility of this invention, two key features are desired:

(1) a source of the appropriate fluid to be moved, and
(2) the spontaneous surface transport of such fluids which initiates the movement of the fluid and fills the conduits through which the fluid moves after the fiber surface becomes "full" of fluid and the spontaneous driving forces no longer exist.

The preferred polyester materials useful in the present invention are polyesters or copolyesters that are well known in the art and can be prepared using standard techniques, such as, by polymerizing dicarboxylic acids or esters thereof and glycols. The dicarboxylic acid compounds used in the production of polyesters and copolyesters are well known to those skilled in the art and illustratively include terephthalic acid, isophthalic acid, p,p'-diphenyldicarboxylic acid, p,p'-dicarboxydiphenylethane, p,p'-dicarboxydiphenylhexane, p,p'-dicarboxydiphenyl ether, p,p'-dicarboxyphenoxyethane, and the like, and the dialkylesters thereof that contain from 1 to about 5 carbon atoms in the alkyl groups thereof.

Lubricant M and Raycalube are preferred lubricants for both oil (and n-decane) and water. Where both transport of oil and water are desired, Lubricant or Raycalube are the lubricants of choice. Where transport of oil is exclusively desired, Lubricant N is the preferred lubricant.

Suitable aliphatic glycols for the production of polyesters and copolyesters are the acyclic and alicyclic aliphatic glycols having from 2 to 10 carbon atoms, especially those represented by the general formula $HO(CH_2)_pOH$, wherein p is an integer having a value of from 2 to about 10, such as ethylene glycol, trimethylene glycol, tetramethylene glycol, and pentamethylene glycol, decamethylene glycol, and the like.

Other known suitable aliphatic glycols include 1,4-cyclohexanedimethanol, 3-ethyl-1,5-pentanediol, 1,4-xylylene, glycol, 2,2,4,4-tetramethyl-1,3-cyclobutanediol, and the like. One can also have present a hydroxylcarboxyl compound such as 4,-hydroxybenzoic acid, 4-hydroxyethoxybenzoic acid, or any of the other hydroxylcarboxyl compounds known as useful to those skilled in the art.

It is also known that mixtures of the above dicarboxylic acid compounds or mixtures of the aliphatic glycols can be used and that a minor amount of the dicarboxylic acid component, generally up to about 10 mole percent, can be replaced by other acids or modifiers such as adipic acid, sebacic acid, or the esters thereof.

The most preferred polyester for use in preparing the fibers of the present invention is poly(ethylene terephthalate) (PET).

Other materials that can be used to make the fibers of the present invention include polyamides such as a nylon, e.g., nylon 66 or nylon 6; polypropylene; polyethylene; and cellulose esters such as cellulose triacetate or cellulose diacetate.

A single fiber of the present invention preferably has a denier of between about 1 and about 1,000, more preferred is between about 5 and about 70.

Fiber shape and fiber/fluid interface variables can be manipulated to increase fluid transport rate per unit weight of fiber (flux) by accomplishing the following:

(a) using less polymer by making the fiber cross-sectional area smaller (thinner legs, walls, backbones, etc., which form the channeled structure);

(b) moderately increasing channel depth-to-width ratio;

(c) changing (increasing or decreasing) channel width to the optimum width, and (d) increasing adhesion tension, $\alpha \cos \theta$, at the channel wall by the proper selection of a lubricant for the fiber surface (which results primarily in a decrease in the contact angle at the wall without a significant lowering of the fluid surface tension at the wall).

Many surfactants provide very good wetting of surfaces by lowering fluid surface tension and decreasing contact angle and thereby yield low adhesion tension at the surface. Therefore, it is important that the surfactant possess some attraction for the polyester surface (hydrophobic) and also for water (hydrophilic). It is also preferred that the surfactant bind tightly to the polyester surface and at the same time present high hydrophilicity to the water side of the interface. Another surface treatment is to subject the fibers to oxygen plasma treatment, as taught in, for example, *Plastics Finishing and Decoration*, Chapter 4, Ed. Don Satas, Van Nostrand Reinhold Company (1986).

Spinnerets useful in the present invention must have a specific geometry in order to produce fibers that will spontaneously transport aqueous fluids. FIGS. 12–18 illustrate spinneret orifices which will prepare fibers of a geometry suitable for use in the present invention.

Figure 12:
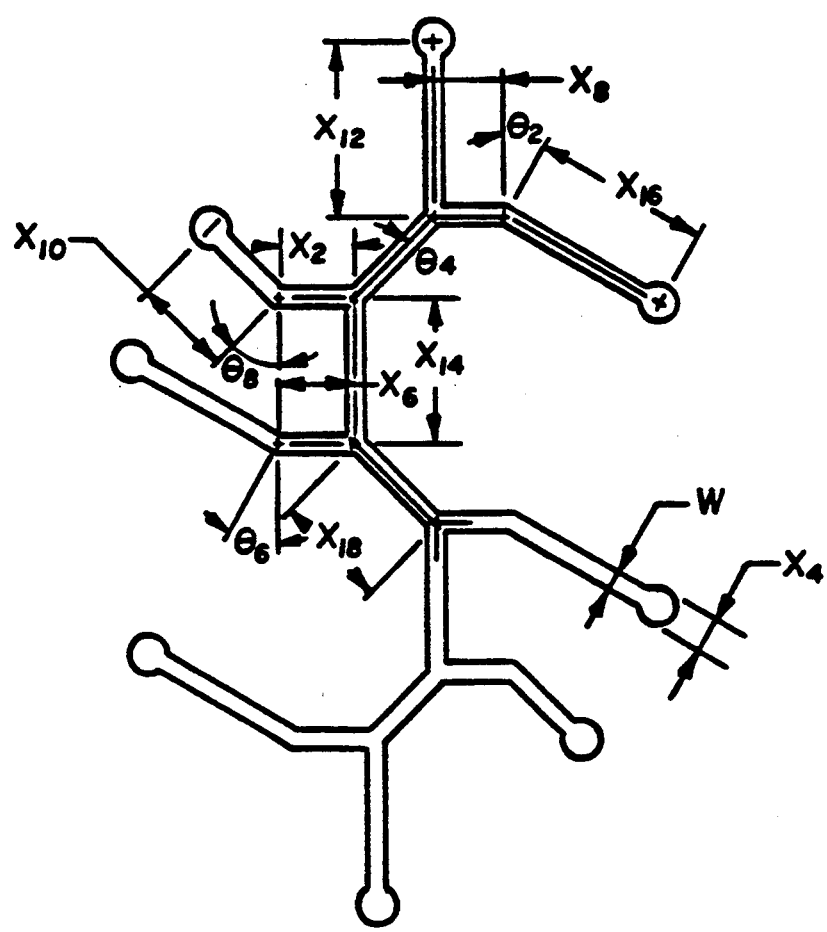
FIG. 12—schematic representation of an orifice of a spinneret useful for producing a spontaneously transportable fiber.

In FIG. 12, W is between 0.064 millimeters (mm) and 0.12 mm. $X_2$ is $4W_{-1W}^{+4W}$; $X_4$ is $2W \pm 0.5\,W$; $X_6$ is $6W_{-2W}^{+4W}$; $X_8$ is $6W_{-2W}^{+5W}$; $X_{10}$ is $7W_{-2W}^{+5W}$; $X_{12}$ is $9W_{-1W}^{+5W}$; $X_{14}$ is $10W_{-2W}^{+5W}$; $X_{16}$ is $11W_{-2W}^{+5W}$; $X_{18}$ is $6W_{-2W}^{+5W}$; $\theta_2$ is $30° \pm 30°$; $\theta_4$ is $45° \pm 45°$; $\theta_6$ is $30° \pm 30°$; and $\theta_8$ is $45° \pm 45°$.

Figure 13:
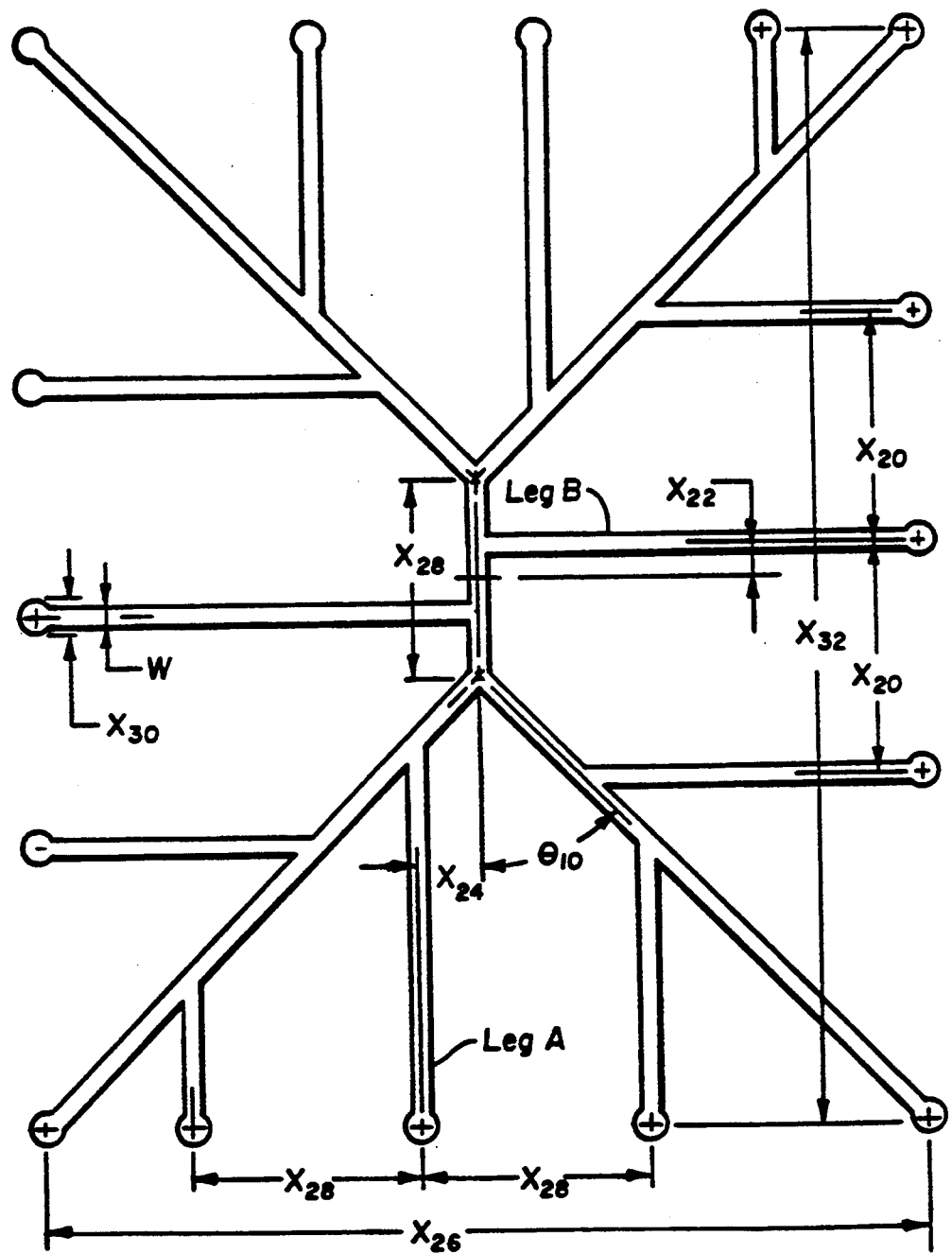
FIG. 13—schematic representation of an orifice of a spinneret useful for producing a spontaneously transportable fiber.

In FIG. 13, W is between 0.064 mm and 0.12 mm; $X_{20}$ is $17W_{-2W}^{+5W}$; $X_{22}$ is $3W \pm W$; $X_{24}$ is $4W \pm 2W$; $X_{26}$ is $60W_{-4W}^{+8W}$; $X_{28}$ is $17W_{-2W}^{+5W}$; $X_{30}$ is $2W \pm 0.5W$; $X_{32}$ is $72W_{-5W}^{+10W}$; and $\theta_{10}$ is $45° \pm 15°$. In addition, each Leg B can vary in length from 0 to $X_{26}/2$; and each Leg A can vary in length from 0 to tan $$(90 - \theta_{10}) \left[ \frac{X_{26}}{2} - X_{24} \right].$$

Figure 14:
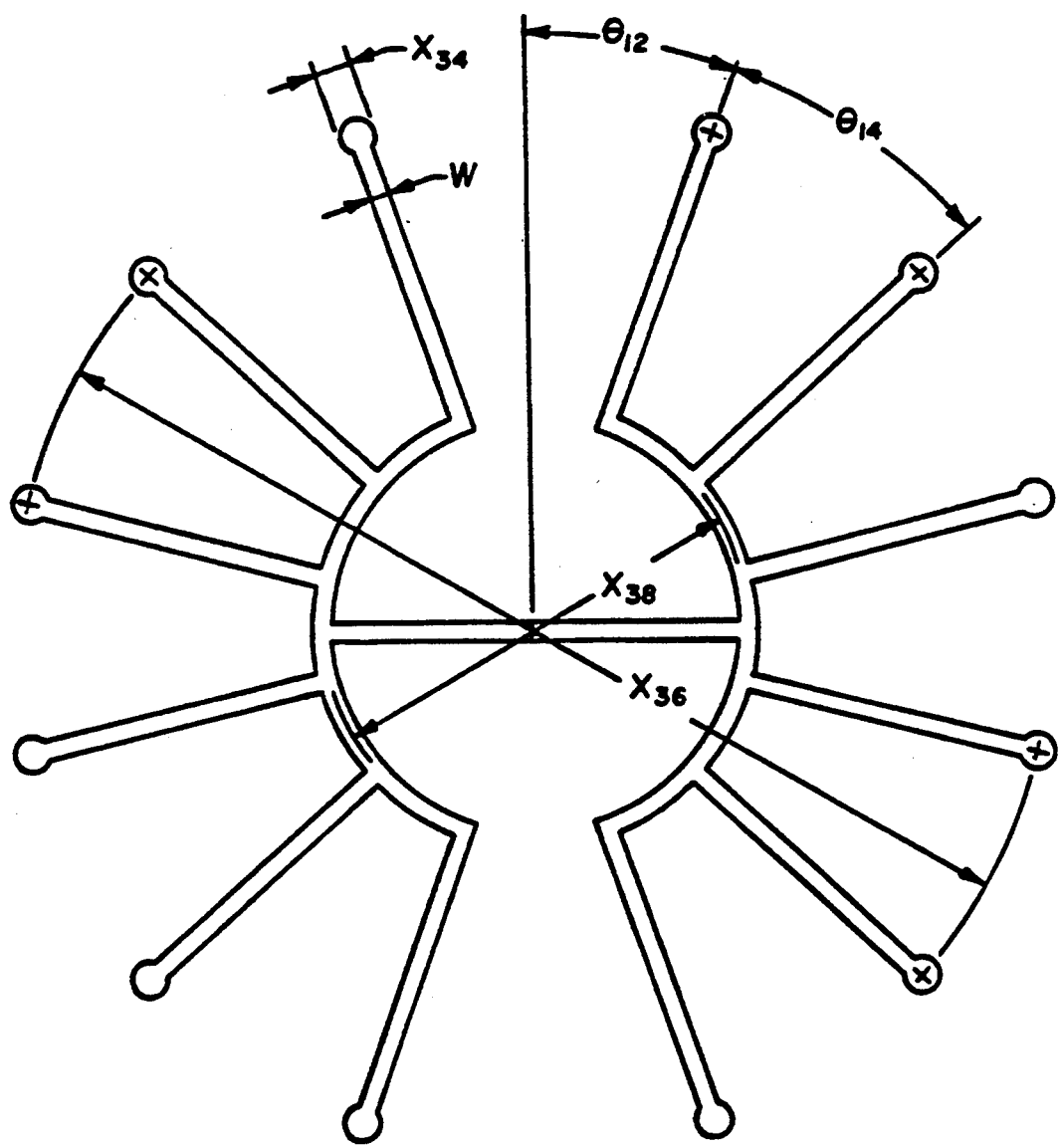
FIG. 14—schematic representation of an orifice of a spinneret useful for producing a spontaneously transportable fiber.

In FIG. 14, W is between 0.064 mm and 0.12 mm; $X_{34}$ is $2W \pm 0.5W$; $X_{36}$ is $58W_{-10W}^{+20W}$; $X_{38}$ is $24W_{-6W}^{+20W}$; $\theta_{12}$ is $20°_{-10°}^{+15°}$;

$$\theta_{14} \text{ is } \frac{180° - 2\theta_{12}}{n - 1};$$

and n=number of legs per 180° =2 to 6.

Figure 15:
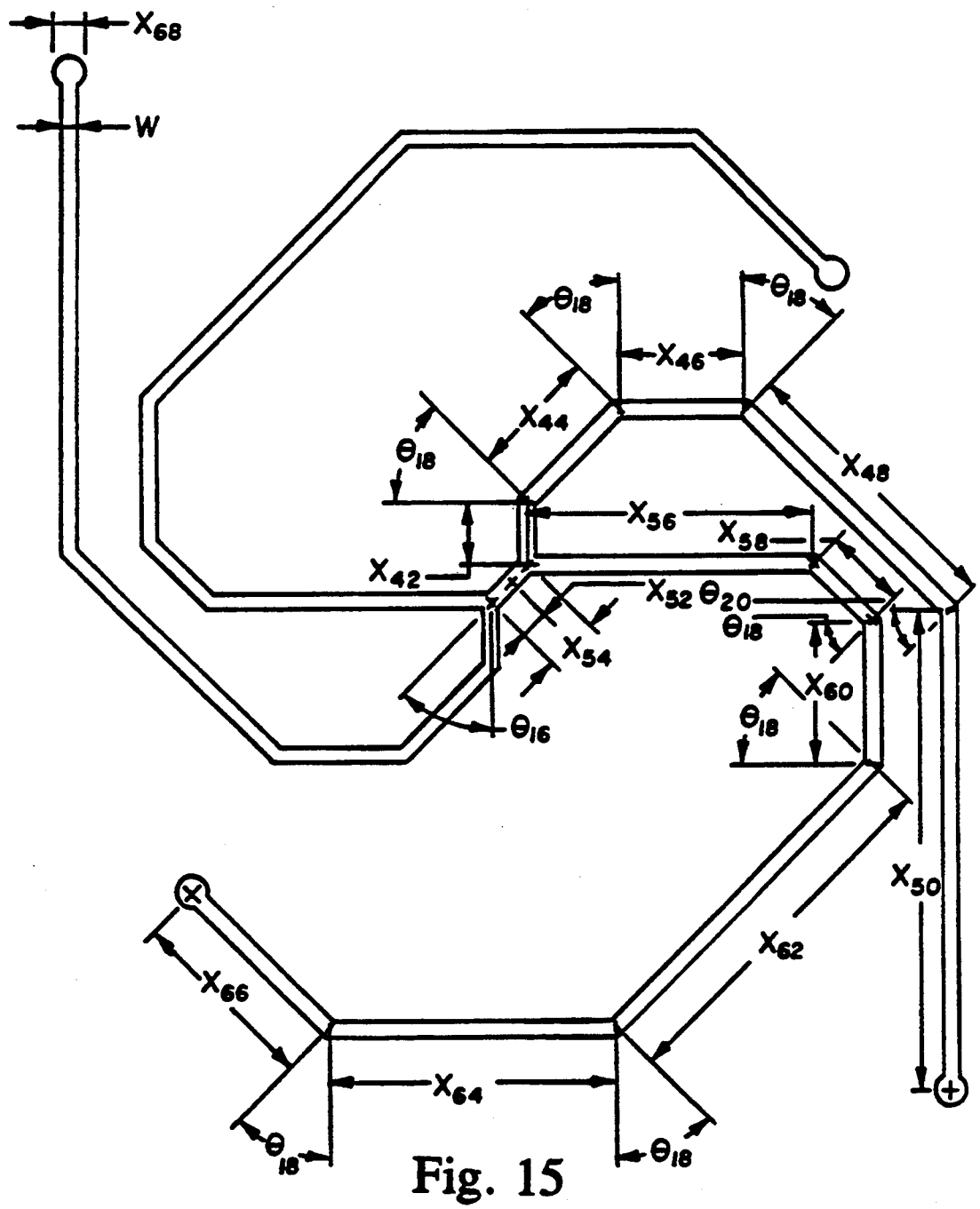
FIG. 15—schematic representation of an orifice of a spinneret useful for producing a spontaneously transportable fiber.

In FIG. 15, W is between 0.064 mm and 0.12 mm; $X_{42}$ is $6W_{-2W}^{+4W}$; $X_{44}$ is $11W \pm 5W$; $X_{46}$ is $11W \pm 5W$; $X_{48}$ is is $24W \pm 10W$; $X_{50}$ is $38W \pm 13W$; $X_{52}$ is $3W_{-1W}^{+3W}$; $X_{54}$ is $6W_{-2W}^{+6W}$; $X_{56}$ is $11W \pm 5W$; $X_{58}$ is $7W \pm 5W$; $X_{60}$ is $17W \pm 7W$; $X_{62}$ is $28W \pm 11W$; $X_{64}$ is $24W \pm 10W$; $X_{66}$ is $17W \pm 7W$; $X_{68}$ is $2W \pm 0.5W$; $\theta_{16}$ is $45°_{-15°}^{+30°}$; $\theta_{18}$ is $45° \pm 15°$; and $\theta_{20}$ is $45° \pm 15°$.

Figure 16:
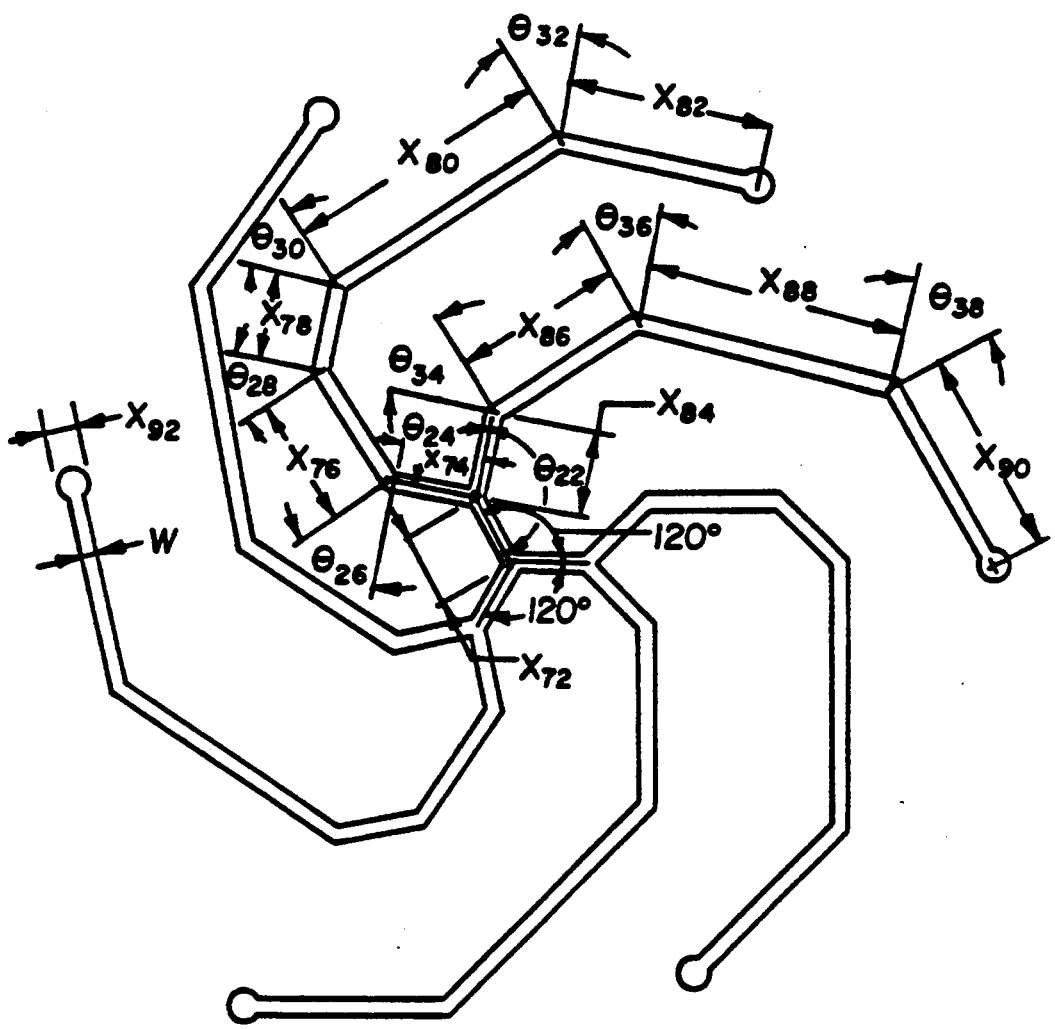
FIG. 16—schematic representation of an orifice of a spinneret useful for producing a spontaneously transportable fiber.

In FIG. 16, W is between 0.064 mm and 0.12 mm, $X_{72}$ is $8W_{-2W}^{+4W}$, $X_{74}$ is $8W_{-2W}^{+4W}$, $X_{76}$ is $12W \pm 4W$, $X_{78}$ is $8W \pm 4W$, $X_{80}$ is $24W \pm 12W$, $X_{82}$ is $18W \pm 6W$, $X_{84}$ is $8W_{-2W}^{+4W}$, $X_{86}$ is $16W \pm 6W$, $X_{88}$ is $24W \pm 12W$, $X_{90}$ is $18W \pm 6W$, $X_{92}$ is $2W \pm 0.5W$, $\theta_{22}$ is $135° \pm 30°$, $\theta_{24}$ is $90°_{-30°}^{+45°}$, $\theta_{26}$ is $45° \pm 15°$, $\theta_{28}$ is $45° \pm 15°$, $\theta_{30}$ is $45° \pm 15°$, $\theta_{32}$ is $45° \pm 15°$, $\theta_{34}$ is $45° \pm 15°$, $\theta_{36}$ is $45° \pm 15°$, and $\theta_{38}$ is $45° \pm 15°$.

Figure 17:
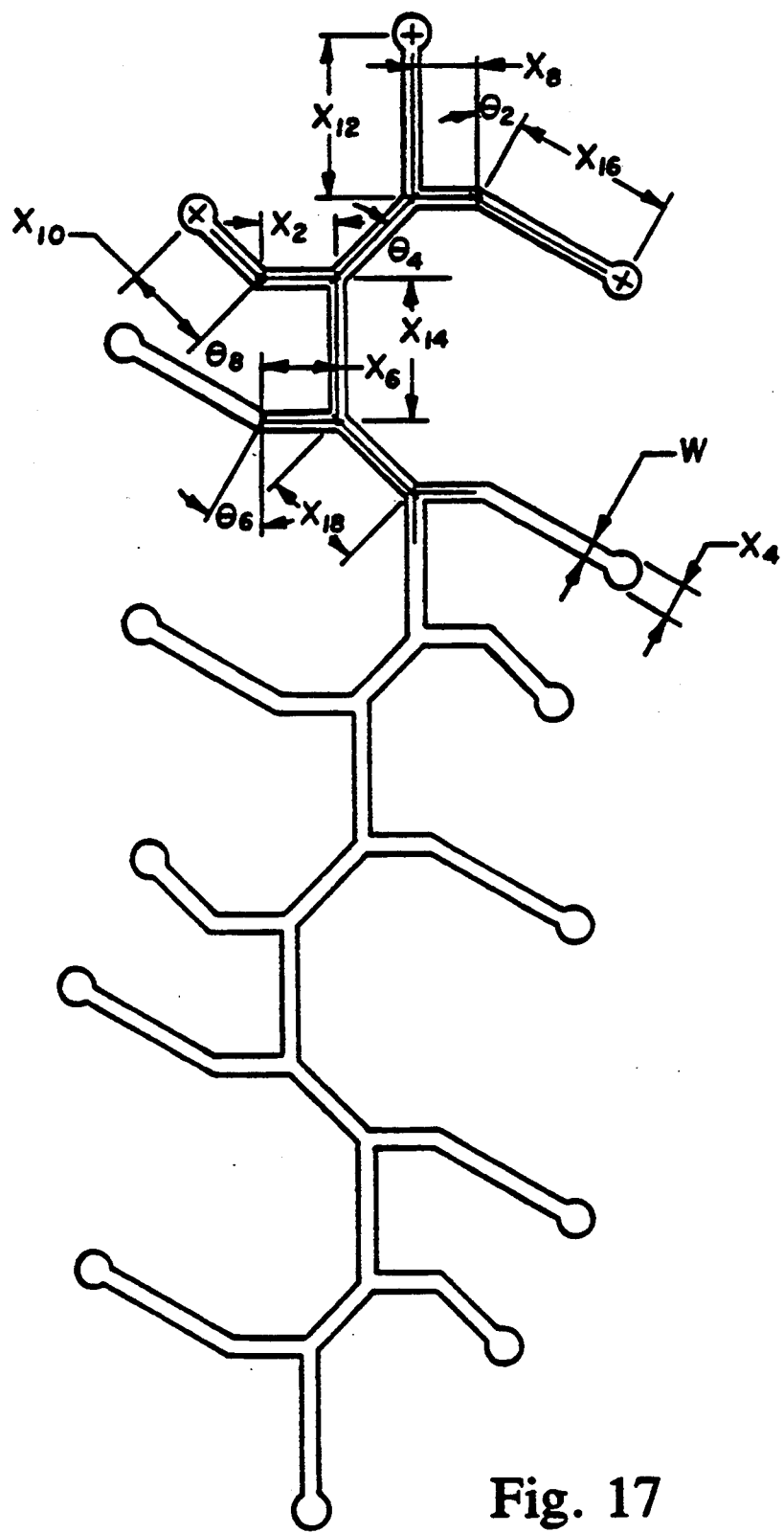
FIG. 17—schematic representation of an orifice of a spinneret having 2 repeating units, joined end to end, of the orifice as shown in FIG. 12.

In FIG. 17, the depicted spinneret orifice contains two repeat units of the spinneret orifice depicted in FIG. 12, therefore, the same dimensions for FIG. 12 apply to FIG. 17. Likewise, in FIG. 18, the depicted spinneret orifice contains four repeat units of the spinneret orifice depicted in FIG. 12, therefore, the same dimension for FIG. 12 applies to FIG. 18.

Figure 35:
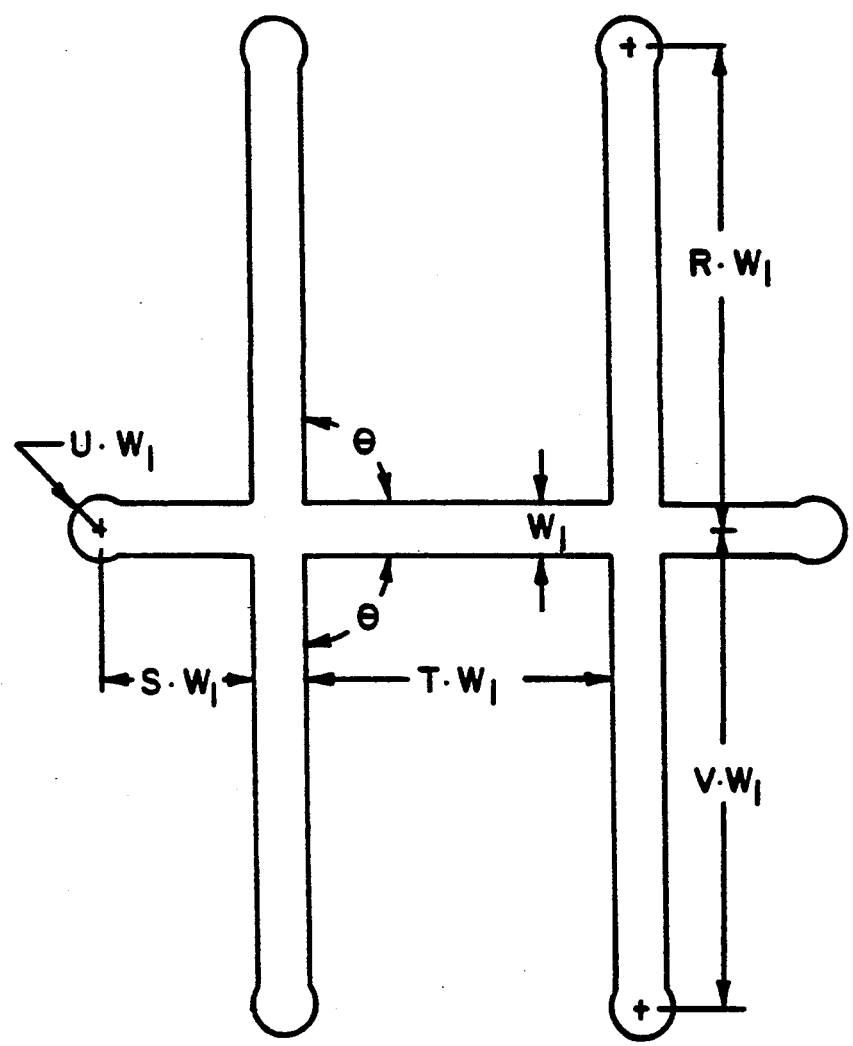
FIG. 35—a schematic representation of a preferred "H" shape orifice of a spinneret useful for producing a spontaneously transportable fiber.

FIG. 35 depicts a preferred "H" shape spinneret orifice of the invention. In FIG. 35, $W_1$ is between 60 and 150μ, θ is between 80° and 120°, S is between 1 and 20, R is between 10 and 100, T is between 10 and 300, U is between 1 and 25, and V is between 10 and 100. In FIG. 35, it is more preferred that $W_1$ is between 65 and 100μ, θ is between 90° and 110°, S is between 5 and 10, R is between 30 and 75, T is between 30 and 80, U is between 1.5 and 2, and V is between 30 and 75.

Figure 36:
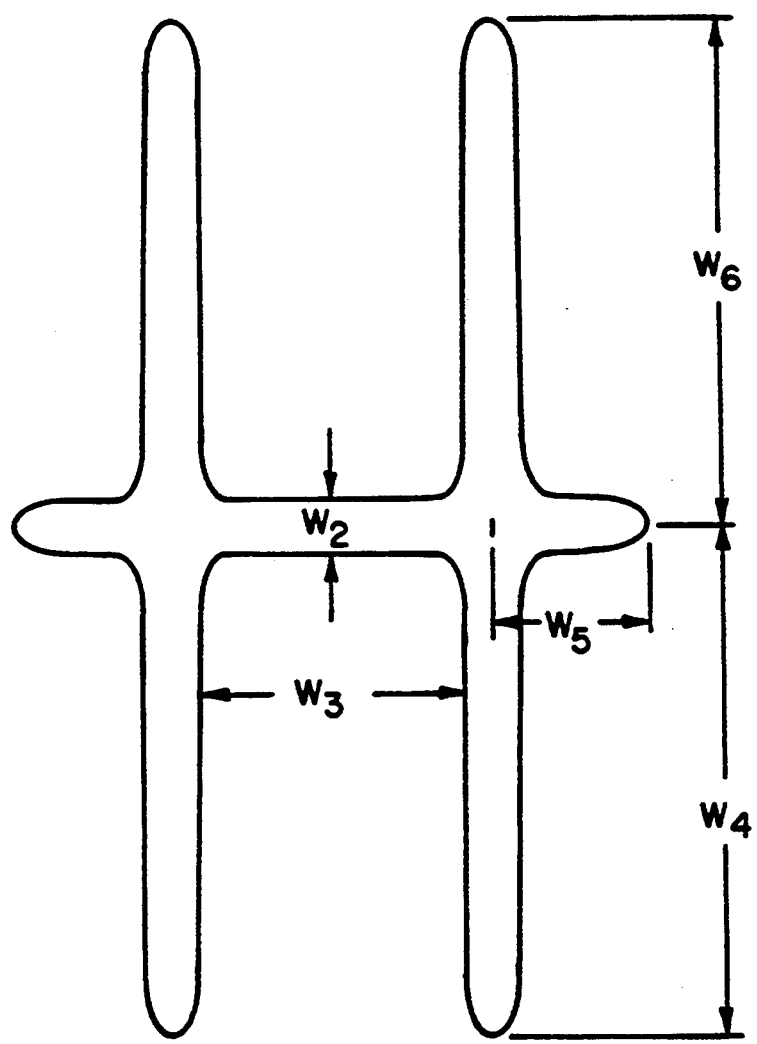
FIG. 36—a schematic representation of a poly(ethylene terephthalate) fiber cross-section made using a spinneret having an orifice as illustrated in FIG. 35.
Figure 37:
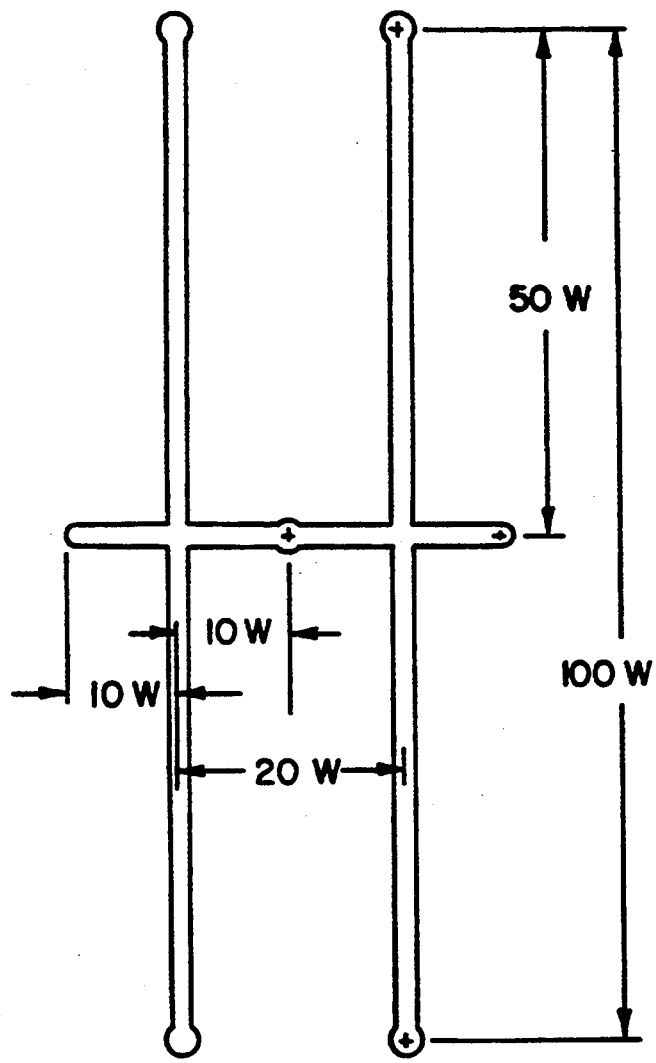
FIG. 37—a schematic representation of a preferred "H" shape orifice of a spinneret useful for producing a spontaneously transportable fiber (see Example 23).
Figure 38:
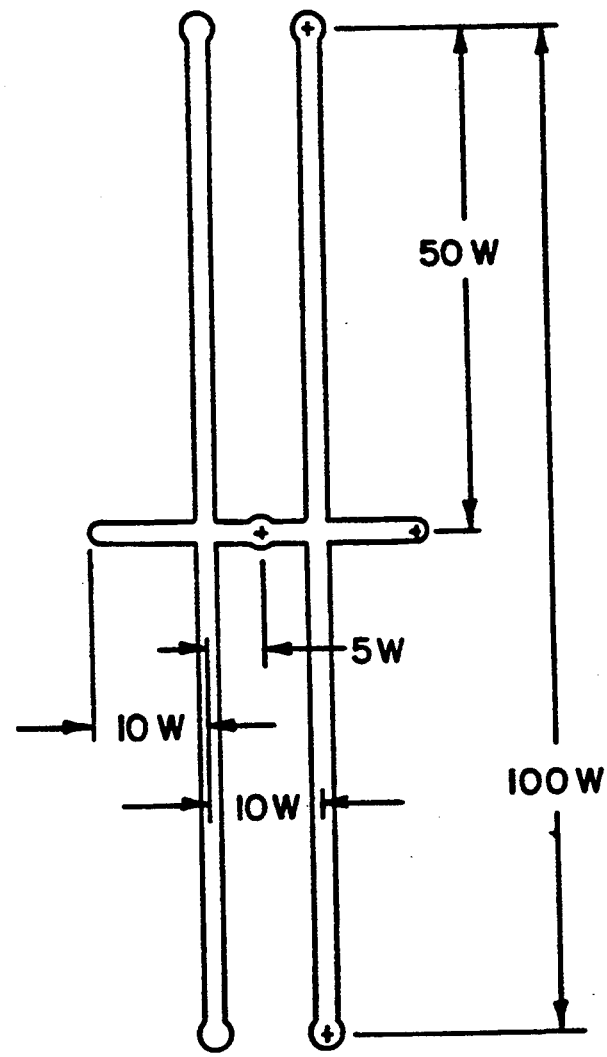
FIG. 38—a schematic representation of a preferred "H" shape orifice of a spinneret useful for producing a spontaneously transportable fiber.
Figure 39:
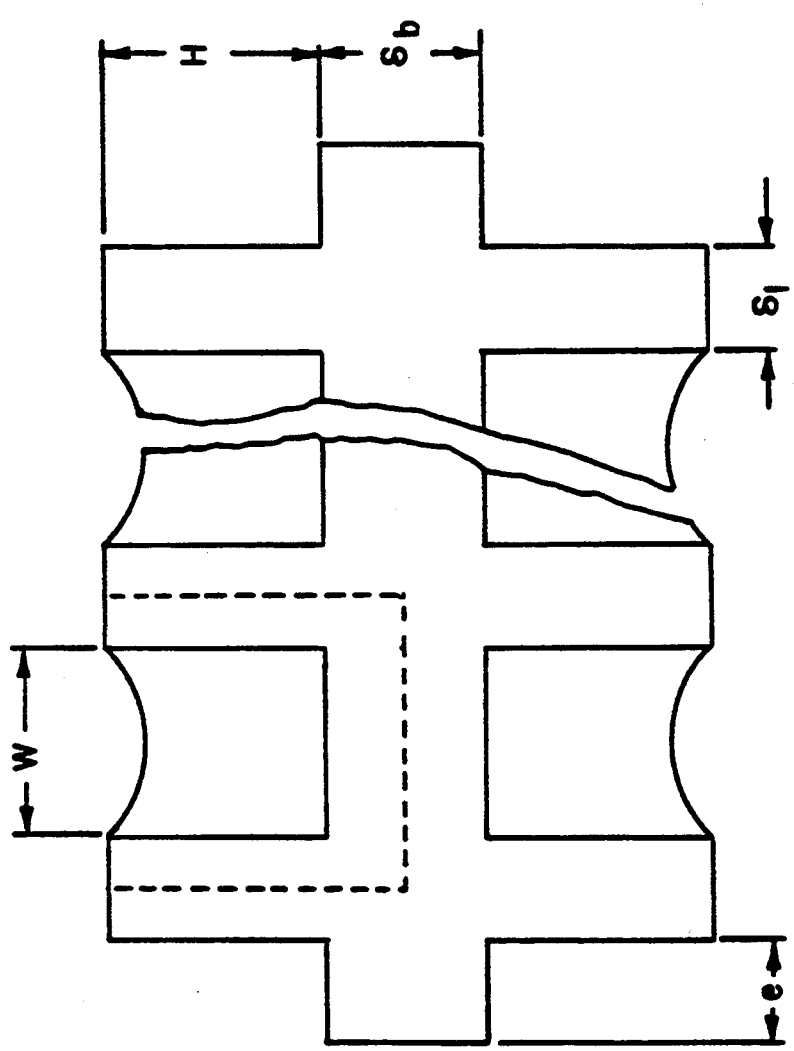
FIG. 39—a schematic representation depicting a unit cell.

FIG. 36 depicts a poly(ethylene terephthalate) fiber cross-section made from the spinneret orifice of FIG. 35. In FIG. 36, $W_2$ is less than 20μ, $W_3$ is between 10 and 300μ, $W_4$ is between 20 and 200μ, $W_5$ is between 5 and 50μ, and $W_6$ is between 20 and 200μ. In FIG. 36 it is more preferred that $W_2$ is less than 10μ, $W_3$ is between 20 and 100μ, $W_4$ is between 20 and 100μ, and $W_5$ is between 5 and 20μ.

Figure 26:
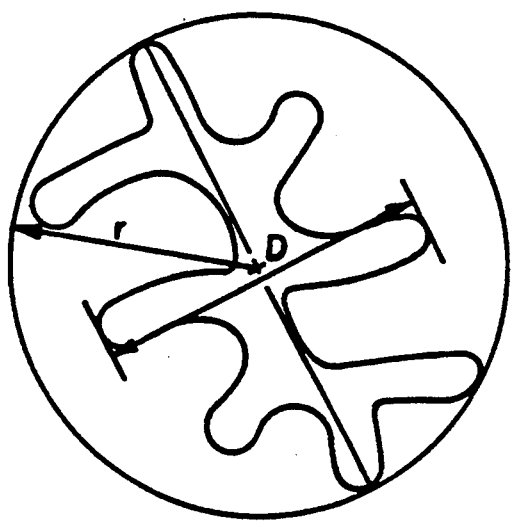
FIG. 26—schematic representation of a fiber cross-section made using a spinneret having an orifice as illustrated in FIG. 12 (Example 1). Exemplified is a typical means of determining the shape factor X.

FIG. 26 illustrates the method for determining the shape factor, X, of the fiber cross-section. In FIG. 26, r=37.5 mm, $P_w$=355.1 mm, D=49.6 mm; thus, for the fiber cross-section of FIG. 26:

$$X = \frac{355.1}{4 \times 37.5 + (\pi - 2)\,49.6} = 1.72.$$

The invention further comprises an insert useful in a microwavable food container comprising a first layer and a second layer bonded thereto, wherein said first layer comprises a susceptor layer or a plastic layer, and said second layer comprises absorbent material comprising fibers and is in position to be adjacent to food in said container, wherein said second layer comprises at least one fiber having at least one continuous groove oriented axially along the fiber and wherein said fiber satisfies the equations as described hereinabove.

This insert ishereinafter referred to as "Insert B".

The first layer and the absorbent layer of Insert B are virtually identical to the first outer layer and the intermediate layer as described for Insert A with the exception that the susceptor or plastic layer does not comprise openings. However, the absorbent layer, 2 and 30, of Insert B is the layer positioned to contact the food. The first layer, 4 and 26, of Insert B can be bonded conventionally to paperboard or properly adhered to another flexible substrate such as paper or to a plastic sheet.

The invention further comprises an insert useful in microwavable food container comprising an absorbing pad, said pad comprising:

microwave radiation transparent and grease absorbing fibers wherein at least one said fiber has at least one continuous groove oriented axially along the fiber and wherein said fiber satisfies the equations as previously described herein for spontaneously transporting n-decane or water. Also, the fibers used in the pad are identical to the fibers used in Inserts A and B. The absorbing pad as described hereinafter is referred to as "Insert C",18. It is preferred that a vapor tight microwave radiation transparent enclosures surrounds Insert C.

In selecting the pad material it is preferred to select a pad material that can have about the same surface area as the food which is supported on the pad and can still so completely adsorb or otherwise hold all the grease contained in that food, that after the food is cooked and removed from the enclosure, the enclosure will not drip grease even when the opening through which the food was removed is lowermost on the enclosure. For example, such pads that can hold in the range of about 0.1 to 0.15 grams of grease per square centimeter of surface area have been found useful for packaging conventional bacon strips.

The enclosure may be made from one or more conventional polymeric packaging materials such as nylon- /ionomer composites of the type available from Curwood, Inc., New London, Wisc.; or a polyester/polyethylene laminate such as is sold under the trade designation "Scotchpak" by Minnesota Mining and Manufacturing Company, St. Paul, Minn. Also the enclosure could be made from a metal foil.

While the package according to the present invention could be vented by puncturing, as with a fork, to allow the escape of steam and other vapors during cooking, preferably the package includes means that, will automatically vent the package during cooking. That means for venting the enclosure could comprise preformed openings in the enclosure that are initially closed by a manually removable cover (e.g., a piece of pressure sensitive adhesive coated tape). Preferably, however, that means for venting comprises a deposit of microwave radiation absorbing material adhered to a heat sensitive material forming at least a portion of the enclosure, which microwave radiation absorbing material will be heated by exposure to microwave radiation and will automatically cause a vent to form or open in the heat sensitive material during microwave cooking of the food.

The inserts of this invention can conform to a number of different packaging geometries. For instance, they can be used in the conventional flat sheet form for an "as is" cooking sheet. They can be incorporated into the bottom of a package, again as a flat cooking surface. These inserts can also be incorporated into three dimensional package structures such as cooking sleeves for the "pocket" sandwiches, as cooking bags for popcorn and similar foods, boxes for microwave french fries and tater tots, and as pouches for chicken, bacon, etc. The absorbing pads conforming to the structure of Insert C of this invention can be used as stand-alone absorbers to be inserted into packages as needed. It could also be produced as a roll stock and then cut and modified to fit various package structures.

Also, food flavorants such as spices, smoke flavorings, butter, etc. could be dispersed in the fibers useful in the invention. The flavorants would then be released into food during microwave heatup. For effective flavor delivery, the fibers should be in good contact with the food. In the alternative, flavorants can be useful to provide more pleasant food aromas when opening a microwave food oven door. It is believed that the same theories applying to the spontaneous transport of fluids would apply to transport of a flavorant such as those exemplified herein.

The fibers of the present invention can be in the form of crimped or uncrimped tows or staple fibers comprising a plurality of the fibers of the present invention.

The fibers of the present invention can be prepared by techniques known in the art and/or disclosed herein using a novel spinneret of the present invention or other spinneret that will result in a fiber cross-section of the appropriate geometry and properties.

In general, a process useful in the present invention can be described as a process comprising heating a material capable of forming a fiber at or above its melting point followed by extruding said heated material through at least one spinneret having at least one orifice capable of forming the desired fiber. The fiber may be drafted and/or thermally stabilized. The fiber thus formed may then optionally be treated with a surface treatment such as a hydrophilic coating or plasma treatment as described hereinbefore.

The microwavable inserts of the invention are particularly useful in the microwave oven cooking of pan-fried frozen food items such as fish, chicken and vegetables. They are sometimes useful in the heating of breaded food.

The present invention also finds use in connection with pizza rolls, potatoes, e.g., hashbrown patties, sausages, corn dogs and the like. Also, while the inserts of the invention typically are rectangularly shaped, other shapes, whether regular such as oval, wedge, log, circular or irregular or combinations thereof, can also be employed.

The following examples are to illustrate the invention but should not be interpreted as a limitation thereon.

EXAMPLES

EXAMPLE 1 (Fiber Preparation)

Poly(ethylene terephthalate) (PET) polymer of 0.6 I.V. was used in this example. I.V. is the inherent viscosity as measured at 25° C. at a polymer concentration of 0.50 g/100 milliliters (mL) in a suitable solvent such as a mixture of 60% phenol and 40% tetra-chloroethane by weight. The polymer was dried to a moisture level of $\leq 0.003$ weight percent in a Patterson Conaform dryer at 120° C. for a period of 8 hours. The polymer was extruded at 283° C. through an Egan extruder, 1.5-inch diameter, with a length to diameter ratio of 28:1. The fiber was extruded through an eight orifice spinneret wherein each orifice is as shown in FIG. 12 wherein W is 0.084 mm, $X_2$ is 4W, $X_4$ is 2W, $X_6$ is 6W, $X_8$ is 6W, $X_{10}$ is 7W, $X_{12}$ is 9W, $X_{14}$ is 10W, $X_{16}$ is 11W, $X_{18}$ is 6W, $\theta_2$ is 0°, $\theta_4$ is 45°, $\theta_6$ is 30°, and $\theta_8$ is 45°. The polymer throughput was about 7 pounds (lb)/hour. The air quench system has a cross-flow configuration. The quench air velocity at the top of the screen was an average of 294 feet (ft)/minute. At a distance of about 7 inches from the top of the screen the average velocity of the quench air was about 285 ft/minute, and at a distance of about 14 inches from the top of the screen the average quench air velocity was about 279 ft/minute. At about 21 inches from the top of the air screen the average air velocity was about 340 ft/minute. The rest of the screen was blocked. Spinning lubricant was applied via ceramic kiss rolls. The lubricant has a general composition as follows: it is a potassium lauryl phosphate (PLP) based lubricant having poly(ethylene glycol) 600 monolaurate (70% by weight) and polyoxyethylene (5) potassium lauryl phosphate (30% by weight). An emulsion of the above lubricant with water (90%) was used as the spinning lubricant. The lubricant level on the fiber samples was about 1.5%. Fibers of 20 dpf (denier per filament) were wound at 3,000 meters per minute (MPM) on a Barmag SW4SL winder. A photomicrograph of a cross-section of this fiber is shown in FIG. 9 (150× magnification). The single fiber was tested for spontaneous surface transportation of an aqueous solution which was aqueous Syltint Poly Red (obtained from Milliken Chemicals) which is 80 weight % water and 20 weight % red colorant. The single fiber of 20 dpf spontaneously surface transported the above aqueous solution. The following denier per filament PET fibers were also made at different speeds as shown in Table 1 below:

TABLE 1

| dpf | Spin Speed (MPM) | Winder |
| --- | --- | --- |
| 20 | 3,000 | Barmag |
| 40 | 1,500 | Leesona |
| 60 | 1,000 | Leesona |
| 120 | 500 | Leesona |
| 240 | 225 | Leesona |
| 400 | 150 | Leesona |

All the single fibers of above PET fiber with the dpf of 20, 40, 60, 120, 240, and 400 spontaneously surface transported the aqueous solution of Syltint Poly Red liquid. The value of the "X" parameter (as defined hereinbefore) for these fibers was about 1.7. PET film of 0.02 inch thickness was compression molded from the same polymer as that used for making the above fiber. Contact angle of distilled water on the above film was measured in air with a contact angle goniometer. The contact angle was 71.7°. Another sample of the same film as above was sprayed with the same lubricant as used for making the fiber in this example at about 1.5% level. The contact angle of distilled water on the PET film sprayed with the lubricant was about 7°. Thus, the factor $(1-X \cos \theta_a)$ in this case is $(1-1.7 (\cos 7°)) = -0.69$, which is less than zero.

EXAMPLE 2 (Fiber Preparation)

Figure 21:
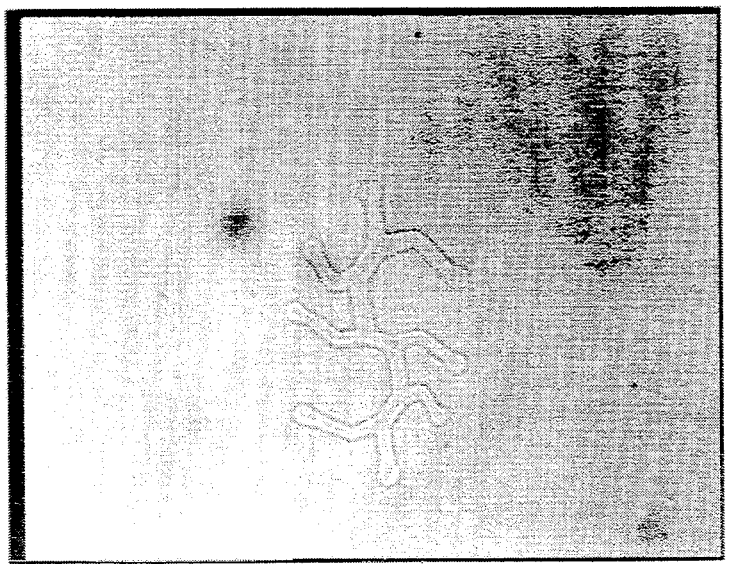
FIG. 21—photomicrograph of a nylon 66 fiber cross-section made using a spinneret having an orifice as illustrated in FIG. 12 (specific dimensions of spinneret orifice described in Example 2).

Polyhexamethylene adipamide (nylon 66) was obtained from Du Pont (Zytel 42). The polymer was extruded at 279° C. A spinneret as shown in FIG. 12 was used to form 46 dpf fiber at 255 meters/minute speed. The specific dimensions of the spinneret orifices were the same as described in Example 1 except that $\theta_2$ was 30° instead of 0°. The quenching conditions were the same as those for obtaining PET fiber as in Example 1. A photomicrograph of the fiber cross-section is shown in FIG. 21 (150× magnification). The lubricant level on the fiber was about 1.8% by weight. The same lubricant as used in the PET fiber was used (Example 1). This nylon 66 fiber spontaneously transported the aqueous Syltint Poly Red solution on the fiber surface. The value of the "X" parameter for this fiber was about 1.9. Nylon 66 film of 0.02 inch thickness was compression molded from the same polymer as that used for making the fiber of Example 2. Contact angle of distilled water on the above film was measured in air with a contact angle goniometer. The contact angle was 64°. Another sample of the same film as above was sprayed with the same lubricant as used for making the fiber in this example at about the 1.8% level. The contact angle of distilled water on the nylon 66 film sprayed with the lubricant was about 2°. Thus, the factor $(1-X \cos \theta)$ in this case is $(1-1.9(\cos 2°)) = -0.9$, which is less than zero.

EXAMPLE 3 (Fiber Preparation)

Figure 3:
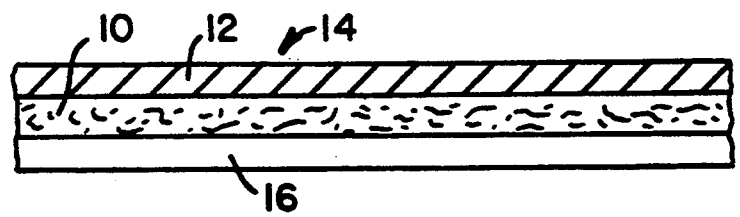
FIG. 3—an enlarged cross-sectional view of a preferred embodiment of the invention, Insert A, as described herein.
Figure 4:
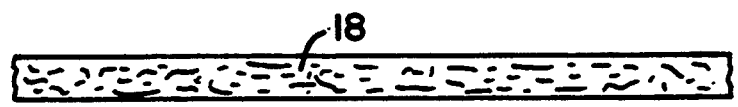
FIG. 4—an enlarged cross-sectional view of a preferred embodiment of the invention, Insert C, as described herein.
Figure 5:
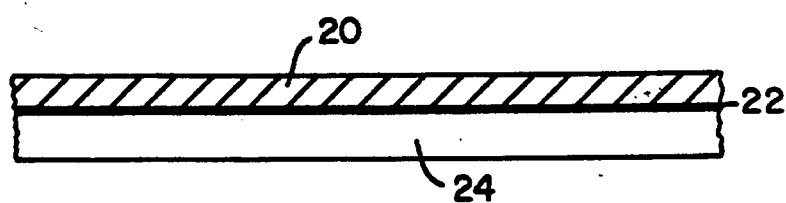
FIG. 5—a cross-sectional view of a typical known susceptor structure.
Figure 6:
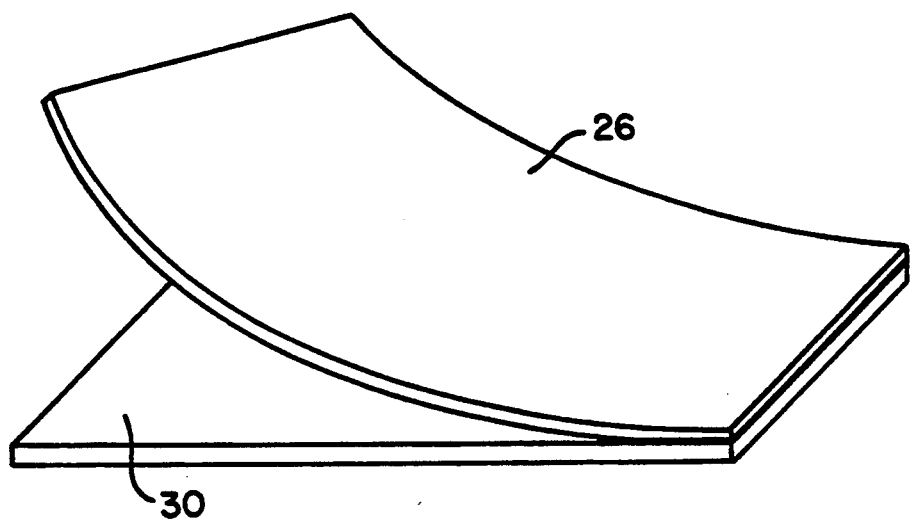
FIG. 6—a perspective view of a preferred embodiment of the invention, Insert B, as described herein.
Figure 7:
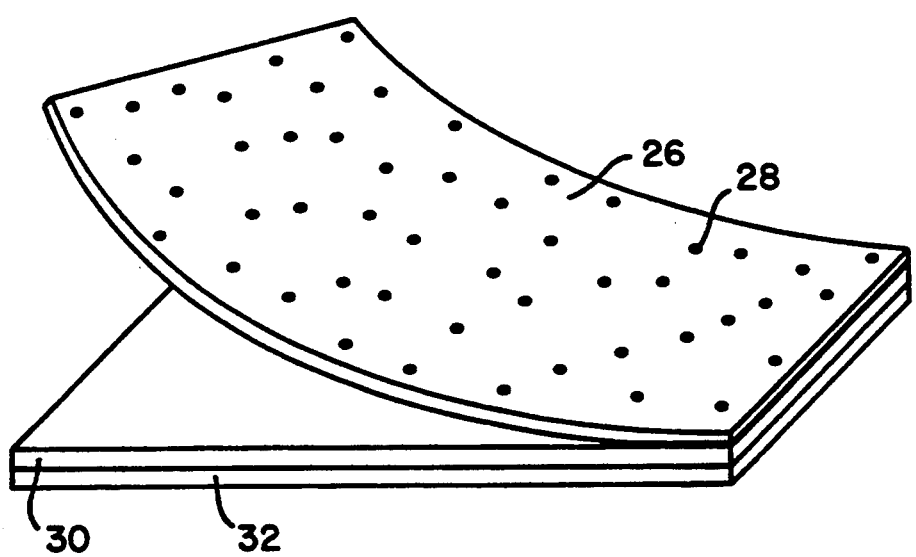
FIG. 7—a perspective view of a preferred embodiment of the invention, Insert A, as described herein.
Figure 8:
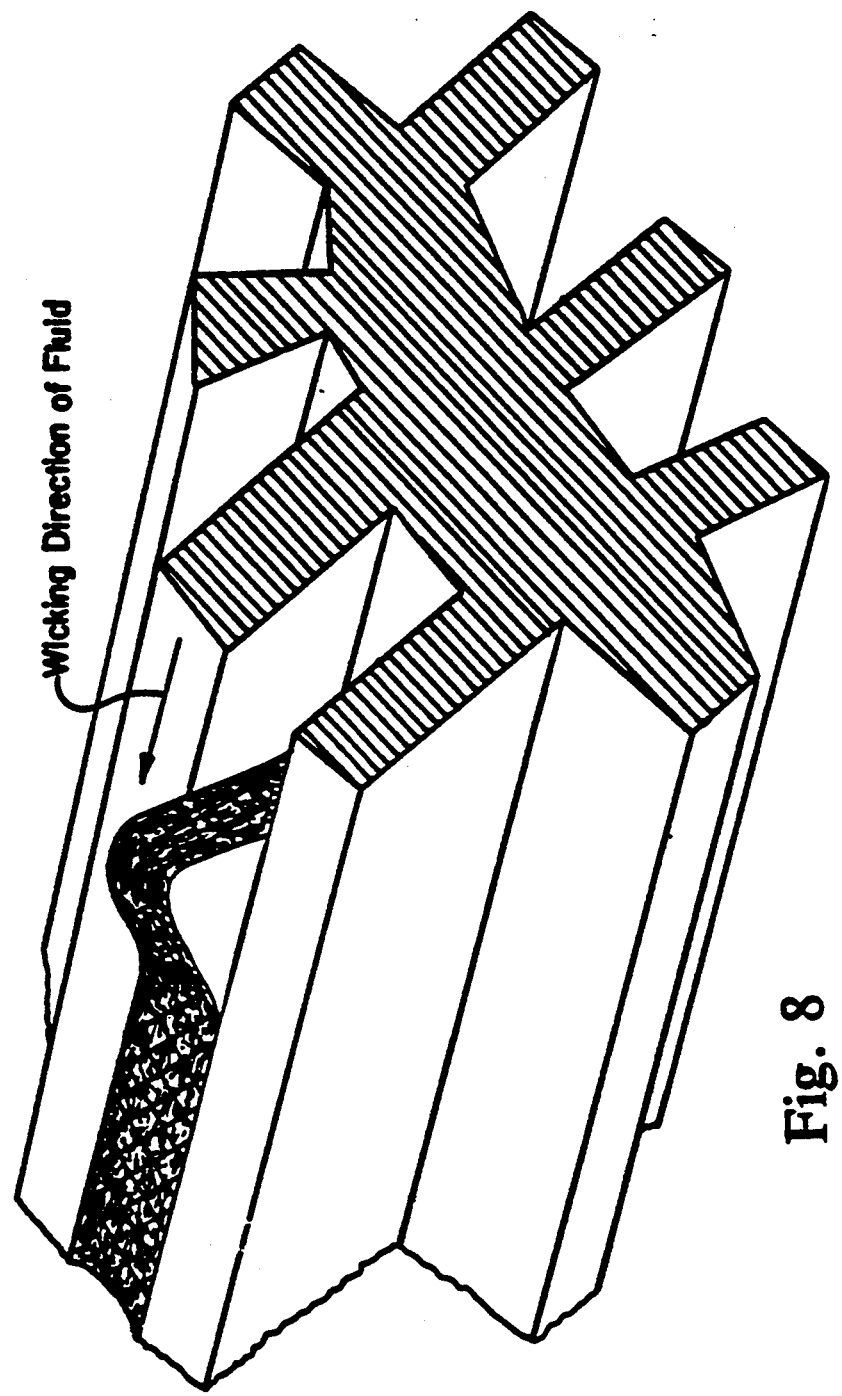
FIG. 8—schematic representation of a three dimensional view of an absorbant fiber of the invention illustrating the swelling of superabsorbant material out of a fiber groove upon transport of a fluid.

Polypropylene polymer was obtained from Shell Company (Grade 5C14). It was extruded at 279° C. A spinneret as shown in FIG. 3 was used to form 51 dpf fiber at 2,000 MPM speed. The specific dimensions of the spinneret orifices were the same as in Example 2. The quenching conditions were the same as those for obtaining PET fiber. A photomicrograph of the fiber cross-section is shown in FIG. 10 (375× magnification). The lubricant level on the fiber was 2.6%. The same lubricant as used in PET fiber was used (Example 1). The polypropylene fiber spontaneously transported the aqueous Syltint Poly Red solution on the fiber surface. This spontaneously transportable phenomenon along the fiber surface was also observed for a 10 dpf, single polypropylene fiber. The value of the "X" parameter for this fiber was about 2.2. Polypropylene film of 0.02 inch thickness was compression molded from the same polymer as that used for making the above fiber of Example 3. Contact angle of distilled water on the above film was measured in air with a contact angle goniometer. The contact angle was about 110°. Another sample of the same film as above was sprayed with the same lubricant as used for making the fiber in this example at about the 2.6% level. The contact angle of distilled water on the polypropylene film sprayed with the lubricant was 12°. Thus, the factor $(1-X \cos \theta)$ in this case is $-1.1$, which is less than zero.

EXAMPLE 4 (Fiber Preparation)

Cellulose acetate was blended with PEG 400 polymer and small quantities of antioxidant and thermal stabilizer. The blend was melt extruded at 270° C. A spinneret as shown in FIG. 3 was used to form 115 dpf fiber at 540 meters/minute speed. The specific dimensions of the spinneret orifices were the same as in Example 2. No forced quench air was used. The lubricant level on the fiber was 1.6%. The same lubricant as used in the PET fibers (Example 1) was used. The cellulose acetate fiber spontaneously transported the aqueous Syltint Poly Red solution on the fiber surface. The value of the "X" parameter for this fiber was about 1.8.

EXAMPLE 5 (Comparative)

PET fiber of Example 1 was made without any spinning lubricant at 20 dpf. A single fiber did not spontaneously transport the aqueous Syltint Poly Red solution along the fiber surface.

EXAMPLE 6 (Comparative)

PET fiber of circular cross-section was made. The denier per filament of the fiber was 20. It had about 1.5% of the lubricant used in Example 1. A single fiber did not spontaneously transport the aqueous Syltint Poly Red solution along the fiber surface.

EXAMPLE 7 (Fiber Preparation)

Poly(ethylene terephthalate) (PET) fiber of Example 5 (without any spinning lubricant) was treated with oxygen plasma for 30 seconds. Model "Plasmod" oxygen plasma equipment was used. Exciter power is provided by the RF generator operating at 13.56 MHz frequency. The plasma treatment was conducted at a constant level of 50 watts power. The oxygen plasma treated fiber spontaneously transported the aqueous Syltint Poly Red solution along the fiber. This fiber was tested again after washing five times and after 3 days and the spontaneously transportable behavior with the above aqueous solution was still observed. In order to determine the reduction in contact angle after the plasma treatment, a PET film of the same material as that of the fiber was subjected to the oxygen plasma treatment under the same conditions as those used for the fiber sample. The average contact angle of the oxygen plasma treated film with distilled water in air was observed to be 26° as measured by a contact angle goniometer. The corresponding contact angle for the control PET film (not exposed to the oxygen plasma) was 70°. The significant reduction in contact angle upon subjecting the untreated PET fiber to the oxygen plasma treatment renders it to be spontaneously surface transportable for aqueous solutions.

EXAMPLE 8 (Fiber Preparation)

Figure 22:
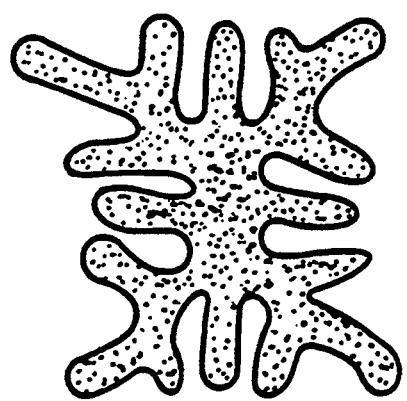
FIG. 22—schematic representation of a poly(ethylene terephthalate) fiber cross-section made using a spinneret having an orifice as illustrated in FIG. 13 (specific dimensions of spinneret orifice described in Example 8).

Poly(ethylene terephthalate) (PET) polymer of 0.6 IV was used in this example. It was extruded through a spinneret having eight orifices as shown in FIG. 13 wherein W is 0.084 mm, $X_{20}$ is 17W, $X_{22}$ is 3W, $X_{24}$ is 4W, $X_{26}$ is 60W, $X_{28}$ is 17W, $X_{30}$ is 2W, $X_{32}$ is 72W, $\theta_{10}$ is 45°, Leg B is 30W, and Leg A is 26W. The rest of the processing conditions were the same as those described in Example 1. A 100 dpf fiber was spun at 600 MPM. A sketch of the cross-section of the fiber is shown in FIG. 22. The lubricant level on the fiber was about 1%. The same lubricant as used in Example 1 was used. The above fiber spontaneously transported the aqueous Syltint Poly Red solution along the fiber surface. The value of the "X" parameter for this fiber was 1.5.

EXAMPLE 9 (Fiber Preparation)

Figure 23:
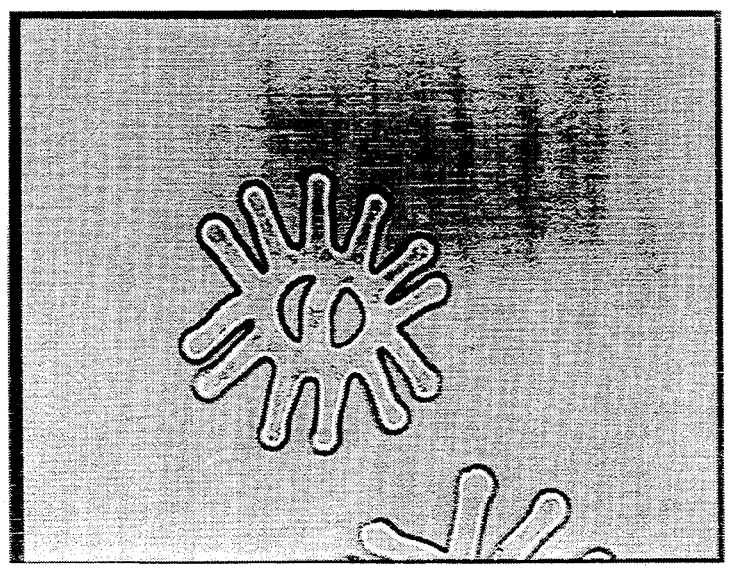
FIG. 23—photomicrograph of a poly(ethylene terephthalate) fiber cross-section made using a spinneret having an orifice as illustrated in FIG. 14 (specific dimensions of spinneret orifice described in Example 9).
Figure 24:
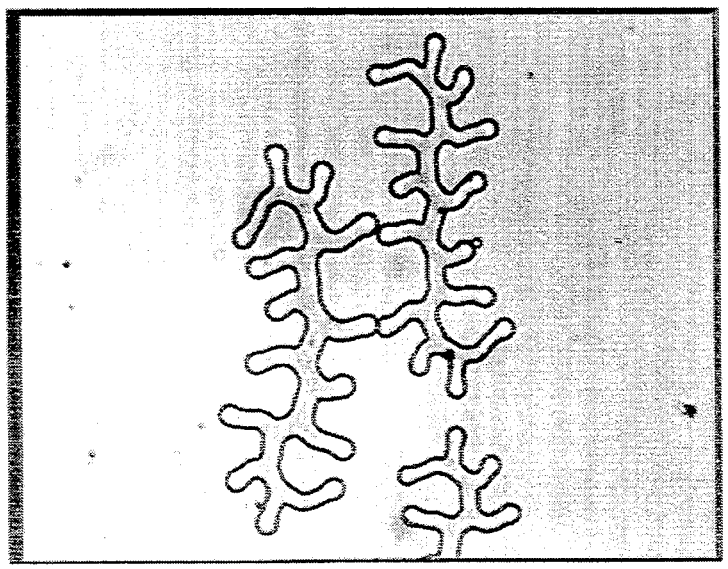
FIG. 24—photomicrograph of a poly(ethylene terephthalate) fiber cross-section made using a spinneret having an orifice as illustrated in FIG. 17 (specific dimensions of spinneret orifice described in Example 10).

Poly(ethylene terephthalate) polymer of 0.6 IV was used in this example. It was extruded through a spinneret having eight orifices as shown in FIG. 14 wherein W is 0.10 mm, $X_{34}$ is 2W, $X_{36}$ is 58W, $X_{38}$ is 24W, $\theta_{12}$ is 20°, $\theta_{14}$ is 28°, and n is 6. The rest of the extruding and spinning conditions were the same as those described in Example 1. A photomicrograph of the fiber cross-section is shown in FIG. 23 (585× magnification). A 20 dpf fiber was spun at 3000 MPM. The lubricant level on the fiber was about 1.7%. The same lubricant as used in Example 1 was used. The above fiber spontaneously transported the aqueous Syltint Poly Red solution along the fiber surface. The value of the "X" parameter for this fiber was about 2.4.

EXAMPLE 10 (Fiber Preparation)

Poly(ethylene terephthalate) (PET) polymer of about 0.6 IV was used in this example. The polymer was extruded through a spinneret having four orifices as shown in FIG. 17 wherein the dimensions of the orifices are repeats of the dimensions described in Example 2. The rest of the processing conditions were the same as those described in Example 1 unless otherwise stated. A 200 dpf fiber was spun at 600 MPM. The polymer throughput was about 7 lbs/hr. An optical photomicrograph of the fiber is shown in FIG. 14 (150× magnification). The lubricant level on the fiber was 2.0%. The same lubricant as used in Example 1 was used. The above fiber spontaneously transported the aqueous Syltint Poly Red solution along the fiber surface. The value of the "X" parameter for this fiber was about 2.2.

EXAMPLE 11 (Fiber Preparation)

Figure 18:
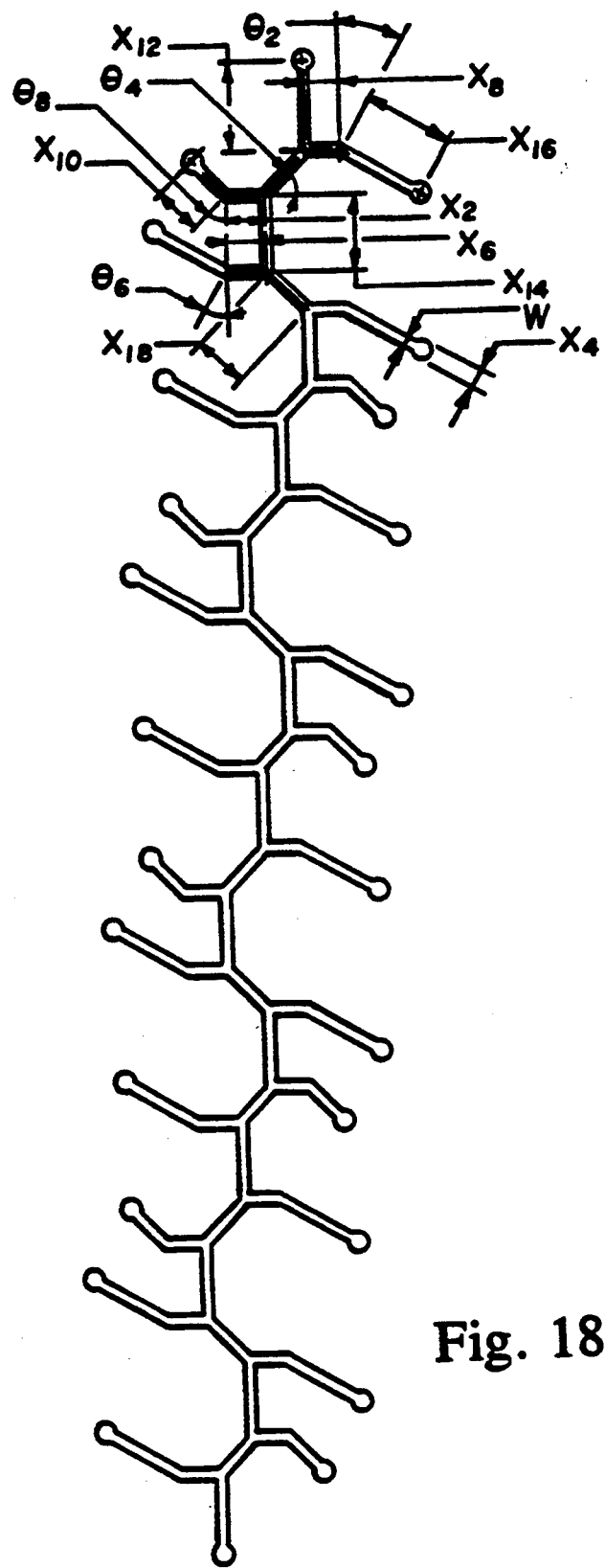
FIG. 18—schematic representation of an orifice of a spinneret having 4 repeating units, joined end to end, of the orifice as shown in FIG. 12.
Figure 19:
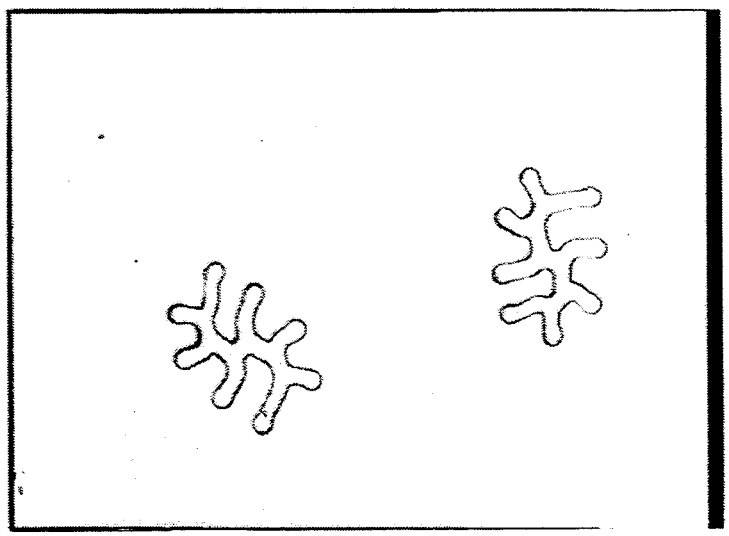
FIG. 19—photomicrograph of a poly(ethylene terephthalate) fiber cross-section made using a spinneret having an orifice as illustrated in FIG. 3 (specific dimensions of spinneret orifice described in Example 1).
Figure 20:
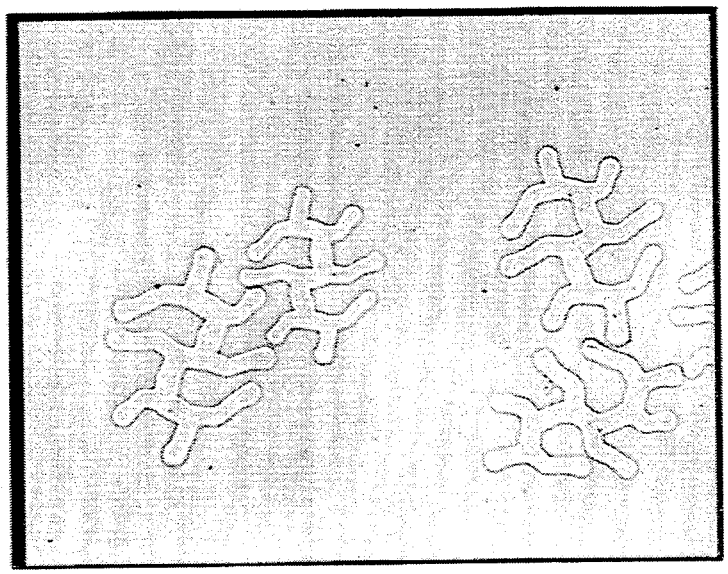
FIG. 20—photomicrograph of a polypropylene fiber cross-section made using a spinneret having an orifice as illustrated in FIG. 12 (specific dimensions of spinneret orifice described in Example 2).
Figure 25:
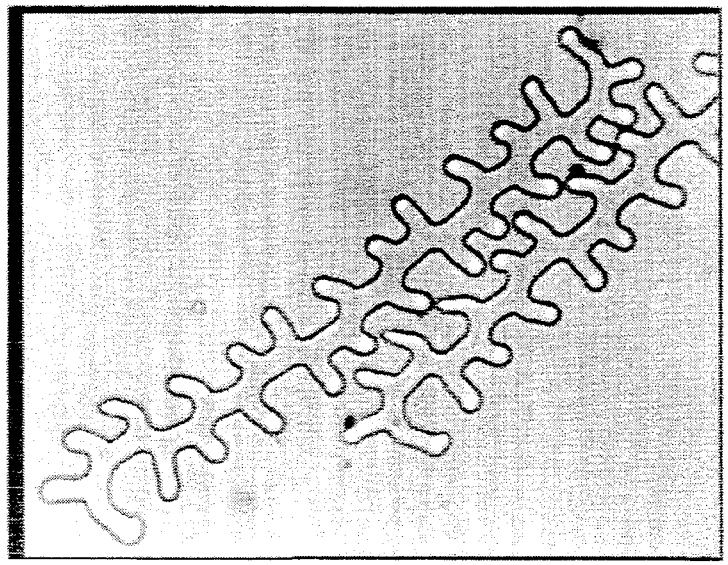
FIG. 25—photomicrograph of a poly(ethylene terephthalate) fiber cross-section made using a spinneret having an orifice as illustrated in FIG. 18 (specific dimensions of spinneret orifice described in Example 11).

Poly(ethylene terephthalate) (PET) polymer of 0.6 IV was used in this example. The polymer was extruded through a spinneret having two orifices as shown in FIG. 18 wherein the dimensions of the orifices are repeats of the dimensions described in Example 2. The rest of the processing conditions were the same as those described in Example 1. A 364 dpf fiber was spun at 600 MPM. The cross-section of the fiber is shown in FIG. 25 (150× magnification). The lubricant level on the fiber was about 2.7%. The same lubricant as used in Example 1 was used. The above fiber spontaneously transported the aqueous Syltint Poly Red solution along the fiber surface. The value of the "X" parameter for this fiber was 2.1.

EXAMPLE 12 (Fiber Preparation)

Figure 27:
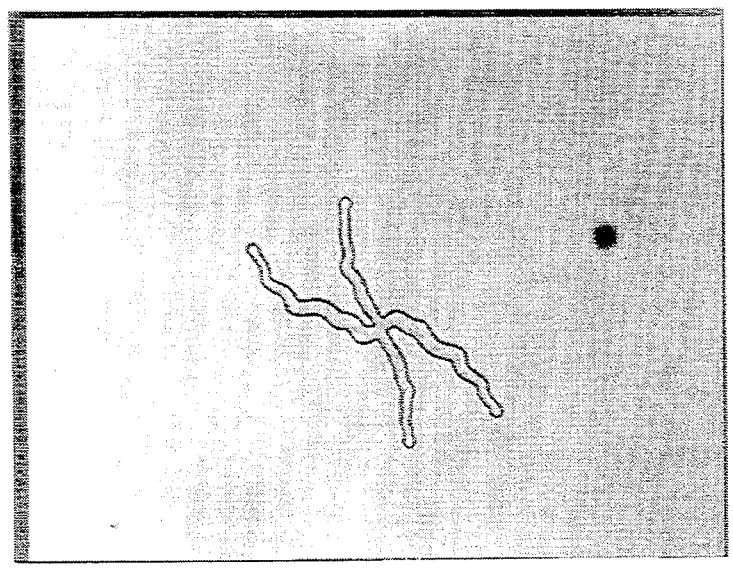
FIG. 27—photomicrograph of a poly(ethylene terephthalate) fiber cross-section made using a spinneret having an orifice as illustrated in FIG. 15 (specific dimensions of spinneret orifice described in Example 12).

Poly(ethylene terephthalate) (PET) polymer of 0.6 IV was used in this example. It was extruded through a spinneret having eight orifices as shown in FIG. 15 wherein W is 0.10 mm, $X_{42}$ is 6W, $X_{44}$ is 11W, $X_{46}$ is 11W, $X_{48}$ is 24W, $X_{50}$ is 38W, $X_{52}$ is 3W, $X_{54}$ is 6W, $X_{56}$ is 11W, $X_{58}$ is 7W, $X_{60}$ is 17W, $X_{62}$ is 28W, $X_{64}$ is 24W, $X_{66}$ is 17W $X_{68}$ is 2W, $\theta_{16}$ is 45°, $\theta_{18}$ is 45°, and $\theta_{20}$ is 45°. The rest of the processing conditions were the same as those described in Example 1. A 100 dpf fiber was spun at 600 MPM. The cross-section of the fiber is shown in FIG. 27. The lubricant level on the fiber was about 1%. The same lubricant as used in Example 1 was used. The above fiber spontaneously transported the aqueous Syltint Poly Red solution along the fiber surface. The value of the "X" parameter for this fiber was 1.3.

EXAMPLE 13 (Fiber Preparation)

Figure 28:
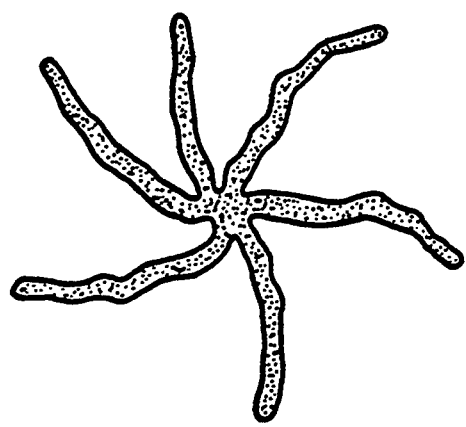
FIG. 28—schematic representation of a poly(ethylene terephthalate) fiber cross-section made using a spinneret having an orifice as illustrated in FIG. 16 (specific dimensions of spinneret orifice described in Example 13).
Figure 29:
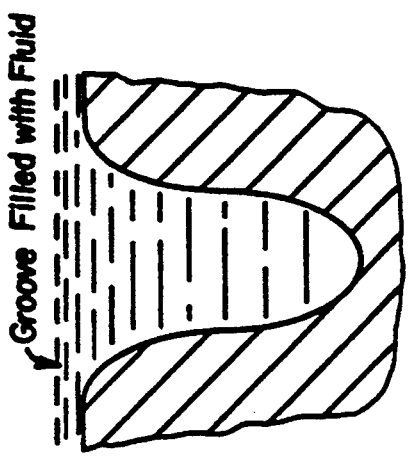
FIG. 29—a schematic representation of a desirable groove in a fiber cross-section.
Figure 30:
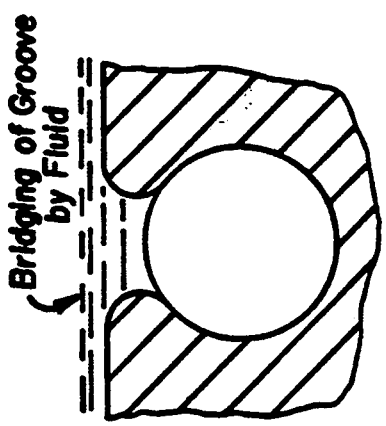
FIG. 30—a schematic representation of a desirable groove in a fiber cross-section.
Figure 31:
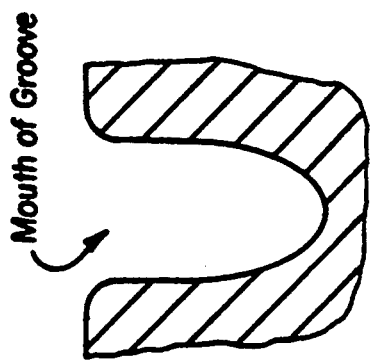
FIG. 31—a schematic representation of a desirable groove in a fiber cross-section illustrating the groove completely filled with fluid.
Figure 32:
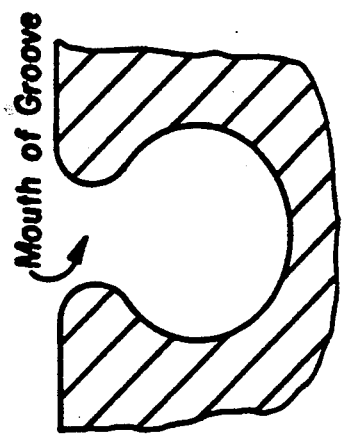
FIG. 32—a schematic representation of a groove where bridging is possible in the fiber cross-section.
Figure 33:
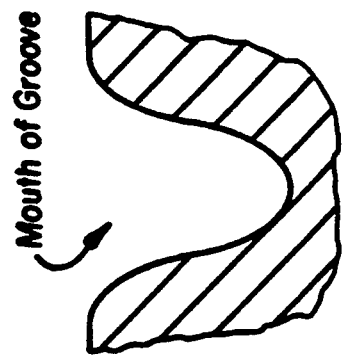
FIG. 33—a schematic representation of a groove where bridging is possible in the fiber cross-section.
Figure 34:
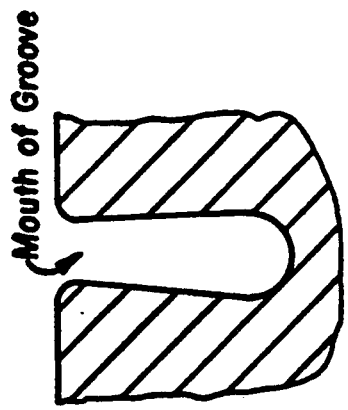
FIG. 34—a schematic representation of a groove illustrating bridging of the groove by a fluid.

PET polymer of 0.6 I.V. is used in this example. It is extruded through a spinneret having 8 orifices as shown in FIG. 16 wherein W is 0.10 mm, $X_{72}$ is 8W, $X_{74}$ is 8W, $X_{76}$ is 12W, $X_{78}$ is 8W, $X_{80}$ is 24W, $X_{82}$ is 18W, $X_{84}$ is 8W, $X_{86}$ is 16W, $X_{88}$ is 24W, $X_{90}$ is 18W, $X_{92}$ is 2W, $\theta_{22}$ is 135°, $\theta_{24}$ is 90°, $\theta_{26}$ is 45°, is $\theta_{28}$ is 45°, $\theta_{30}$ is 45°, $\theta_{32}$ is 45°, $\theta_{34}$ is 45°, $\theta_{36}$ is 45° and $\theta_{38}$ is 45°. A 20 dpf fiber is spun at 3,000 m/min. The rest of the processing conditions are the same as those used in Example 1. The lubricant level on the fiber is about 1%. The cross-section of the fiber is shown in FIG. 28. This fiber spontaneously transports the aqueous Syltint Poly Red solution along the fiber surface. The "X" value for this fiber is about 2.1.

EXAMPLES 14–20 All fibers used in these examples were made with standard polyethylene terephthalate.

EXAMPLE 14 (Example of the Invention)

Moisture and Grease Absorption Tests

The first set of samples produced consisted of various laminate structures. Samples 1 and 2 consist of 3 layer structures with a perforated pinholed susceptor on top, the spontaneously wettable nonwoven fibers (fibers which satisfy the equations as described herein) in the middle and Mylar film on the back. The 8-lobe polyester spontaneously wettable fibers were 10 denier per filament with Lubricant as defined herein hydrophilic lubricant. The Mylar film was 1.2 mils thick. In Sample 1 the nonwoven weight was 35 g/yd² while 2 had a nonwoven weight of 70 g/yd². Samples 3 and 4, Insert B type structures, were two layered structures with the nonwoven bonded to the top of the susceptor. As with the previous samples, Sample 3 had a nonwoven weight of 35 g/yd² while Sample 4 had a weight of 70 g/yd² (fabric doubled over prior to bonding). Thermal bonding of the sheets was performed using a polyester powder adhesive. Pinholes were placed into the susceptor sheet using a nonwoven needler and had a density of about 50/inch² while being about 1/32 inch in diameter.

Microwave tests could not be performed due to problems with the available susceptor film. The susceptor sheet had a metallized density much greater than specified causing it to overheat quickly during cooking resulting in curled up film due to poor heat stability. Therefore, only cold static tests were preferred. Samples 1–4 were cut to 4.7 in. square and tested by placing a fixed quantity of colored water or soybean oil on the center of the sheet using a pipette and measuring the time required for absorption. Five ml of colored water were used while only 3 ml of soybean oil were administered. Results are tabulated in Table I. As seen, the lower nonwoven weight of 35 g/yd$^2$ was insufficient and did not produce any transport. Microscopy showed that the powder adhesive pressed into the thin nonwoven effectively blocked some of the transport channels. The 3-layer structures, Insert A type structures, also showed more rapid wicking of the fluid into the rest of the structure than Insert B type structures. Water transport with these samples was excellent. In the 3-layer structures, fluid dissipation could be easily detected and followed with the naked eye as it occurred very rapidly. Grease absorption was worse but equivalent to sample 6 which was constructed substantially in the same manner as the structure described herein and referred to as Wavealites. The fibers were tested and found to be a circular fiber structure. The non-woven weight of the fibers used in the Wavealites structure was 75 g/yd$^2$. The denier per filament of the fibers was 2.5.

EXAMPLE 15 (Example of the Invention)

Preliminary Screening of Hydrophobic

Lubricant N (mineral oil based lubricant comprising about 80–83% mineral oil, about 7–9% ethoxylated sorbitan monolaurate, about 9.5–11.5% sorbitan monolaurate, and about 80–90 ppm of chlorine dioxide)

The purpose of this experiment was to evaluate the mineral oil lubricant N for grease transport. Samples were thermally bonded with no powder adhesive using a hot press. Press temperatures varied from 160° C. to 190° C. with a pressure of around 80 psi. This was by no means an optimum range. In fact, lower pressures might help transport since they will not crush the transport grooves in the fibers. Bonding was accomplished through the glycol-modified polyethylene terephthalate binder fibers (incorporated at both 20 and 30% total fiber content in these samples). For the tests, 2 ml of soybean oil were applied with a pipette similar to Example 14. Less oil was used since these tests were for preliminary screening. All samples were of the three-layer structure with nonwoven weights of 35 g/yd$^2$ and 70 g/yd$^2$. As before the 35 g/yd$^2$ samples showed poor transport. The 70 g/yd$^2$ samples exhibited full absorption of the oil in 3 minutes. Wicking was much better than samples tested in Example 14 showing the important effect of lubricant.

EXAMPLE 16 (Example of the Invention)

Microwave Tests

Samples were prepared by thermal bonding as described in Example 15 at 190° C. for 60 seconds with two different nonwovens. Both consist of 80% spontaneously wettable polyester fibers and 20% binder fibers as described above. Samples 7–10 consisted of spontaneously wettable polyester fibers which were 5.5 denier/filament ×2.0 inches long, having a hydrophobic lubricant N applied thereto, and weighing 27.8 g/yd$^2$. Sample 11 consisted of 17 denier/filament ×2.0 inch helical crimped "H" cross-section fibers with Lubricant M as defined herein and a nonwoven weight of 49.8 g/yd$^2$. This nonwoven also has a high level of directionality in the machine direction. All samples tested used two layers of the nonwoven giving sample weights of 55.6 and 99.5 g/yd$^2$ for the Lubricant M coated and "H" cross-sectioned samples, respectively.

For the tests, the nonwovens were bonded into the standard 3-layer (Insert A type) and 2-layer (Insert B type) absorber structure as before except this time a different susceptor was used. For the 3-layer samples, MicroCrisp susceptor film was used with a needled hole density of about 65 holes/inch$^2$ and a slightly more clumped pattern. For the 2-layer samples, regular susceptor film was laminated to a paperboard substrate which reduced the curling and cracking. Samples used were approximately 5 inches square. Two half-strips of bacon were laid on the sample and cooked in the microwave oven for varying times. Observations and results are tabulated in Table II.

As can be seen, the 3-layer structures worked well for both fibers although the "H" section seemed to work much better even with the hydrophilic lubricant. This is most likely due to the fact that the fiber denier and the sheet weight are higher. To analyze its water absorption capabilities, one of the 3-layer "H" sheets was administered with 3 ml of colored water via a pipette as in previous tests. This liquid was completely absorbed in 25 seconds, far superior to any of the previous samples. Water transport for this sample is superior to other spontaneously wettable polyester fiber samples although it should be pointed out that the increased hole density and nonwoven weight also contributed to the improved performance.

EXAMPLE 17 (Example of the Invention)

Saturation Tests of These Fibers

The Hormel microwave bacon pad was included in this testing. The denier per filament of the Hormel pad was 1.6. In this test, samples of each of the nonwovens was saturated in fluid (canola oil or water) for 1 minute, removed, and held in air for one minute to allow dripping to complete. Samples were weighed before and after to determine saturation liquid content. This data is tabulated in Table III. The Hormel pad is superior in holding capacity, but it is also a much thicker pad being about $\frac{1}{8}$ inch thick which gives more internal void space for retaining the fluids. The spontaneously wettable polyester fiber samples were all basically 1 layer of nonwoven folded and creased except for the last one in the table. Proper formation and bulking of the nonwoven should give much improved holding capacity which would more than likely be superior to the Hormel sheet.

EXAMPLE 18 (Example of the Invention)

(Insert C Type) Cooking Tests in Hormel Bacon Pouch

For this example, the Hormel absorbing pad was removed and various nonwovens of approximately the same size replaced and the pouch then microwaved. The average denier filament of the cross-section of the fibers used in the Hormel absorbing pad was 2.5. The Hormel pad prior to cooking was 6.6 grams. After cooking, it weighed 36.9 g indicating a fluid absorption of 30.3 grams. No dripping occurred after microwaving with this pad. Cooking time is 3–4 minutes which is much longer than with the susceptor sheets used in Example 16. An "H" section spontaneously wettable fiber pad (same material as in Examples 16 and 17) produced by compressing three sheets of nonwoven (new sheet weight being 149.4 g/yd$^2$) with a hot nip roll system, was cut into approximately the same shape and it had a dry weight of 3.8 grams. Its after-cooking weight was 35.8 grams indicating a net fluid absorption of 32 grams higher than the Hormel pad. When this pad was turned sideways, it began to drip slightly after about 30 seconds. A small increase in pad weight would absorb the excess. Also, other tests showed that these 3-ply sheets had a lower saturation level than the single layers probably due to the excessive pressure either damaging the fibers or removing the free volume between fibers.

The last test involved placing two ShurWipe paper towels purchased from Fort Howard Company, Sample 5, trimmed down in size slightly, into the pouch and microwaving. The dry weight of the two towels was 5.8 g, the after-cooking weight was 32.2 g, and the net fluid absorption was around 26 grams. However, when removing the towels from the pouch there was excessive dripping of the grease.

TABLE I

| Sample | Water Abs. Time | Soybean Oil Abs. Time | Comments |
|---|---|---|---|
| 1 (35 g/yd$^2$, 3-layer) | >25 min. | >10 min. | Slow wicking of water, no apparent oil transport |
| 2 (65 g/yd$^2$, 3-layer) | 2.75 min. | 8 min. | No dripping, 3 ml additional water added and fully absorbed in 1.6 minutes |
| 3 (35 g/yd$^2$, 2-layer) | >16 min. | >10 min. | ⅔ of sheet covered with oil, but still puddled, no transport |
| 4 (70 g/yd$^2$, 2-layer) | 1.75 min. | >10 min. | No dripping of water. This sample also held additional 3 ml of water easily but oil absorption was poor. |
| 5 ShurWipe Paper Towel (Fort Howard Company) | 20 sec. | 1.5 min. | Rapid wetting but poor holding power. Most of both liquids passed through and was not held by towel. |
| 6 Wavealites as referred to herein | See note | 7 min. | Water-90% of towel covered in 2 minutes but still puddled after 8 minutes. Appears saturated. |

TABLE I-continued

| Sample | Water Abs. Time | Soybean Oil Abs. Time | Comments |
|---|---|---|---|
| | | | No dripping with oil. |

TABLE II

| Sample | Description | Results |
|---|---|---|
| 7 | 2-layer, Lubricant N lube fibers | Cooking time was 1.5 minutes. Grease absorbed covered a surface area twice that of the bacon. Good bacon texture. |
| 8 | 3-layer, Lubricant N lube fibers with poor bonding adhesion | Same as 104-3 but grease absorpt on over a larger area. Poorer bonding helps transport. |
| 9 | 3-layer, Lubricant N lube fibers | Excellent transport. No grease on surface and no dripping. cooking time is 1 min. with good bacon texture. 8.2 g sheet wt., 24.9 g uncooked bacon wt., 9.3 g of grease/water absorbed. |
| 10 | 3-layer, Lubricant N lube fibers, extra thick nonwoven layer (111.2 g/yd$^2$), folded into pouch. | Some charring on top edges of pouch where overlap occurred. Better texture after 1 minute cooking. 9.7 g sheet wt., 18.7 g uncooked bacon wt., 9.5 g of fluids absorbed. |
| 11 | 3-layer, "H" cross-section fibers | Excellent absorption, 8.7 gram sheet wt., 23.8 g uncooked bacon wt., 9.6 g of absorbed fluids. No dripping, best absorption even with hydrophilic lubricant. |

TABLE III

| | Water Absorption Tests | | | Canola Oil Absorption Tests | | |
|---|---|---|---|---|---|---|
| Sample | Dry Wt. (g) | Saturated Wt. (g) | Holding Capacity | Dry Wt. (g) | Saturated Wt. (g) | Holding Capacity |
| 12 Wavealites as referred to herein | 0.201 | 1.065 | 4.30 X | 0.188 | 1.16 | 5.17 X |
| 13 Hormel pad of Example 17 | 0.327 | 4.840 | 13.80 X | 0.308 | 4.64 | 14.10 X |
| 14 70% Lubricant N lube 4SW*/30% 410 binder | 0.190 | 0.840 | 3.42 X | 0.172 | 1.66 | 8.65 X |
| 15 "H" cross-section with Lubricant M lube (same as Sample 11 in Example 16) | 0.289 | 2.550 | 7.80 X | 0.283 | 2.88 | 9.20 X |
| 16 80/20 4SW*/410 binder with Lubricant M lube, same as in Example 1. Two layers of nonwoven bonded together (70 g/yd$^2$) | 0.159 | 1.075 | 5.76 X | 0.162 | 1.21 | 6.50 X |

*"4SW" is used as a designation for spontaneously wettable fibers.

EXAMPLE 19 Single Filament Wetting Velocities

Various polyester fibers were tested to determine aqueous fluid transport velocities. A single drop of aqueous Syltint PolyRed was applied to a single fiber as in Example 1 and the transport monitored using a microscope with an image analysis system. The velocity of the fluid front as it moved along the fiber was then determined from the image analyzer and compared for different fibers which are listed in Table 4. Sample A is a standard round cross-section, low denier fiber produced commercially. The fiber was made from standard polyethylene terephthalate. It did not spontaneously wet so no velocity was obtained. Samples D and E are the same fiber with different crimping methods. The helical crimp was found to be less detrimental than the stufferbox crimp on transport properties. As seen in the table, velocity goes up as denier increases. This is due to the enlarged channels providing more surface area for the fluid. Tests with n-decane and hydrophobic lubricants were not performed.

TABLE 4
Single Filament Wetting Examples

| Fiber Ref. | Description | Denier | Velocity |
|---|---|---|---|
| A | circular cross-section, mineral oil lubricant | 1.5 | 0 mm/sec[a] |
| B | 8-lobe cross-section, Lubricant O hydrophilic lubricant, stufferbox crimp | 5.5 | 6.4 mm/sec |
| C | H cross-section, Lubricant M lubricant, helical crimp | 17 | 17 mm/sec |
| D | 8-lobe cross-section, Lubricant M lubricant, stufferbox crimp | 25 | 19 mm/sec |
| E[c] | 8-lobe cross-section, Lubricant M lubricant, helical crimp | 25 | 24 mm/sec |

[a]This sample did not spontaneously transport. Drop was elliptical with a visible contact angle. Note also that Sample A is a typical commercial fiber.
[b]This lubricant is similar to Lubricant M except the level of antistat is greater.
[c]Samples D and E are the same fiber with different crimping methods.

EXAMPLE 20 Preparation of Calender Bonded Samples

Samples were produced conforming to the description of Insert B as described for the invention using a calender bonding system. The fibers were 5.5 by 2 inch denier, 8-leg, spontaneously wettable with Lubricant N hydrophobic lubricant (same as Sample 7 above). Mylar and Thermx films were run in-line with the nonwoven through the calender roll. Calender roll temperatures were 230° C., system pressure was 300 pli, and throughput speed was 60 ft/minute. The calender roll had an embossing pattern consisting of squares 1/32 inch on each side and a hole density of about 250/sq. inch. No binder fiber was used in this bonding. The Thermx film had less well defined embossing sites but also exhibited better fluid transport. The Thermx film as also not heat-set. Fluid transport with these samples was slightly worse than non-calendered samples. This is most likely due to the crushing and compacting of void space and transport channels. It is also believed that much of the lubricant was "burned off" in the calender rolls which would lower oil transport. Bonding between the film and fibers was good. Addition of a perforated top layer as described for the invention for Insert A resulted in very good fluid transport. A sample of the laminate was trimmed and placed in the bottom of a box of Banquet fried chicken (ConAgra Foods) and microwaved. The laminate successfully wicked up the grease as it ran down to the bottom resulting in chicken with much better taste and texture over chicken which was cooked alone or with paper towels only.

For Examples 21–24, data is divided into three categories: surface tension measurements, new microwavable structures and related absorption rates, and taste/cooking tests on various foodstuffs. Each is described in more detail as follows:

EXAMPLE 21 Adhesion Tension Tests

Adhesion tension tests were performed using water, n-decane, and canola oil as the test fluids. Adhesion tensions were measured using a wetting balance. Samples were prepared from a high inherent viscosity poly-(ethylene terephthalate homopolymer) film coated with the various lubricants. The values of adhesion tensions and contact angles for the different lubricants and the different test fluids are listed in Table IV. Surface tensions for the water, n-decane and canola oil measured on a Wilhelmy Plate were 72.4 dynes/cm, 24.5 dynes/cm, and 34.4 dynes/cm, respectively. Adhesion tension is defined herein as the surface tension (liquid-vapor) multiplied by the cosine of the contact angle.

Based on the data, Lubricant N is a preferred hydrophobic lubricant. It exhibits lower adhesion tensions for water and reasonably high values for the oil and n-decane. However, uncoated PET 10388 alone is one of the more hydrophobic surfaces tested. This translates to good transport of oily substances and poor transport of aqueous fluids. Lubricant M and Raycalube both show high adhesion tensions for both oil (and n-decane) and water. Based on the data, however, Lubricant M and Raycalube are good transporters of aqueous and oily substances. In fact, the Lubricant M and Raycalube appear to be better at oil transport than the Lubricant N.

For most packaging applications transport of both oil and water is needed. Lubricant M or Raycalube are lubricants of choice for these applications. If selective transport of oil is desired exclusively, then Lubricant N is the lubricant of choice.

To determine the required fiber cross-section (i.e., the "X" factor) based on the contact angles of the fluid, the following equation is used:

$$(1 - X \cos \theta_a) < 0,$$

where X is a geometry factor and $\theta_a$ is the advancing contact angle of the fluid being transported. If the quantity on the left hand side is greater than 0 then spontaneous wetting does not occur. X is defined as $$X = \frac{P_w}{4r + (\pi - 2)D}$$

where $P_w$ is the wetted perimeter of the fiber, r is the radius of the circle which circumscribes the fiber cross-section and D is the minor axis dimension across the fiber cross-section. If these equations are used in conjunction with the contact angles in Table IV, the minimum shape factors needed for spontaneous wetting can be determined. These are listed in Table V. To have a fiber which will spontaneously wet one fluid and not another, the X-factor for the fiber ideally must lie between the minimum required factors for the two fluids.

For example, to have a fiber with no lubricant which will spontaneously transport canola oil and not water requires an X-factor higher than 1.09 but lower than 2.75. Note that these values for the minimum X-factor are approximate only. They do not reflect the lubricant distribution on/in the fiber, the packing of the fibers and the bonding on the fibers to the backsheet. Packing and bonding of the fibers relate to the effective number of "fluid channels" that will be present in the final structure.

EXAMPLE 22

Methods of sample or microwavable insert structure preparation have been studied and tested. The most important change has been the removal of the glycol-modified poly(ethylene) terephthalate binder fibers incorporated at both 20 and 30% total fiber content. Instead, standard PET spontaneously wettable (SW) fibers were bonded together using a calender bonding roll. The calender roll has a pattern of diamond shaped embossing points (approximately 15 per lineal inch) which compress and fuse the nonwoven card of fibers and bonds them to the plastic backsheet or susceptor film. Embossed area is approximately 12% of the total. All samples described in this invention report use calender bonding to hold the fibers together.

The backsheets used in Examples 21 et seq. were either metallized PET or plain THERMX. The metallized PET is commercial, oriented and heatset PET susceptor which is 1 mil thick. The THERMX is as cast and is 0.5 mils thick. One important difference between these two films is the level of crystallinity. The PET is oriented and heatset (which provides considerable crystallinity) in order to give it the necessary thermal and dimensional stability. Because THERMX crystallizes so quickly, it can be used in its cast, amorphous state. Applications for THERMX as a susceptor base (in both oriented and unoriented forms) are currently being pursued in the laboratory because of its rapid crystallization rate which provides excellent dimensional stability at high temperatures.

In addition, many of the samples have been laminated to paperboard using a paper coater. This lamination process bonded the metal side of the susceptor to the paperboard using an adhesive in the same manner that a conventional susceptor would be bonded to paperboard. As this process is well understood by those skilled in the art, and the lamination did not affect absorption characteristics of the fibers, it will not be discussed further.

Also, some of the tests with the fibers show a tendency for small fibers to pull out into the food when it is cooked. This can be remedied in a number of ways. One is by use of a better designed calender roll which will provide better, more uniform bonding of the fibers. Another method useful in the invention is the application of a spun-bonded polyester layer to the top of the fiber nonwoven during calendering. This layer is made of continuous, small denier PET fibers and is very thin. It acts as a net to trap and hold the other fibers. Another advantage to the spun bonded layer is that calender bonding need not be as heavily compressed since the spun bonded layer acts to hold the fibers together. This improves transport and holding capacity. Samples described in Examples 19–24 do not have the spun bonded layer attached.

EXAMPLE 23 Testing of the Microwavable Insert Structures

Figure 52:
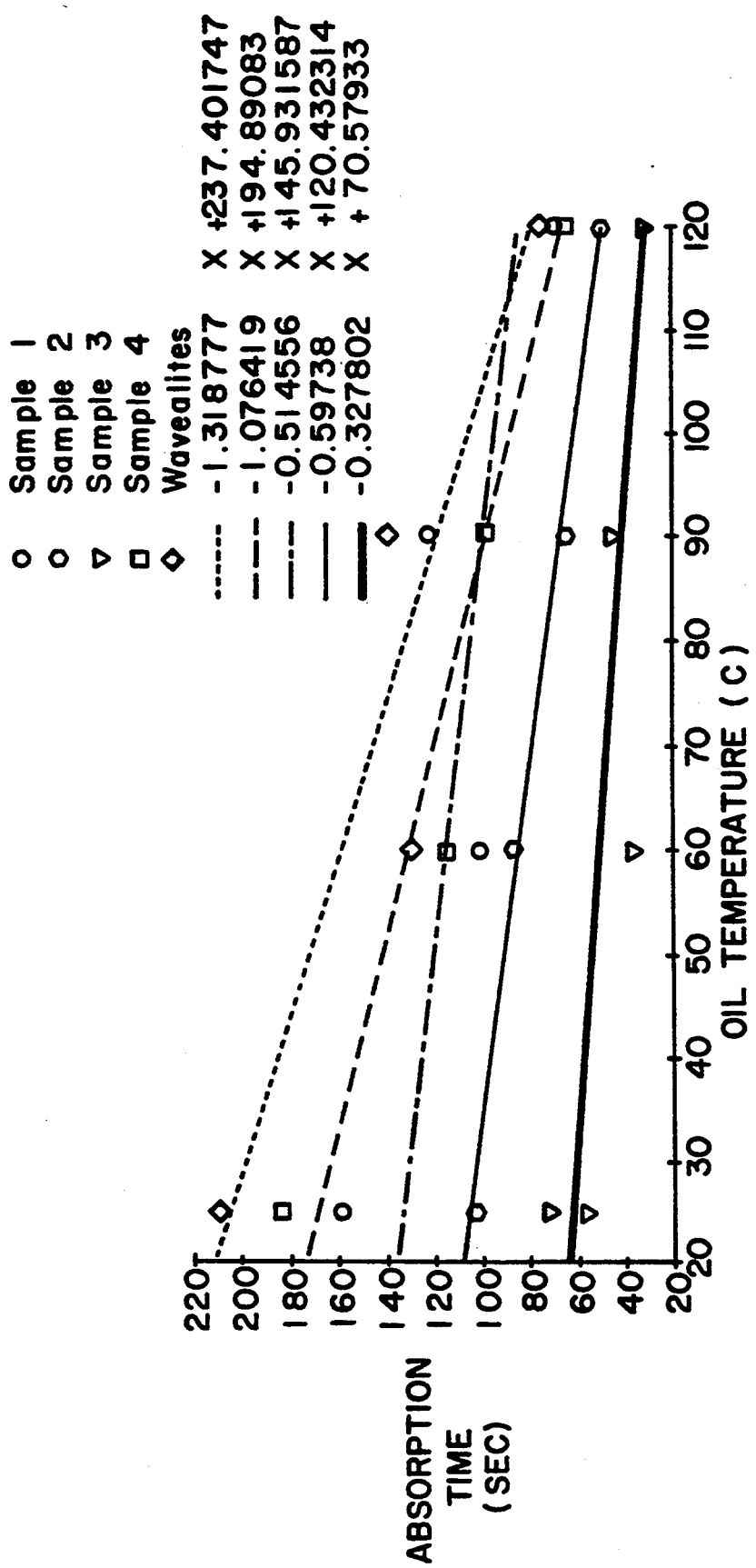
FIG. 52—a graphical representation of absorption times for various microwavable inserts.

Examples or samples of the structures are described in Table VI. The fibers used have X-factors of around 1.9 to 2.1. Absorption tests were performed on the samples using canola oil. One milliliter of canola oil was placed on the sample using a pipette. The time for complete absorption was then measured using a stopwatch. Tests were repeated at different temperatures to determine the effects of viscosity. A numerical summary of these results is shown in Table VII. A graphical depiction of the absorption times is shown in FIG. 52. A sample of Wavealites (International Paper) was also included for comparison. Saturation tests were performed by soaking the top layer of film in canola oil. The film was then turned on edge and held there for 30 seconds to allow the excess oil to drain off. The saturation weight is calculated as the oil weight over the original dry weight of the sample. Saturation values are tabulated in Table VII.

For Samples 1 through 3, the times listed are the average of the measurements made on the center of the roll with those made on the edge. The calender roll did not produce a good bond (insufficient compression) in the center due to the design of the roll. The outer edges of the film were, on the other hand, overly compressed. This had a considerable effect on the fluid transport. The outer edges were so heavily compacted that they had no pore space to hold or move fluid. The absorption times for the outer edge were typically twice as long as those for the looser middle section. A calender roll which is properly designed will solve most of these problems.

Comparing the absorption rates between Samples 1 and 2 shows the lubricant M to be better for transporting canola oil than the N lubricant. The samples are virtually identical except for the lubricant. For water absorption, the M shows extremely fast absorption (less than 5 seconds for 1 ml) whereas the Lubricant N shows no spontaneous wetting; in other words, the water beads up on the surface. This can be further explained by looking at the X-factors in Table V. For water transport, the minimum X-factor for spontaneous transport with the lubricant M is 2.12 whereas with the lubricant N it is 2.75. The X-factor for these fibers is around 1.9 to 2.1 which is sufficiently close to 2.12 that it can be assumed that the fiber meets the criteria for spontaneous wetting (with Lubricant M) within experimental error. It is sufficiently below the 2.75 for the Lubricant N so here spontaneous wetting is not predicted. Saturation capacities listed in Table VII show Sample 1 to have a slightly larger holding capacity. Note that the difference between the saturation capacities is fairly small and could be attributable to other circumstances.

The effect of nonwoven weight can be determined by comparing Samples 1 and 3. Sample 3 has twice as much fiber as Sample 1 but its absorption rate is 3 times faster. Saturation capacities for the two structures are about the same. Note, however, that Sample 3 can hold more oil by weight since the capacities listed are based on the original dry weight (and the dry weight of Sample 3 is larger since it contains more fiber).

Sample 4 is an example of a THERMX backed structure. It has a very low nonwoven weight (only 33 g/yd$^2$) and uses a high denier fiber (12 denier). Absorption times with this sample are longer than with Samples 1 through 3 but still less than the Wavealites. In addition, its nonwoven weight is less than half that of the Wavealites sample. Its saturation capacity is lower than any of the other samples. This is believed to be attributable to the lower nonwoven weight and higher denier. Also note that all of Samples 1 through 3 have higher saturation capacities than the Wavealites.

EXAMPLE 24 Sample Applications and Cooking Tests

All cooking tests performed used Sample 2 absorber structures. In most cases the original package was modified to incorporate our absorbers. An original, unmodified package was also cooked as a control.

A. Ore Ida French Fried Potatoes

Ore Ida french fries were packaged in small single-serve paperboard containers. A susceptor film was bonded to the bottom of the package to enhance browning. In the original package, french fries were soggy and greasy even with the standard susceptor. For the modified package, the susceptor film was replaced with a piece of the Sample 2 absorber described earlier. After cooking with this film, the french fries were much crispier and not soggy, enhancing overall flavor.

B. Healthy Choice French Bread Pizza (Con Agra Foods)

The normal french bread pizza is packaged in a film wrap and comes with a metallized susceptor/carton for cooking. Cooking with the original carton produced a pizza crust which was browned but soggy in some places, particularly the bottom center where moisture could not escape. Since the susceptor film could not be removed from this carton, a layer of the susceptor absorber was placed over it. The modified structure produced a slightly more brown crust, no sogginess on the bottom and more uniform melting of the cheese on top. All of this was done with 30 seconds less cooking time.

C. Hot Pockets Sandwiches

The normal package for this product is a metallized paper sleeve which fits around the sandwich. Cooking with this structure produced a fairly good sandwich although some cold spots were prevalent. A film of grease was noticeable on the metallized paperboard sleeve after cooking. To modify the package, a susceptor absorber was placed inside the sleeve over the standard metallized film. There was noticeable fluid absorption on the pad after cooking. Both samples were dry but the modified package was slightly better. The modified package also produced a more uniformly heated and browned sandwich in the same cooking time.

D. Armour Bacon

There is no standard microwave packaging for this product. Normally one uses a microwave plate or a lot of paper towels. To test bacon with the modified package, 2 strips of bacon (approximately 40 grams total) were placed on a sheet of the absorber susceptor (Sample 2). Bacon weight after cooking was typically 14 to 16 grams (2 pieces) with around 12 grams of water vapor being lost to the air. Approximately 13 grams of oils and liquids were left over to be absorbed by the pad. Typical sheet weights (dry) of susceptor absorber were 3 to 4 grams. Sample 2 structures reached saturation before absorbing all of the fluids so a film of fluid was still present. Sample 3 films did better absorbing all of the grease since they had a greater fluid holding capacity. For cooking larger quantities of bacon, a thicker nonwoven will be required, probably around 100 g/yd². For small quantities, the 3-layer susceptor absorber structure is preferred.

E. English Muffin

A plain English muffin was cooked on both a piece of conventional susceptor film and a susceptor absorber like Sample 2. The muffin was more crispy on the standard susceptor structure. Also there was very little moisture absorbed on the susceptor absorber film. For breads, it is probably better that the food be in direct contact with the metallized film so that sufficient browning may occur.

TABLE IV

Adhesion Tension Data

| Lubricant | Water* | n-Decane | Canola Oil |
|---|---|---|---|
| None | 11.8 (80.6°) | 23.1 (19.2°) | 31.6 (23.2°) |
| PM 3300 (mineral oil) | 26.8 (68.3°) | 23.6 (15.5°) | 29.3 (31.7°) |
| 5% Raycalube PC | 44.5 (52.1°) | 24.1 (10.7°) | 33.0 (16.1°) |
| Lubricant M | 34.2 (61.8°) | 24.1 (10.7°) | 32.1 (21.1°) |

*Adhesion tension data listed in units of dynes/cm. Contact angles are in parentheses.

TABLE V

Minimum Shape Factors (X) for Spontaneous Wetting

| Lubricant | Water | n-Decane | Canola Oil |
|---|---|---|---|
| None | 6.12 | 1.06 | 1.09 |
| Lubricant N (mineral oil) | 2.75 | 1.04 | 1.18 |
| Raycalube PC | 1.63 | 1.02 | 1.04 |
| Lubricant M | 2.12 | 1.02 | 1.07 |

TABLE VI

Microwavable Structures and Fibers

| Example | Description | Fiber | Lubricant | Nonwoven Wt. |
|---|---|---|---|---|
| 1 | 2-layer structure, fiber bonded to standard metallized PET susceptor film | 8-let spontaneously wettable (SW), 5.5 × 2″ denier | Lubricant N | 37 g/yd2 |
| 2 | Same as Example 1 except for different lubricant | 8-leg SW, 5.5 × 2″ denier | Lubricant M | 40 g/yd2 |
| 3 | Same as Example 1 but double layer of nonwoven was used. Sample ran through | 8-leg SW, 5.5 × 2″ denier | Lubricant N | 66 g/yd2 |

TABLE VI-continued

Microwavable Structures and Fibers

| Example | Description | Fiber | Lubricant | Nonwoven Wt. |
|---|---|---|---|---|
| | calendar twice to get sufficient bonding. | | | |
| 4 | 2-layer structure, fiber bonded to unmetallized cast THERMX film | 8-leg SW, 5.5 × 2" denier | Lubricant N | 33 g/yd2 |
| w | Wavealites (International Paper) | 2.5, round cross-section | ? | 77 g/yd2 |

TABLE VII

Canola Oil Absorption Tests

| | Canola Oil Test Temperature | | | | |
|---|---|---|---|---|---|
| Example No. | 25° C. | 25° (repeat) | 60° C. | 90° C. | 120° C. |
| 1* | 107 sec. | 160 sec. | 102 sec. | 123 sec. | 73 sec. |
| 2* | 105 sec. | 105 sec. | 87 sec. | 65 sec. | 49 sec. |
| 3* | 74 sec. | 58 sec. | 37 sec. | 46 sec. | 33 sec. |
| 4* | 160 sec. | 185 sec. | 115 sec. | 100 sec. | 70 sec. |
| Wavealites | 210 sec. | — | 130 sec. | 140 sec. | 75 sec. |

*Values shown are the average of measurements on the side and middle of the sample.

TABLE VIII

Saturation Capacities

| Sample No. | Holding Capacity |
|---|---|
| 1 | 5.5X |
| 2 | 5.0X |
| 3 | 5.4X |
| 4 | 3.3X |
| Wavealites | 4.1X |

We claim:

1. An insert useful in a microwavable food container comprising first and second outer layers, and an intermediate layer between and bonded to said first and said second outer layers, wherein
said first layer comprises a plastic layer further comprising openings and is in position to be adjacent to food,
said intermediate layer comprises an absorbent material comprising fibers, and
said second outer layer is a substrate which is stable to microwave heating conditions,
wherein said intermediate layer comprises at least one fiber having at least one continuous groove oriented axially along the fiber wherein said fiber satisfies the following equation:

$(1 - X \cos \theta_a) < 0$, wherein
$\theta_a$ is selected from the group consisting of the advancing contact angle of water and the advancing contact of n-decane measured on a flat film made from the same material as the fiber and having the same surface treatment, if any,
X is a shape factor of the fiber cross-section that satisfies the following equation:

$$X = \frac{P_w}{4r + (\pi - 2)D}$$

wherein
$P_w$ is the wetted perimeter of the fiber and r is the radius of the circumscribed circle circumscribing the fiber cross-section and D is the minor axis dimension across the fiber cross-section.

2. The insert of claim 1 wherein said plastic layer comprises a metallized coating of heat susceptor thickness.

3. The insert of claim 1 wherein said plastic layer comprises a heating body further comprising a supporting sheet and a non-metallic, active microwave absorber which has been applied to said supporting sheet.

4. The insert of claim 1 wherein said absorbent material comprising at least one first fiber having at least one continuous groove oriented axially along the fiber and wherein said fiber satisfies the following equation:

$(1 - X \cos \theta_a) < 0$, wherein
$\theta_a$ is the advancing contact angle of water measured on a flat film made from the same material as the fiber and having the same surface treatment, if any,
X is a shape factor of the fiber cross-section that satisfies the following equation:

$$X = \frac{P_w}{4r + (\pi - 2)D}$$

wherein
$P_w$ is the wetted perimeter of the fiber and r is the radius of the circumscribed circle circumscribing the fiber cross-section and D is the minor axis dimension across the fiber cross-section, and at least one second fiber having at least one continuous groove oriented axially along the fiber and wherein said fiber satisfies the following equation:

$(1 - X \cos \theta_a) < 0$, wherein
$\theta_a$ is the advancing contact angle of n-decane measured on a flat film made from the same material as the fiber and having the same surface treatment, if any,
X is a shape factor of the fiber cross-section that satisfies the following equation:

$$X = \frac{P_w}{4r + (\pi - 2)D}$$

wherein
$P_w$ is the wetted perimeter of the fiber and r is the radius of the circumscribed circle circumscribing the fiber cross-section and D is the minor axis dimension across the fiber cross-section.

5. The insert of claim 4 comprising at least 2 layers.

6. The insert of claim 1 wherein said second outer layer is selected from the group consisting of a plastic film layer, paper or paperboard.

7. The insert of claim 1 wherein said layers are adhesively bonded together.

8. The insert of claim 1 wherein said layers are thermally bonded together.

9. The insert of claim 1 wherein said absorbent layer comprises a nonwoven made from polyester staple fibers.

10. The insert of claim 9 wherein said polyester staple fibers of said nonwoven are bonded together during use of a calendering roll method.

11. The insert of claim 10 wherein a spun-bonded polyester layer is applied to the top of said nonwoven during said calender roll method.

12. An insert useful in a microwavable food container comprising a first layer and a second layer bonded thereto, wherein
said first layer comprises a plastic layer, and
said second layer comprises absorbent material comprising fibers and is in position to be adjacent to food in said container, wherein said second layer comprises at least one fiber having at least one continuous groove oriented axially along the fiber and wherein said fiber satisfies the following equation:

$$(1 - X \cos \theta_a) < 0,$$

wherein
$\theta_a$ is the advancing contact angle of water. measured on a flat film made from the same material as the fiber and having the same surface treatment, if any,
X is a shape factor of the fiber cross-section that satisfies the following equation:

$$X = \frac{P_w}{4r + (\pi - 2)D}$$

wherein
$P_w$ is the wetted perimeter of the fiber and r is the radius of the circumscribed circle circumscribing the fiber cross-section and D is the minor axis dimension across the fiber cross-section.

13. An insert useful in a microwavable food container comprising a first layer and a second layer bonded thereto, wherein
said first layer comprises a plastic layer, and
said second layer comprises absorbent material comprising fibers and is in position to be adjacent to food in said container, wherein said second layer comprises at least one fiber having at least one continuous groove oriented axially along the fiber and wherein said fiber satisfies the following equation:

$$(1 - X \cos \theta_a) < 0,$$

wherein
$\theta_a$ is the advancing contact angle of n-decane measured on a flat film made from the same material as the fiber and having the same surface treatment, if any,
X is a shape factor of the fiber cross-section that satisfies the following equation:

$$X = \frac{P_w}{4r + (\pi - 2)D}$$

wherein
$P_w$ is the wetted perimeter of the fiber and r is the radius of the circumscribed circle circumscribing the fiber cross-section and D is the minor axis dimension across the fiber cross-section.

14. The insert of claim 12 or 13 wherein said plastic layer comprises a metallized coating of heat susceptor thickness.

15. The insert of claim 12 or 13 wherein said plastic layer comprises a heating body further comprising a supporting sheet and an active microwave absorber which has been applied to said supporting sheet.

16. An insert useful in microwavable food container comprising an absorbing pad, said pad comprising:
microwave radiation transparent and grease absorbant fibers wherein at least one said fiber has at least one continuous groove oriented axially along the fiber and wherein said fiber satisfies the following equation:

$$(1 - X \cos \theta_a) < 0,$$

wherein
$\theta_a$ is the advancing contact angle of water measured on a flat film made from the same material as the fiber and having the same surface treatment, if any,
X is a shape factor of the fiber cross-section that satisfies the following equation:

$$X = \frac{P_w}{4r + (\pi - 2)D}$$

wherein
$P_w$ is the wetted perimeter of the fiber and r is the radius of the circumscribed circle circumscribing the fiber cross-section and D is the minor axis dimension across the fiber cross-section.

17. An insert useful in microwavable food container comprising an absorbing pad, said pad comprising:
microwave radiation transparent and grease absorbant fibers wherein at least one said fiber has at least one continuous groove oriented axially along the fiber and wherein said fiber satisfies the following equation:

$$(1 - X \cos \theta_a) < 0,$$

wherein
$\theta_a$ is the advancing contact angle of n-decane measured on a flat film made from the same material as the fiber and having the. same surface treatment, if any,
X is a shape factor of the fiber cross-section that satisfies the following equation:

$$X = \frac{P_w}{4r + (\pi - 2)D}$$

wherein
$P_w$ is the wetted perimeter of the fiber and r is the radius of the circumscribed circle circumscribing the fiber cross-section and D is the minor axis dimension across the fiber cross-section.

18. The insert of claim 16 or 17 wherein a vapor tight microwave radiation transparent enclosure surrounds said pad.

19. The insert of claim 1, 12, 13, 16 or 17 wherein diameter of circumscribed circle of one of said fibers is less than 30 microns.

20. The insert of claim 12, 13, 16 or 17 wherein diameter of circumscribed circle of said fibers is less than 10 microns.

21. The insert of claim 12 or 16 wherein each said fiber satisfies the equation $$\gamma_{LA} \cdot \frac{12\pi \cdot 10^{-4}}{\sqrt{\rho}} \cdot \sqrt{dpf} \cdot (1 - X\cos\theta_a) \leq -0.3,$$

wherein $\lambda_{LA}$ is the surface tension of water in air in dynes/cm, $\rho$ is the fiber density in grams/cc, and dpf is the denier of the single fiber.

22. The insert of claim 13 or 17 wherein each said fiber satisfies the equation $$\gamma_{LA} \cdot \frac{12\pi \cdot 10^{-4}}{\sqrt{\rho}} \cdot \sqrt{dpf} \cdot (1 - X\cos\theta_a) \leq -0.3,$$

wherein $\lambda_{LA}$ is the surface tension of n-decane in air in dynes/cm, $\rho$ is the fiber density in grams/cc, and dpf is the denier of the single fiber.

23. The insert of claim 1, 12, 16 or 17 wherein the width of each groove in said fibers cross-section at any depth in the groove for each fiber is equal to or less than the width of the groove at its mouth.

24. The insert of claim 1, 12, 13, 16 or 17 wherein 2r/D for each fiber is greater than 1.

25. The insert of claim 1, 12, 13, 16 or 17 wherein 2r/D is from 1 to 5.

26. The insert of claim 1, 12, 13, 16 or 17 wherein X for each said fiber is greater than about 1.2.

27. The insert of claim 1, 12, 13, 16 or 17 wherein X for each said fiber is greater than about 2.5.

28. The insert of claim 1, 12, 13, 16 or 17 wherein X for each said fiber is greater than about 3.

29. The insert of claim 1, 12, 13, 16 or 17 wherein each one of said fibers has a single fiber denier of between 1 and 1,000.

30. The insert of claim 12 or 16 wherein each said fiber has an effective adhesion tension for water of greater than about 38 dynes/cm.

31. The insert of claim 12 or 16 wherein each said fiber has an effective adhesion tension for water of greater than about 45 dynes/cm.

32. The insert of claim 1, 12, 13, 16 or 17 wherein said fibers comprise a blend containing substantially equal parts by weight of polypropylene and poly 4-methylpentene-1.

33. The insert of claim 5, 13 or 17 wherein said fibers have coated thereon a layer of a hydrophobic lubricant.

34. The insert of claim 11, wherein said fibers comprise a high inherent viscosity homopolymer further comprising poly(ethylene) terephthalate.

35. The insert of claim 33 where said hydrophobic lubricant comprises 49% polyethylene glycol 600 monolaurate.

36. The insert of claim 33 wherein the lubricant is mineral oil based.

37. The insert of claim 36 wherein said lubricant comprises about 80–83% mineral oil, about 7–9% ethoxylated sorbitan monolaurate, about 9.5–11.5% sorbitan monolaurate and about 80–90 ppm of chlorine dioxide.

38. The insert of claim 33 wherein the lubricant is peanut oil based.

39. The insert of claim 12 or 16 wherein said fibers have coated thereon a layer of hydrophilic lubricant.

40. The insert of claim 39 wherein said hydrophilic lubricant comprises 49% polyethylene glycol 600 monolaurate.

41. The insert of claim 1 wherein said openings have an effective diameter in the range of 0.5 mm to 5 mm.

42. The insert of claim 1 wherein said first layer comprises openings having an elongated shape.

43. The insert of claim 42 wherein said openings have a major axis length of about ¼ to about ½ inch and a minor axis of less than 2 mm.

44. The insert of claim 1, 12, 13, 16 or 17 wherein portions of said intermediate layer adjacent said food are thermally embossed.

45. The insert of claim 1, 12 or 16 wherein said fibers are plasma treated.

46. The insert of claim 1, 12, 13, 16 or 17 wherein said fiber has a cross-section which is H-shaped.

47. The insert of claim 5 comprising at least one hydrophilic layer bonded with at least one hydrophobic layer.

48. The insert of claim 4 wherein the fibers are intimately blended within the layers.

49. The insert of claim 1, 12, 13, 16 or 17 wherein said absorbent material comprises at least one fiber having a hydrophobic lubricant and at least one fiber having a hydrophilic lubricant.

* * * * *

UNITED STATES PATENT AND TRADEMARK OFFICE
CERTIFICATE OF CORRECTION

PATENT NO. : 5,414,248
DATED : May 9, 1995
INVENTOR(S) : Phillips

It is certified that error appears in the above-indentified patent and that said Letters Patent is hereby corrected as shown below:

On title page, item [75], the inventorship should be

—M. David Shelby, Blackburg, Va., Billie G. Lane, Kingsport, Tn., and Bobby M. Phillips, Jonesborough, Tn.—

Signed and Sealed this

Twelfth Day of November, 1996

Attest:

BRUCE LEHMAN

*Attesting Officer*    *Commissioner of Patents and Trademarks*